(12) United States Patent  
Yamada et al.

(10) Patent No.: US 7,563,196 B2  
(45) Date of Patent: Jul. 21, 2009

(54) CONTROLLER FOR AUTOMATIC TRANSMISSION

(75) Inventors: Jun Yamada, Nagoya (JP); Tetsuji Kozaki, Chita-gun (JP)

(73) Assignee: DENSO Corporation, Kariya (JP)

( * ) Notice: Subject to any disclaimer, the term of this patent is extended or adjusted under 35 U.S.C. 154(b) by 241 days.

(21) Appl. No.: 11/108,891

(22) Filed: Apr. 19, 2005

(65) Prior Publication Data

US 2005/0245351 A1    Nov. 3, 2005

(30) Foreign Application Priority Data

Apr. 27, 2004  (JP) .............. 2004-130644  
Apr. 27, 2004  (JP) .............. 2004-130645  
Apr. 28, 2004  (JP) .............. 2004-134516

(51) Int. Cl.  
B60W 10/04  (2006.01)  
B60W 10/10  (2006.01)

(52) U.S. Cl. .............. 477/110; 477/144; 477/155

(58) Field of Classification Search ............ None  
See application file for complete search history.

(56) References Cited

U.S. PATENT DOCUMENTS

| 5,133,227 | A | * | 7/1992 | Iwatsuki | ............ 477/110 |
| 5,282,399 | A | * | 2/1994 | Sano et al. | ............ 477/110 |
| 5,501,642 | A | | 3/1996 | Inuzuka et al. | |
| 5,772,554 | A | | 6/1998 | Tabata | |
| 5,863,275 | A | * | 1/1999 | Nozaki et al. | ............ 477/110 |
| 6,023,647 | A | | 2/2000 | Saito et al. | |
| 6,024,669 | A | * | 2/2000 | Iwatsuki et al. | ............ 477/107 |
| 6,740,005 | B2 | * | 5/2004 | Watanabe et al. | ............ 477/110 |
| 6,749,534 | B2 | | 6/2004 | Watanabe et al. | |

FOREIGN PATENT DOCUMENTS

| JP | 3-229932 | 10/1991 |
| JP | 06-001163 | 1/1994 |
| JP | 7-247874 | 9/1995 |
| JP | 09-068267 | 3/1997 |

(Continued)

OTHER PUBLICATIONS

Office Action dated Aug. 1, 2007 from parent application, U.S. Appl. No. 11/730,448.

(Continued)

*Primary Examiner*—David D. Le  
(74) *Attorney, Agent, or Firm*—Nixon & Vanderhye P.C.

(57) ABSTRACT

In performing a down-shift based on a driver's intention of deceleration, an engine output increasing control is started at a time when a transfer torque capacity of the releasing clutch becomes small or zero and the actual oil pressure decreases to an initial oil pressure, not causing an acceleration feeling even upon the engine output increase. For estimating a time when which the real pressure of the releasing clutch decreases to a level of not higher than the initial pressure, the response of the real pressure relative to an oil pressure command value for the releasing clutch is approximated using a transfer characteristic of "first order lag+time delay." An estimated real oil pressure obtained based on the transfer characteristic is compared with the initial pressure. It is determined a start timing of the engine output increasing control has been reached upon decrease of the estimated pressure to the initial pressure.

35 Claims, 50 Drawing Sheets

FOREIGN PATENT DOCUMENTS

| | | |
|---|---|---|
| JP | 10-18877 | 1/1998 |
| JP | 10-184884 | 7/1998 |
| JP | 2924463 | 5/1999 |
| JP | 2001-080389 | 3/2001 |
| JP | 2003-094988 | 4/2003 |
| JP | 2003-205768 | 7/2003 |
| JP | 2004-019788 | 1/2004 |

OTHER PUBLICATIONS

Office Action dated Apr. 8, 2008 issued in corresponding Japanese application No. 2004-130644 and an at least partial English-language translation thereof.

Office Action dated Apr. 15, 2008 issued in corresponding Japanese application No. 2004-130645 and an at least partial English-language translation thereof.

Office Action dated Apr. 15, 2008 issued in corresponding Japanese application No. 2004-134516 and an at least partial English-language translation thereof.

Examination Report dated Jul. 14, 2008 issued in corresponding Japanese Application No. 2004-134516 with at least partial English translation.

Office Action issued Aug. 28, 2008 in corresponding Japanese Application No. 2004-130644 and an at least partial English-language translation thereof.

* cited by examiner

| CLUTCH, BRAKE RANGE | C1 | B1 | C2 | C0 | B0 |
|---|---|---|---|---|---|
| R | ○ | | | | ○ |
| P · N | | | | | |
| LOW | | | | ○ | ○ |
| 2nd | | ○ | | ○ | |
| 3rd | | | ○ | ○ | |
| TOP | | ○ | ○ | | |

| Nt \ WATER TEMP. | 20 | 40 | 60 | 80 |
|---|---|---|---|---|
| 500 | 5 | 4 | 3 | 2 |
| 1000 | 8 | 6 | 5 | |
| 1500 | 10 | 8 | 7 | |

| Nt \ WATER TEMP. | 20 | 40 | 60 | 80 |
|---|---|---|---|---|
| | | | | |

| Nt \ WATER TEMP. | 20 | 40 | 60 | 80 |
|---|---|---|---|---|
| 500 | 5 | 4 | 3 | 2 |
| 1000 | 8 | 6 | 5 | |
| 1500 | 10 | 8 | 7 | |
| | | | | |

| Nt \ WATER TEMP. | 20 | 40 | 60 | 80 |
|---|---|---|---|---|
| | | | | |

| Nt \ WATER TEMP. | 20 | 40 | 60 | 80 |
|---|---|---|---|---|
| 500 | 4 | 3 | 2 | 2 |
| 1000 | 7 | 5 | 5 | |
| 1500 | 9 | 7 | 6 | |

| Nt \ WATER TEMP. | 20 | 40 | 60 | 80 |
|---|---|---|---|---|
| | | | | |

| Nt \ WATER TEMP. | 20 | 40 | 60 | 80 |
|---|---|---|---|---|
| 500 | 0 | 0 | 0 | 0 |
| 1000 | 0 | 0 | 0 | |
| 1500 | 0 | 0 | 0 | |

| Nt \ WATER TEMP. | 20 | 40 | 60 | 80 |
|---|---|---|---|---|
| | | | | |

CONTROLLER FOR AUTOMATIC TRANSMISSION

CROSS REFERENCE TO RELATED APPLICATION

This application is based on Japanese Patent Application No. 2004-130644 filed on Apr. 27, 2004, No. 2004-130645 filed on Apr. 27, 2004, and No. 2004-134516 filed on Apr. 28, 2004, the disclosures of which are incorporated herein by reference.

FIELD OF THE INVENTION

The present invention relates to a controller for an automatic transmission involving an improved technique for controlling a down-shift which is executed on the basis of a driver's intention of deceleration.

BACKGROUND OF THE INVENTION

Many of the recent automatic transmissions for automobiles are of a construction wherein the states of engagement of plural frictional engaging elements, including hydraulic clutches and brakes, are switched from one to another state by operation of a hydraulic control circuit, whereby plural shift ranges are attained. In an automatic transmission of such a construction, when a sufficient engine brake force is not obtained even if an accelerator is turned OFF for example on a downhill, a driver turns OFF an overdrive switch or switches a shift lever from D Range to S or L Range to effect a down-shift, thereby increasing the engine brake force.

When a down-shift for increasing the engine brake force is performed on the basis of a driver's intention of deceleration (e.g., decelerating operation) and with the accelerator OFF, the transmission gear ratio of the automatic transmission becomes larger as a result of the down-shift and therefore it is necessary to so much increase the rotational speed of the engine. However, in an operation mode requiring such an engine brake, the throttle valve is usually closed, so that an output-side torque is transmitted to the engine side by the transfer of torque through frictional engaging elements which are for attaining a shift range after the down-shift, whereby the rotational speed of the engine is increased. Consequently, the time required for the shift becomes longer and the effect of engine brake may not be obtained at a required timing, or an inertia torque induced with an increase in the rotational speed of the engine appears as a braking torque for the vehicle, with a consequent temporary increase of the engine brake force and generation of a shift shock. Moreover, if the transfer torque of the frictional engaging elements is suddenly increased for example by a hydraulic control of the automatic transmission, the rotational speed of the engine increases quickly and hence the shift time becomes shorter, but the braking torque increases rapidly, resulting in the shift shock becoming more marked.

With a view to solving such problems, a control technique is proposed in Japanese Patent No. 2924463. This control technique uses engine output increasing means for increasing an engine output temporarily when an automatic transmission is shifted down to a lower speed range in which engine brake acts with an accelerator substantially OFF and a timer for measuring an elapsed time from a predetermined measurement start point such as, for example, a shift output point at which a hydraulic control circuit is switched from one to another state at the time of down-shift. According to this proposed control technique, an engine output increasing control by the engine output increasing means is started on the basis of the elapsed time measured by the timer so that the rotational speed of the engine increases after a high speed range-side frictional engaging element which is released at the time of down-shift begins to slip and until complete engagement of a low speed range frictional element which is brought into engagement at the time of down-shift. The control start timing is set on the basis of a vehicular operating condition (more specifically, the temperature of oil in the hydraulic control circuit or the rotational speed of the engine) which exerts an influence on at least one of engagement/release delay times of the frictional engaging elements and an engine output increase delay time.

In the Japanese patent No. 2924463 it is also disclosed that there is a delay time until actual release or engagement of a frictional engaging element in an automatic transmission and there also is a delay time after a throttle angle control for increasing the engine output has been performed and until actual increase of the engine output and that therefore, by setting the start timing taking those delay times into account, the shift time is shortened while suppressing the occurrence of a shift shock. Also, according to the disclosure of the patent in question, it is preferable to control the degree of opening of a throttle valve so that the engine speed increases in conformity with a slip start timing of the frictional engaging element on the high speed range side.

In JP-7-247874A, with a view to solving the foregoing problems, there is disclosed a technique in which, when an automatic transmission is shifted down by manual operation to a low speed range undergoing the action of engine brake with an accelerator substantially OFF, the amount of intake air is increased and restoring (fuel injection) from fuel cut is performed to increase the engine output. According to this technique disclosed in the '874 publication, an ISC valve for idling control is opened to increase the amount of intake air before the shift is started in the above shift-down, and when the start of the shift is detected by a change in rotation of a rotating member, the supply of fuel is resumed by a fuel cut restoring control to increase the engine torque, thereby shortening the shift time and preventing the occurrence of a shift shock. In JP-10-18877A there is proposed a technique in which, taking note of a shift shock diminishing effect by an engine output increasing control in down-shift, a torque increase quantity by the engine output increasing control is made larger in an automatic down-shift according to a preset shift schedule than in manual down-shift. According to this proposed technique, in manual down-shift, the torque increase quantity is made relatively small for generating a moderate shift shock which affords a deceleration feeling, while in an automatic down-shift involving execution of a shift independently of operation performed by a driver, the torque increase quantity is made relatively large so as not to let the driver feel a shift shock.

However, the delay time until actual release or engagement of the associated frictional engaging element referred to above at the time of down-shift varies depending on not only the temperature of oil in the hydraulic control circuit or the engine speed but also the vehicle speed or the torque acting on the frictional engaging element when the down-shift control is performed. Particularly, at the time of down-shift, since the accelerator pedal is substantially fully closed, it is necessary to take into account that an arbitrary drive torque below the road load (below the torque required for constant speed running at the speed of the time point concerned) is applied from the engine side. The delay time is also influenced by an operating condition including a slip control for a lock-up clutch being executed. Therefore, in a timer-based setting of a control start time, the throttle valve position control (engine output increasing control) cannot always be started at an appropriate timing even if the influence of the oil temperature or the engine speed is taken into account. Thus, there is a fear that the start timing of the throttle valve position control may be offset from the appropriate timing and the driver may be given an acceleration or a shock by the throttle valve position control during down-shift. Besides, for appropriately setting a reference value of the timer taking the influence of the oil temperature and engine speed into account, not only it is necessary in a conforming process to set a reference value based on repeated experiments but also it is necessary to again set the timer reference value in the case where there arises the necessity of changing the oil pressure removing method due to a change of specification for the hydraulic shift control. Thus, not only the logic becomes complicated but also it is necessary to set many parameters and the parameter conforming work is very troublesome.

Moreover, even if the engine output increasing control is started in a proper manner, an unpleasant shock will be induced if a termination timing of the control is not appropriate. For example, in the foregoing down-shift, if an engagement-side frictional engaging element has a sufficient transfer torque capacity and if the engine output increasing control is continued in this state even after the down-shift reaches a nearly terminated state, an increased engine output causes the vehicle to be accelerated by a gear on the low speed range side, so that an unpleasant shock as a push-out feeling is developed.

Conversely, if the engine output increasing control is terminated in a state in which the engagement-side frictional engaging element does not yet have a transfer torque capacity sufficient for terminating the down-shift, the frictional engaging element acts in a direction in which the progress of the down-shift is decelerated, so that not only the shift time is not shortened, but also a strong deceleration shock is developed by both a decrease of the engine torque resulting from termination of the control and a coast torque applied from the vehicle side.

Further, it is necessary that the engine output quantity increased in the down-shift be controlled to a proper quantity conforming to conditions. More particularly, in the case where the output increase quantity is excess, not only an excess increase of the engine speed occurs and an extra time is taken until the end of shift, but also, for decreasing the increased engine speed by the engaging force of the engagement-side frictional engaging element, a thermal load on the frictional engaging element increases and there occurs a shift shock based on inertia energy. On the other hand, in the case where the output increase quantity is deficient, there arises the same condition as in the conventional shift control for increasing the engine speed by the engagement-side frictional engaging element and therefore the inertia torque consumed for increasing the engine speed cannot sufficiently mitigate the shift shock which is for becoming a vehicle braking torque. Thus, it is necessary that the output increase quantity in the engine output increasing control in the down-shift be set and controlled so as to afford a desired engine speed change quantity in the down-shift.

Since the engine output increasing control is performed by an increase of the intake air quantity and the supply of fuel proportional thereto, not depending on a driver's operation, the application of the same control also to a down-shift based on a predetermined shift schedule taking into account a slow deceleration such as that in street running or running on a congested road affords the shift shock diminishing effect disclosed in JP-10-18877A, but causes the generation of noise due to a sudden increase of the engine speed and the deterioration of fuel economy due to an increase of fuel consumption resulting from this control, and is therefore not advisable.

SUMMARY OF THE INVENTION

The present invention has been accomplished taking the above-mentioned circumstances into account and it is an object of the present invention to provide a controller for an automatic transmission which, at the time of performing a down-shift in accordance with a driver's intention of deceleration, can set a start timing of an engine output increasing control with a high accuracy without causing the driver to have an acceleration feeling or feel a shock caused by an engine output increasing control and which can execute an engine output increasing control by a simple logic configuration and by the setting of reduced parameters.

It is another object of the present invention to provide a controller for an automatic transmission which, at the time of performing a down-shift in accordance with a driver's intention of deceleration, can set a termination timing of an engine output increasing control with a high accuracy and which can prevent the occurrence of an unpleasant shock such as a push-out feeling or a deceleration shock at the end of the engine output increasing control.

It is another object of the present invention to provide a controller for an automatic transmission which, at the time of performing a down-shift in accordance with a driver's intention of deceleration, can execute a proper quantity of an engine output increasing control in accordance with vehicular operating conditions.

According to the present invention, in order to achieve the above-mentioned objects, there is provided a controller for an automatic transmission including engine output increasing control means which, when a shift mechanism is down-shifted in accordance with a driver's intention of deceleration, executes an engine output increasing control for increasing an engine output without depending on an accelerator operation by the driver, and also including output increase start timing control means for controlling a start timing of the engine output increasing control, wherein the start timing of the engine output increasing control is set at a time point when an oil pressure of a frictional engaging element which is controlled for release during the down-shift drops below an oil pressure equivalent to a predetermined transfer torque capacity by operation of oil pressure control means. According to this construction, when performing a down-shift in accordance with the driver's intention of deceleration, the engine output increasing control can be started when the oil pressure of the frictional engaging element which is controlled for release has dropped below an oil pressure equivalent to a predetermined transfer torque capacity not causing an acceleration feeling or a shock even upon start of the engine output increasing control. Consequently, a start timing of the engine output increasing control can be set with a high accuracy and the driver is not given an acceleration feeling or a shock caused by the engine output increasing control. Besides, since a start timing of the engine output increasing control can be set without dependence on such a timer as in Patent Literature 1. Therefore, the engine output increasing control can be executed by a simple logic configuration and by the setting of reduced parameters. Thus, there accrues an advantage that a practical application is easy.

According to the present invention there is provided a controller for an automatic transmission including engine output increasing control means which, when a shift mechanism is down-shifted in accordance with a driver's intention of deceleration, executes an engine output increasing control for increasing the engine output without depending on an accelerator operation by the driver, and also including output increase end timing control means, wherein when the output increase end timing control means determines that a predetermined state corresponding to a substantial end of the down-shift has been obtained, it is determined that this time point is an end timing of the engine output increasing control. According to this construction, at the time of performing a down-shift in accordance with the driver's intention of deceleration, the engine output can be decreased to a proper value (a value free of output increase) thereof in conformity with a timing at which an engagement-side frictional engaging element comes to have a transfer torque capacity necessary for the completion of the down-shift. Consequently, it is possible to prevent the occurrence of an unpleasant shock such as a push-out feeling or a deceleration shock at the end of the engine output increasing control.

Further, according to the present invention there is provided a controller for an automatic transmission including engine output increasing control means which, when a shift mechanism is down-shifted in accordance with a driver's intention of deceleration, executes an engine output increasing control for increasing an engine output without depending on an accelerator operation by the driver, the engine output increasing control means setting an output increase control quantity so that an engine torque corresponding to a desired engine speed change rate is generated during the engine output increasing control. According to this construction, since an output increase control quantity is set so that an engine torque corresponding to a desired engine speed change rate is generated during the engine output increasing control, the engine torque can be increased by an amount corresponding to an inertia torque of members (e.g., engine and torque converter) for which is required an increase of rotation in the down-shift. Thus, an output increase control quantity can always be set neither more nor less and it is possible to solve the foregoing various problems involved in the prior art.

BRIEF DESCRIPTION OF THE DRAWINGS

FIGS. 17A and 17B are diagrams each showing an example of a throttle angle setting map in the first embodiment;

FIGS. 51A and 51B are diagrams each showing conceptually a target throttle angle setting map for manual down-shift in the eleventh embodiment;

FIGS. 52A and 52B are diagrams each showing conceptually a target throttle angle setting map for auto-down-shift in the eleventh embodiment;

FIGS. 53A and 53B are diagrams each showing conceptually a target throttle angle setting map for coast down shift in the eleventh embodiment;

DETAILED DESCRIPTION OF EMBODIMENT

First Embodiment

A first embodiment of the present invention will be described below with reference to FIGS. 1 to 20.

Figure 1:
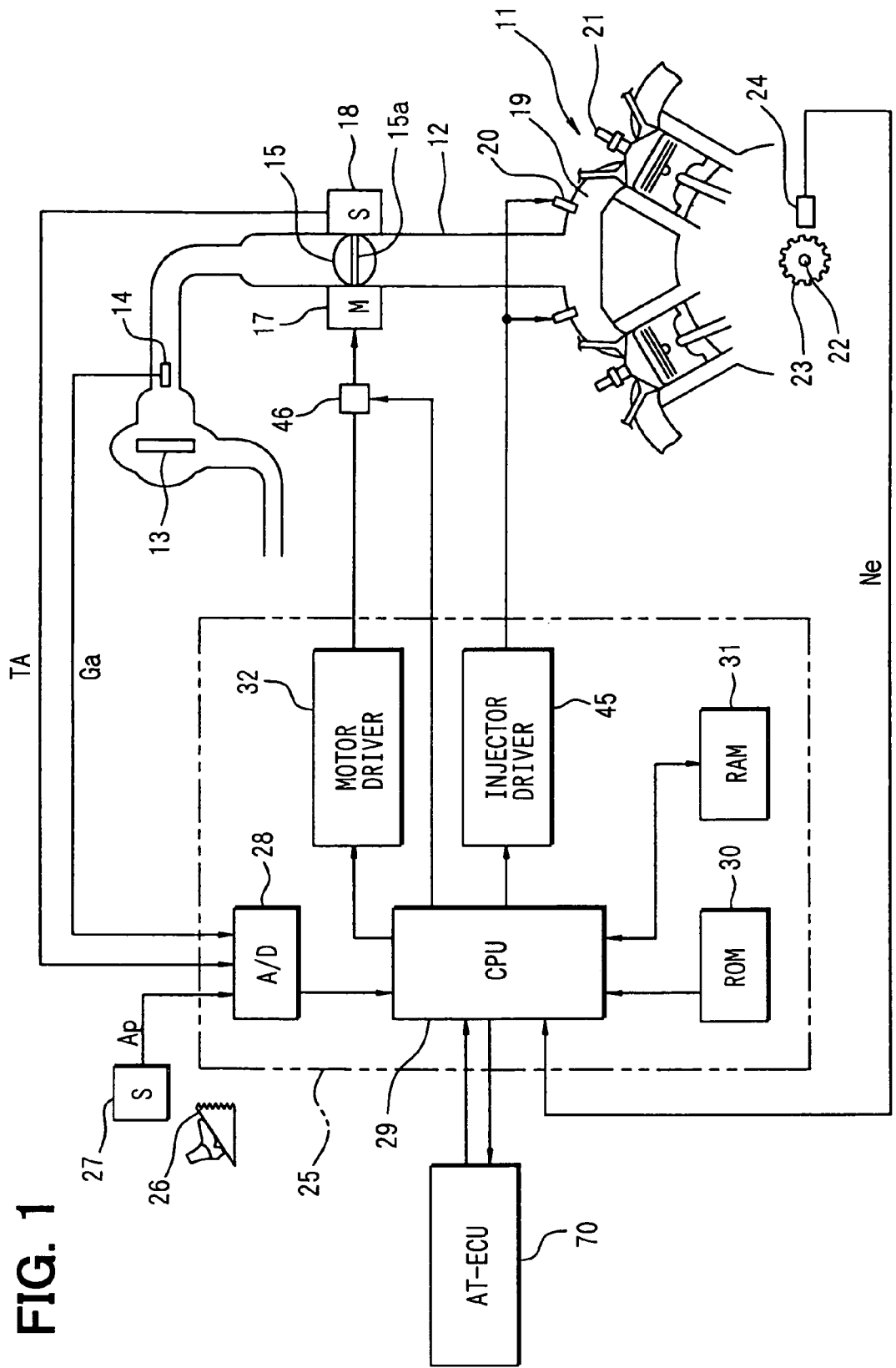
FIG. 1 is a schematic construction diagram of the whole of an engine control system in each of embodiments of the present invention.

First, a schematic construction of the whole of a control system for an engine 11 as an internal combustion engine will now be described with reference to FIG. 1. An air cleaner 13 is mounted upstream of an intake pipe 12 of the engine 11, and an air flow meter 14 (intake air quantity detecting means) for measuring an intake air quantity Ga is mounted downstream of the air cleaner 13. Further, a throttle valve 15 is disposed downstream of the air flow meter 14. A motor 17 such as a DC motor is connected to a pivot shaft 15a of the throttle valve 15. The degree of opening (throttle angle) of the throttle valve 15 is controlled with a drive force of the motor 17 and is detected by a throttle angle sensor 18.

An injector 20 is attached to an intake manifold 19 which introduces intake air having passed through the throttle valve 15 into each cylinder in the engine 11, and a spark plug 21 is attached to a cylinder head of each cylinder in the engine 11. A crank angle sensor 24 is installed in opposition to an outer periphery of a signal rotor 23 which is mounted on a crank shaft 22 of the engine 11. Pulses of an engine speed signal Ne which is outputted from the crank angle sensor 24 are received by an engine ECU (electronic control unit) 25 and an engine speed is detected from a generated frequency of the engine speed signal Ne.

On the other hand, a depressed quantity (acceleration operation quantity) of an accelerator pedal 26 is detected by an accelerator sensor 27 and a voltage signal Ap proportional to the accelerator operation quantity is received by the engine ECU 25 through an A/D converter 28. Voltage signals indicative of the intake air quantity Ga detected by the air flow meter 14 and the throttle angle TA detected by the throttle angle sensor 18 are also received by the engine ECU 25 through the A/D converter 28.

The engine ECU 25 is constituted mainly by a microcomputer provided with CPU 29, ROM 30 and RAM 31. Various routines for controlling the engine which are stored in the ROM 30 are executed by the CPU 29, whereby an ignition timing of the spark plug 21 is controlled and the pulse width of an injection signal to be applied to the injector 20 is controlled to control the amount of fuel to be injected.

In the engine ECU 25, various routines for controlling the throttle valve stored in the ROM 30 are executed in the CPU 29, whereby the motor 17 for the throttle valve 15 is feedback-controlled, for example by PID control, through a motor driver 32 in such a manner that the throttle angle detected by the throttle angle sensor 18 becomes coincident with a target throttle opening. In the event of failure of an electronic throttle system, a safety circuit disposed in a current path extending from the motor driver 32 to the motor 17 operates to keep the motor 17 deenergized. In this state, the throttle angle is held at a predetermined angle so as to permit vehicular running for refuge.

Next, a schematic construction of an automatic transmission 51 will be described with reference to FIGS. 2 and 3. As shown in FIG. 3, an input shaft 53 of a torque converter 52 is connected to an output shaft of the engine 11 and a hydraulic-driven type speed change gear mechanism 55 (shift mechanism) is connected to an output shaft 54 of the torque converter 52. In the interior of the torque converter 52, a pump impeller 71 and a turbine runner 72, which constitute a fluid coupling, are disposed in opposition to each other, and a stator 73 for uniforming the flow of oil is disposed between the pump impeller 71 and the turbine runner 72. The pump impeller 71 is connected to the input shaft 53 of the torque converter 52, while the turbine runner 32 is connected to the output shaft 54 of the torque converter 52.

Further, in the torque converter 52 there is provided a lock-up clutch 56 for engagement or disengagement between the input shaft 53 and the output shaft 54 is provided in the torque converter 52. An output torque of the engine is transmitted to the speed change gear mechanism 55 through the torque converter 52 and is shifted by plural gears (e.g., planetary gears) in the speed change gear mechanism 55, then is transmitted to driving wheels (front or rear wheels) of the vehicle.

In the speed change gear mechanism 55 there are provided plural clutches C0, C1 and C2 as frictional engaging elements for switching among plural shift ranges, as well as brakes B0 and B1. As shown in FIG. 4, engagement and release of the clutches C0, C1, C2 and the brakes B0, B1 are switched from one to the other hydraulically to change the combination of power transfer gears, thereby changing the transmission gear ratio.

FIG. 4 shows engagement combinations of clutches C0, C1, C2 and brakes B0, B1 in a four-shift range automatic transmission, in which circle marks represent clutches and brakes which are held in an engaged state (torque transfer state) in the shift ranges concerned, while unmarked portions represent a state of release. For example, in a throttle depressed state in D Range, the transmission shifts up like low, second, third and top gear in this order as the vehicle speed increases. In the shift from low to second gear, B0 is released from the engagement of C0 and B0, and B1 is newly engaged. In the shift from second to third gear, B1 is released from the engagement of C0 and B1, and C2 is newly engaged. In the shift from third to fourth gear, C0 is released from the engagement of C0 and C2, and B1 is newly engaged.

A fail-safe mechanism is provided. According to this mechanism, when B1 is fixed in an engaged state without the oil pressure assuming a state of low pressure by some cause for example at the time of shift from second to third gear, C2 is engaged to prevent the occurrence of interlock and stop of the driving wheels. More specifically, oil pressure switches (not shown) are disposed as fail detecting means clutch by clutch at positions permitting detection of oil pressures acting on the clutches disposed within the speed change gear mechanism 55. The oil switches are each constructed so as to turn ON (Hi output) when an actual oil pressure is not lower than a threshold value and turn OFF (Lo output) when an actual oil pressure is lower than the threshold value. Whether outputs (actual oil pressures) of the oil pressure switches and oil pressure command values match or not is determined to detect a defective clutch. On the basis of the result of this detection a control is made so as not to make a shift to a shift range in which the aforesaid interlock occurs.

Figure 2:
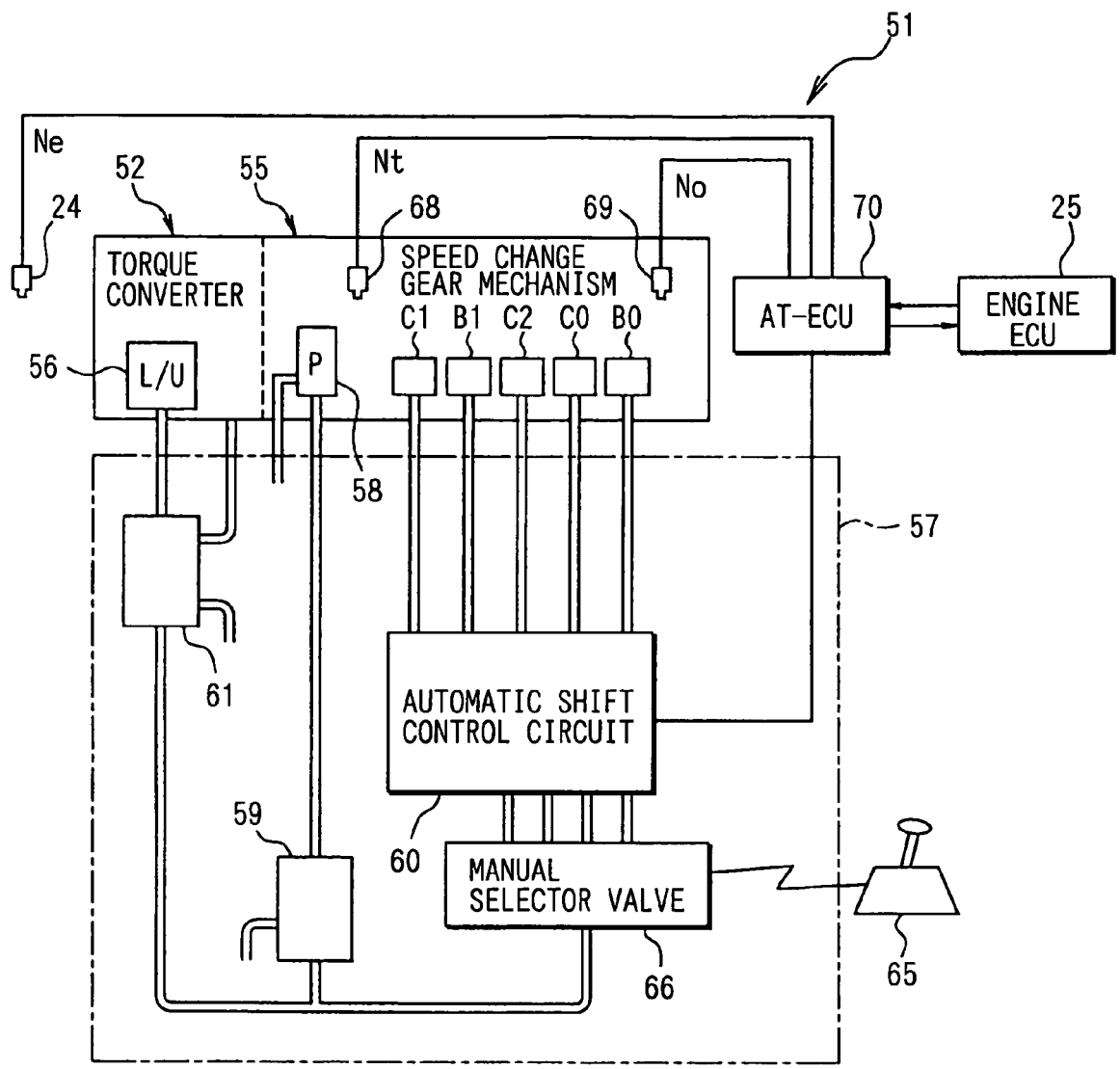
FIG. 2 is a diagram showing a schematic construction of the whole of an automatic transmission.
Figures 3, 4:
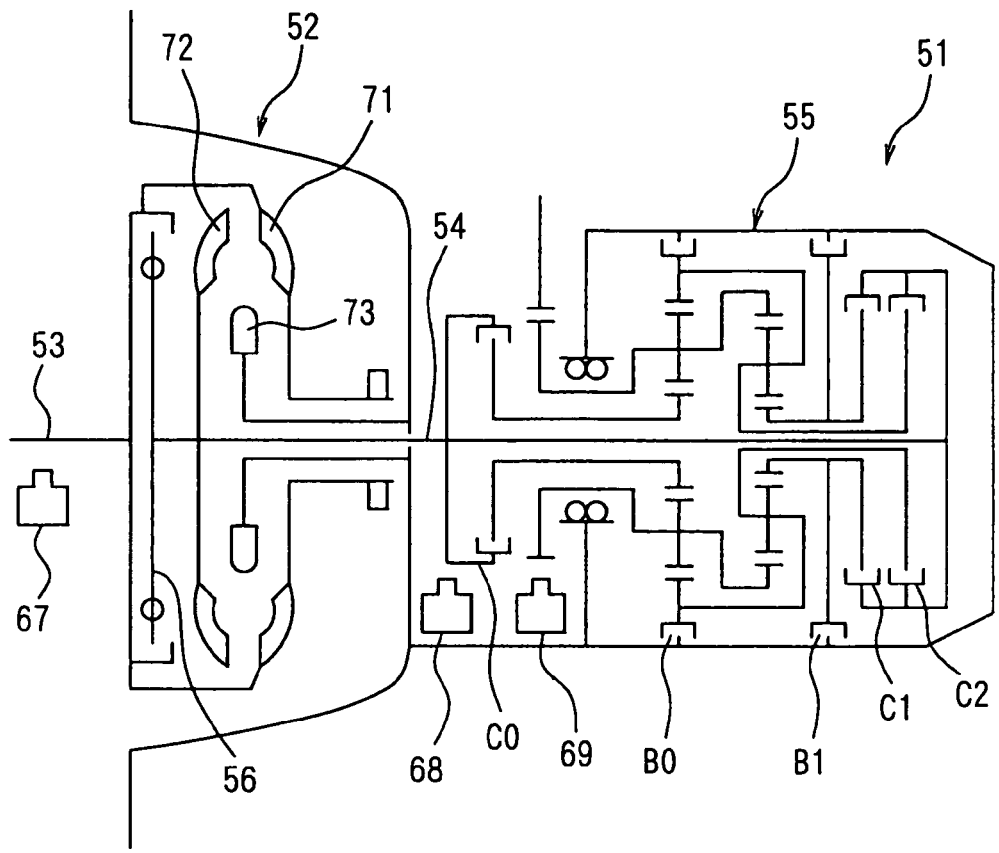
FIG. 3 is a diagram showing schematically a mechanical construction of the automatic transmission.
FIG. 4 is a diagram showing engagement/release combinations of clutches C0 to C2 and brakes B0, B1 for each of shift ranges.
Figure 5:
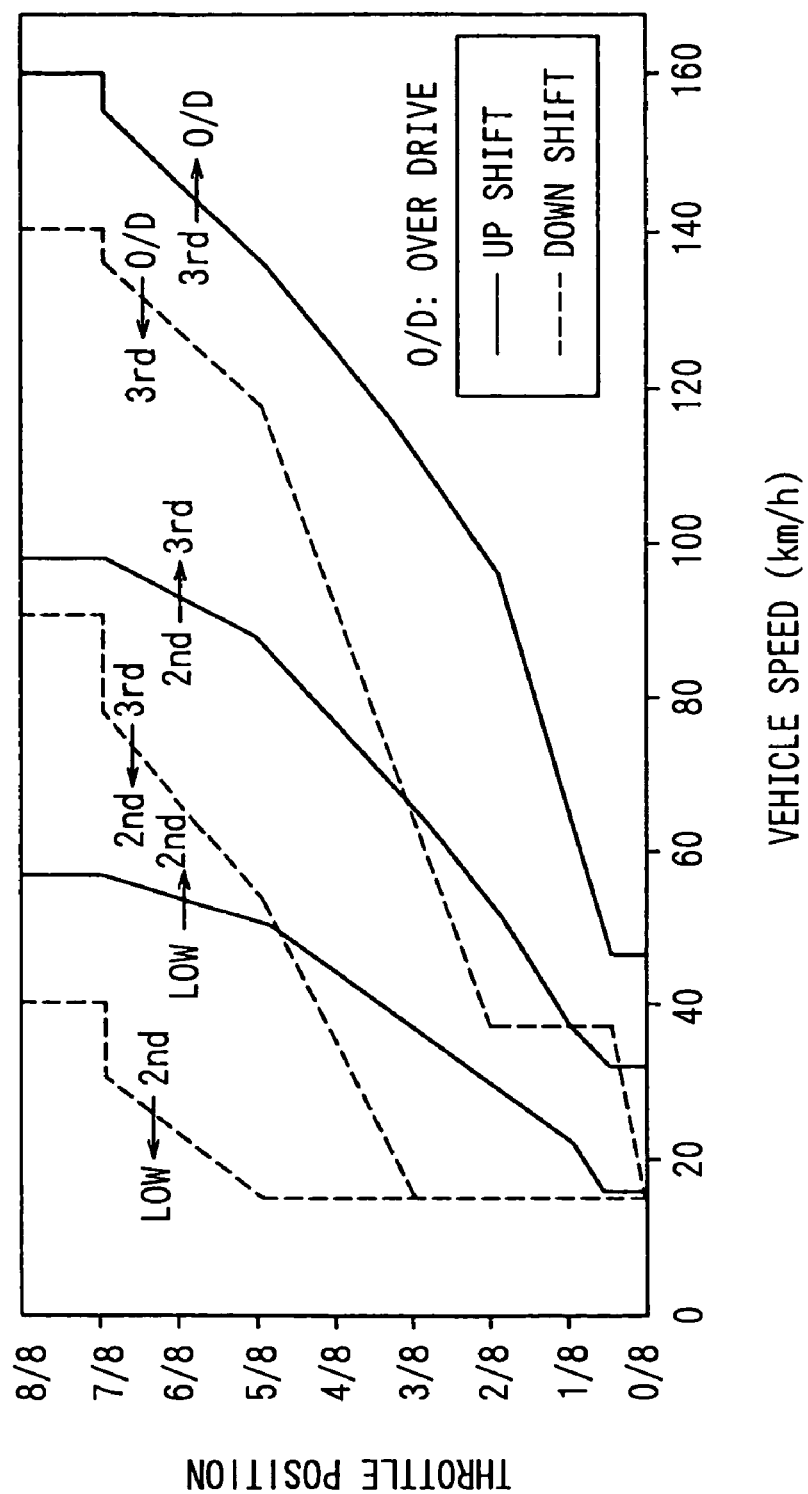
FIG. 5 is a diagram showing an example of shift patterns.

As shown in FIG. 2, a hydraulic pump 58 driven by the engine power is disposed in the speed change gear mechanism 55, and an oil pressure control circuit 57 is disposed within an oil pan (not shown) which stores working oil (oil). The oil pressure control circuit 57 includes a line pressure control circuit 59, an automatic shift control circuit 60, a lock-up control circuit 61, and a manual selector valve 66. Working oil pumped up from the oil pan by the hydraulic pump is fed through the line pressure control circuit 59 to the automatic shift control circuit 60 and the lock-up control circuit 61. An oil pressure control valve (not shown) for controlling the oil pressure provided from the hydraulic pump 58 to a predetermined line pressure is provided in the line pressure control circuit 59. Likewise, a plurality of shifting oil pressure control valves (oily pressure control means) for controlling the oil pressure to be fed to the clutches C0, C1, C2 and brakes B0, B1 in the speed change gear mechanism 55 are provided in the automatic shift control circuit 60. Further, a lock-up controlling oil pressure control valve (not shown) for controlling the oil pressure to be fed to the lock-up clutch 56 is provided in the lock-up control circuit 61.

The oil pressure control valves are each constituted by a linear solenoid valve for example and control the oil pressure by an attractive force which is generated by an electric current flowing under the application of voltage at a predetermined duty. Therefore, the electric current in each oil pressure control valve and the oil pressure are closely related to each other and the oil pressure is controlled by controlling the value of the electric current. For absorbing variations in electric current value against duty, an electric current value is monitored by current detecting means (not shown) provided in an automatic transmission electronic control circuit ("AT-ECU" hereinafter) 70 and is subjected to a feedback control.

Between the line pressure control circuit 59 and the automatic shift control circuit 60 there is provided a manual selector valve 66 adapted to be switched from one to another position in interlock with operation of a shift lever 65. With the shift lever 65 operated to Neutral Range (N Range) or Parking Range (P Range), even in a state in which the supply of an electric current to the oil pressure control valves in the automatic shift control circuit 60 is OFF, a switching is made by the manual selector valve 66 so that the oil pressure fed to the speed change gear mechanism 55 brings the same mechanism into a neutral state.

On the other hand, in the speed change gear mechanism 55 there are provided an input shaft rotational speed sensor 68 for detecting an input shaft rotational speed Nt (output shaft rotational speed of the torque converter 52) of the speed change gear mechanism 55 and an output shaft rotational speed sensor 69 for detecting an output shaft rotational speed No of the speed change gear mechanism 55.

Output signals provided from these sensors are inputted to the AT-ECU 70. The AT-ECU 70 is constituted mainly by a microcomputer. In order that the speed change gear mechanism 55 may be shifted in accordance with preset shift patterns of FIG. 5 by executing various routines stored in a ROM (storage medium) which is incorporated in the microcomputer, the supply of an electric current to each of the oil pressure control valves in the automatic shift control circuit 60 is controlled in accordance with an operational position of the shift lever 65 and operating conditions (e.g., throttle angle and vehicle speed) to control the oil pressure to act on the clutches C0, C1, C2 and the brakes B0, B1 in the speed change gear mechanism 55, whereby engagement and release of each of the clutches C0, C1, C2 and the brakes B0, B1 are switched from one to the other to change the combination of power transfer gears, thereby changing the transmission gear ratio in the speed change gear mechanism 55.

Figure 6:
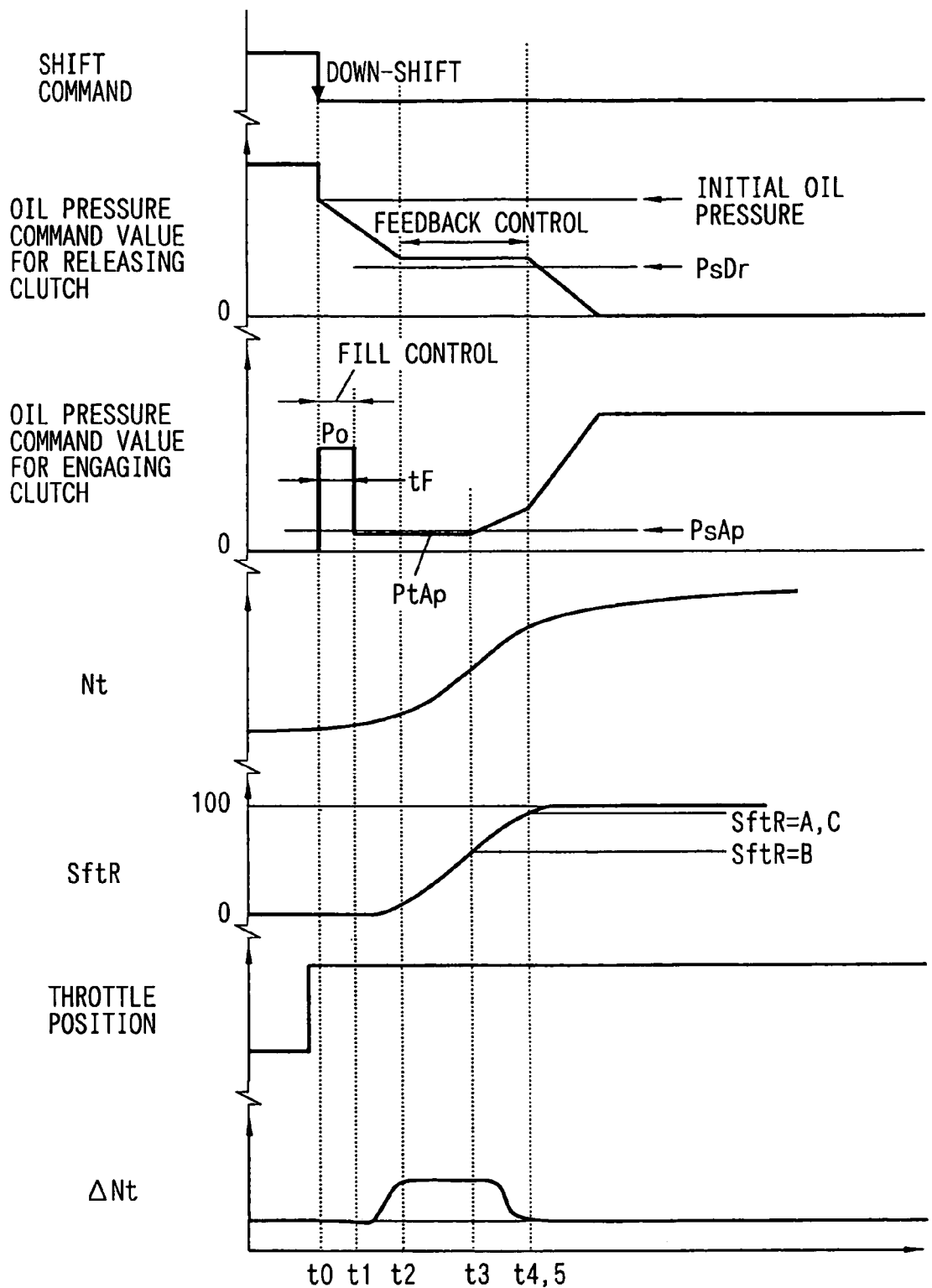
FIG. 6 is a time chart showing an example of a power ON down-shift control.
Figure 7:
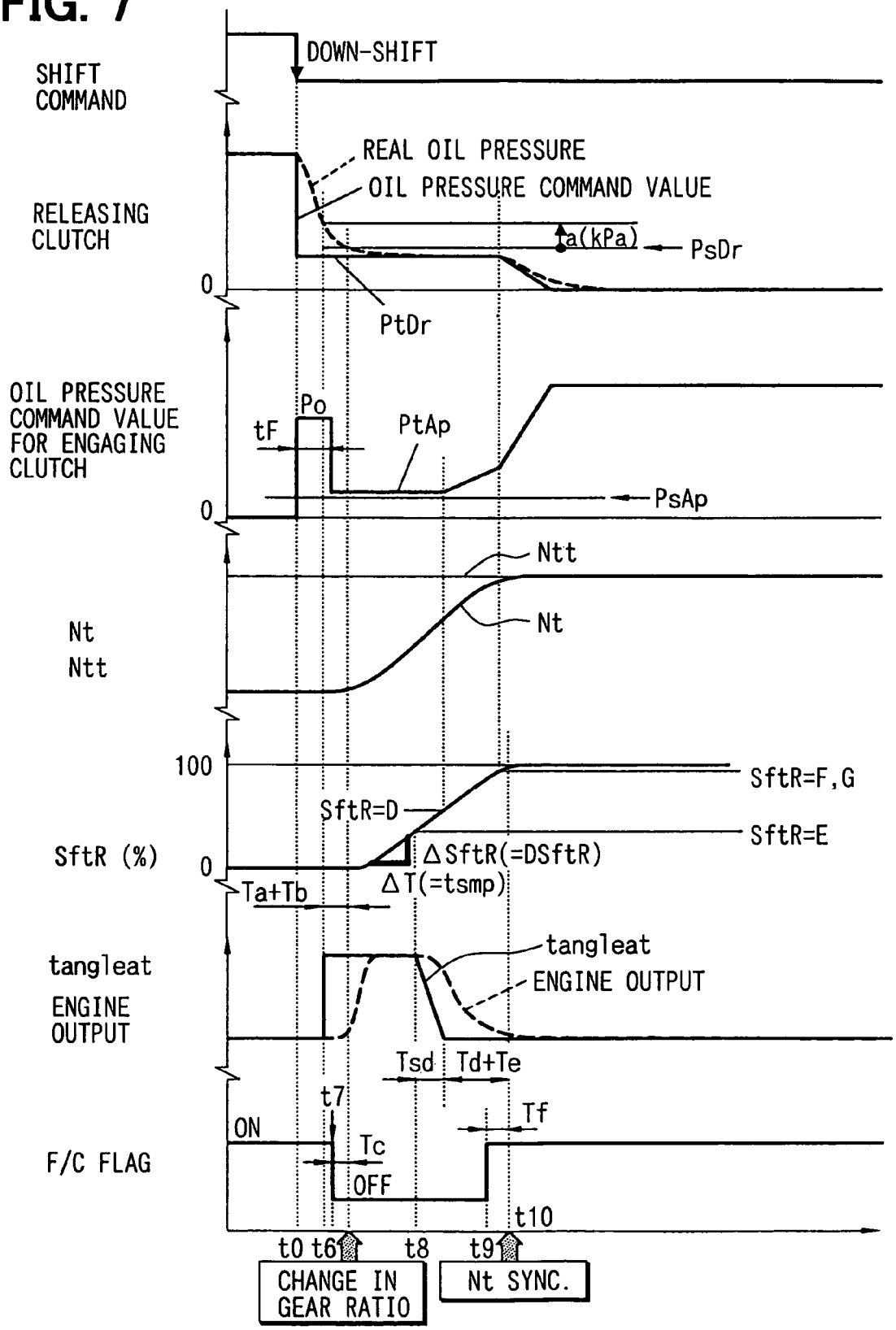
FIG. 7 is a time chart showing an example of an ETC cooperation down-shift in a first embodiment of the present invention.

At this time, for performing a down-shift, the AT-ECU 70 makes a control as shown in FIGS. 6 and 7. In the following description, the clutches C01, C1, C2 and the brakes B0, B1 will generically be termed simply "clutches." Further, in down-shift control, a clutch which switches from an engage state to a released state is designated a "releasing clutch" and a clutch which switches from a released state to an engaged state is designated an "engaging clutch."

FIG. 6 is a time chart showing a control example in "power ON down-shift" in which the driver depresses the accelerator pedal 26 to effect a down-shift and FIG. 7 is a time chart showing a control example in "ETC cooperation down-shift" in which an engine output increasing control is performed during a down-shift not depending on the driver's intention.

First, a control example in power ON down-shift will be described below with reference to FIG. 6.

When the driver depresses the accelerator pedal 26 to a large extent and the throttle valve is rapidly opened thereby, it is determined that this state corresponds to a power ON down-shift, and a down-shift command is issued. At this time point t0 an oil pressure command value for a releasing clutch is decreased to an initial oil pressure and is thereafter decreased at a constant gradient. As a result, the engaging force of the releasing clutch decreases and the engine load is lightened, so that the input shaft rotational speed Nt (output shaft rotational speed of the torque converter 52) in the speed change gear mechanism 55 begins to increase.

Further, at the time pint t0 of output of the down-shift command, an oil pressure command value for an engaging clutch is set to a predetermined fill oil pressure Po so as to bring about a state just before the engaging clutch produces an engaging force, and a fill control for filling the engaging clutch with the working oil is performed. At a time point t1 corresponding to the state just before development of an engaging force of the engaging clutch after execution of the fill control for only a predetermined time tF, the oil pressure command value for the engaging clutch is decreased to a stand-by oil pressure PtAp to terminate the fill control. Thereafter, the state just before development of an engaging force of the engaging clutch is maintained by the stand-by oil pressure PtAp. The stand-by oil pressure PtAp is set at a value close to a set load-equivalent oil pressure PsAp of a return spring in the engaging clutch.

Thereafter, at a time point t2 at which an increase of the input shaft rotational speed Nt (change rate of Nt≧determined value) is detected, the oil pressure of the releasing clutch is subjected to a feedback control so that an increasing gradient of the input shaft rotational speed Nt takes a predetermined value. During this feedback control, the oil pressure command value for the releasing clutch is a little higher than a set load-equivalent oil pressure PsDr of the return spring. Then, at a time point t3 at which a shift progress ratio SftR[=100×(input shaft rotational speed Nt−output shaft rotational speed No×gear ratio before shift)/(output shaft rotational speed No×gear ratio after shift−output shaft rotational speed No×gear ratio before shift)] reaches a predetermined value B, a control for increasing the oil pressure command value for the engaging clutch at a constant gradient is started. Thereafter, at a time point t4 at which the shift progress ratio SftR reaches a predetermined value A, the oil pressure command value for the releasing clutch is decreased at a constant gradient.

Further, at a time point t5 at which the shift progress ratio SftR reaches a predetermined value C, the oil pressure command value for the engaging clutch is set to a maximum pressure to increase the oil pressure of the engaging clutch up to the maximum pressure. With this control, the engaging force of the engaging clutch is increased in conformity with the timing when the input shaft rotational speed Nt increases to a rotational speed corresponding to a low shift range after the down-shift to complete the down-shift.

Next, a control example in ETC cooperation down-shift will be described with reference to FIG. 7. At a time point t0 at which an execution condition for ETC cooperation down-shift exists and a down-shift command is outputted, an oil pressure command value for a releasing clutch is decreased rapidly to a stand-by oil pressure PtDr (a little lower oil pressure than the set load-equivalent oil pressure PsDr of the return spring in the releasing clutch). Thereafter, the state just before development of an engaging force of the releasing clutch is maintained by the stand-by oil pressure PtDr. This is not only for promoting the increase of the input shaft rotational speed Nt by the engine output increasing control but also for suppressing a rush-out feeling of the vehicle caused by the engine output increasing control.

Also in this ETC cooperation down-shift, the oil pressure control for the engaging clutch is almost the same as in the power ON down-shift. At a time point t0 at which a down-shift command is outputted, an oil pressure command value for the engaging clutch is set at a predetermined fill oil pressure Po and a fill control is executed for filling the engaging clutch with working oil. This fill control is executed for a predetermined time tF, and just before the engaging clutch produces an engaging force, the oil pressure command value for the engaging clutch is decreased to a stand-by oil pressure PtAp (near the set load-equivalent oil pressure PsAp of the return spring in the engaging clutch) to terminate the fill control. Thereafter, with the stand-by oil pressure PtAp by the engaging clutch, the engaging force of the engaging clutch is held at a state in which a desired engine brake feeling is created. As to the subsequent pressure increasing control, the same processing as in the foregoing power ON down-shift is performed.

This ETC cooperation down-shift is characteristic in that the engine output increasing control is performed in the following manner. In the course of decrease of the actual oil pressure of the releasing clutch down to the stand-by oil pressure PtDr and at a time point t6 at which the transfer torque capacity of the releasing clutch becomes small or zero and the actual oil pressure decreases to "initial oil pressure" not causing an acceleration feeling even with an increase of the engine output, the engine output increasing control is started.

In this case, for estimating the time point t6 at which actual oil pressure of the releasing clutch decreases to a level of not higher than the initial oil pressure, a response of the actual oil pressure to the oil pressure command value for the releasing clutch is approximated using the transfer characteristic of "first order lag+time delay," then an estimated value of the actual oil pressure calculated using the said transfer characteristic is compared with the initial oil pressure, and at the time point t6 at which the estimated value of the actual oil pressure decreases to the initial oil pressure, it is determined that the start timing of the engine output increasing control has been reached.

At this time point t6, that is, when it is determined that the start timing of the engine output increasing control has been reached, the throttle angle command value is set to a predetermined throttle opening command value and a throttle opening control is started. Then, at a somewhat delayed time point t7, Fuel Cut Flag ("F/C Flag" hereinafter) is turned OFF and a fuel injection return control is started to resume the injection of fuel.

With a predetermined time lag after the start of the engine output increasing control (the throttle opening control and the fuel injection return control), the engine output increases. As causes of the delay of the engine output increasing control there are, in the throttle opening control, a response delay (Ta) of an opening motion of the throttle valve 15 and a response delay (Tb) in the period after actual opening of the throttle valve 15 until increase of the engine output. In the fuel injection return control, there is a response delay (Tc) in the period after resuming of fuel injection until increase of the engine output.

As to the response delay (Ta) of an opening motion of the throttle valve 15, it is calculated using a map of parameters (e.g., cooling water temperature and battery voltage) associated with the drive responsivity of the motor 17 in the electronic throttle system. As to the response delay (Tb) in the period after opening of the throttle valve 15 until increase of the engine output, it is calculated using a delay in the period after the introduction of intake air in an increased amount by opening of the throttle valve 15 into a cylinder until combustion and a map of parameters (e.g., engine speed and throttle angle) associated with the intake air flow velocity. As to the delay (Tc) in the period after resuming of the fuel injection until increase of the engine output, it is set by the time (time T720° C.A required for the crank shaft to rotate 720° C.A) after the injection of fuel until combustion.

Once the start of control is determined by the start timing determination in the foregoing throttle opening control (engine output increasing control), a throttle opening command value set so as to give an input shaft rotational speed Nt behavior which realizes desired shift time and shift feeling is outputted and held. This throttle opening command value is set on the basis of detection results of friction loss of the engine 11 and parameters [e.g., shift pattern (gear ratio change), cooling water temperature, and input shaft rotational speed Nt] which exert an influence on the amount of change in the input shaft rotational speed Nt before and after a shift, as well as a desired shift time. Further, if the throttle opening command value is changed in accordance with the magnitude of a road surface gradient and that of deceleration of the vehicle body, it is possible to let the feeling match a desired state more minutely. In this case, the throttle opening value is set small in deceleration and large in acceleration. The throttle opening value is corrected in accordance with output of the air flow meter 14. As a result, the input shaft rotational speed Nt (of the speed change gear mechanism 55 (output shaft rotational speed of the torque converter 52) begins to increase upon arrival of the oil pressure of the releasing clutch at the stand-by oil pressure PtDr or thereabouts.

During execution of this engine output increasing control, a predetermined engine output increase quantity is maintained while making an end determination for terminating the actual engine output increase by the engine output increasing control in conformity with the time point at which the downshift ends finally (a time point at which the shift progress ratio SftR becomes 100%). This end determination is made taking into account a response delay in the period after the issuance of an end command until an actual termination of the engine output increase on the basis of the shift progress ratio SftR and a change quantity ΔSftR per unit time ΔT of the shift progress ratio. As to a control end timing cable of offsetting this response delay, a time point corresponding to the value of the shift progress ratio SftR is calculated and whether a predetermined state corresponding to a substantial termination of the down-shift has been reached or not is determined on the basis of whether the shift progress ration SftR has exceeded or not the calculated value of the above time point, then end timings (t8, t9) of the throttle opening control as the engine output increasing control and the fuel injection return control are determined. As a result, if the end timings (t8, t9) are determined, then in the throttle opening control, an end control is performed for decreasing the throttle opening command value to "0." In this end control, the throttle opening command value is decreased to "0" with a predetermined gradient for ensuring a transient reproducibility in electronic throttle. As to the fuel injection return control, F/C Flag is returned to ON in accordance with the end determination to resume fuel cut. However, this does not apply when the request for fuel cut from the engine 11 vanishes due to a sudden decrease of the engine speed or by any other cause.

As causes of the engine output increase end response delay there are, in connection with the throttle opening control, a response delay (Td) of a full closing motion of the throttle valve 15, a response delay (Te) in the period after actual full closing of the throttle valve 15 until actual disappearance of the engine output increase, and time (Tsd) after the end determination until decrease of the throttle opening command value to "0." As to the fuel injection return control, there is a response delay (Tf) in the period after resuming of fuel cut until disappearance of the engine output.

As to the response delay (Td) of a closing motion of the throttle valve 15, it is calculated using a map of parameters (e.g., cooling water temperature and battery voltage) associated with the drive responsivity of the motor 17 in the electronic throttle system. As to the response delay (Te) in the period after full closing of the throttle valve 15 until disappearance of the engine output increase, it is calculated using a delay in the period after introduction of intake air in an amount decreased by full closing of the throttle value 15 into a cylinder until combustion and a map of parameters (e.g., engine speed and throttle angle) associated with the intake air flow velocity. As to the time (Tsd) after the end determination until decrease of the throttle opening command value to "0," it is calculated on the basis of throttle opening command value/decrease gradient. As to the response delay (Tf) in the period after resuming of fuel cut until disappearance of the engine output, it is set by the time (time T720° C.A required for the crank shaft to rotate 720° C.A) after resuming of fuel cut until arrival of the fuel-cut cylinder at a combustion stroke.

On the other hand, as to the oil pressure command value for the releasing clutch, it is decreased at a constant gradient upon arrival of the shift progress ration SftR at 100%. The ETC cooperation down-shift is completed by this control.

The shift control in this first embodiment described above is performed by cooperation of both AT-ECU 70 and engine ECU 25 and in accordance with various routines, whose contents will be described below.

[Shift Control]

Figure 8:
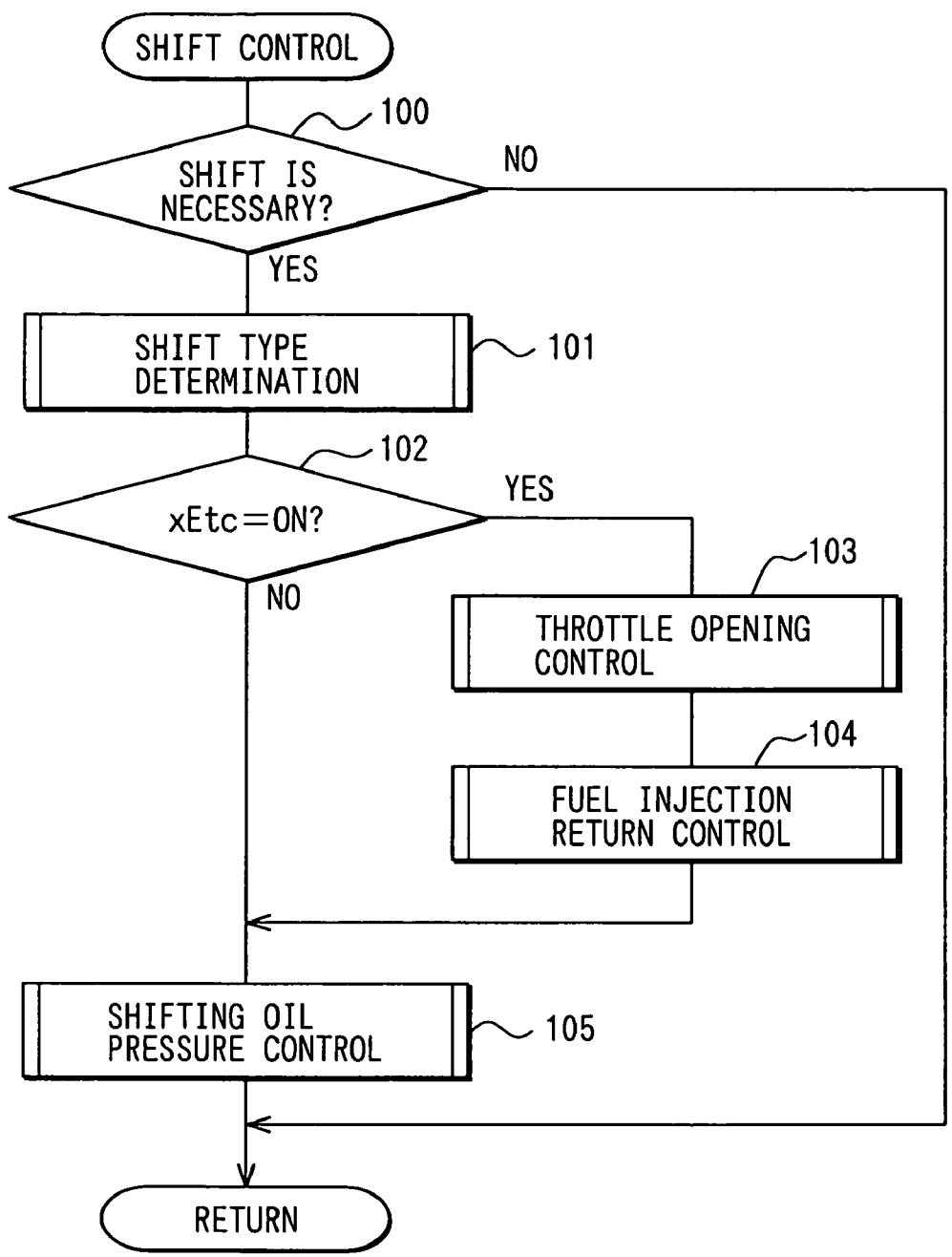
FIG. 8 is a flow chart showing a processing flow of a shift control routine in the first embodiment.

A shift control routine shown in FIG. 8 is a main routine of shift control which is executed at every predetermined time (e.g., every 8 to 32 msec) during engine operation. Once this routine is started, first in Step 100 it is determined whether a shift is necessary or not (whether a shift command has been outputted or not), and if a shift is not necessary, this routine is ended without performing any subsequent processing.

On the other hand, if a shift is necessary, the processing flow advances to Step 101, in which a shift type determination routine of FIG. 9 to be described later is executed to determine a shift type corresponding to the present shift command. Thereafter, the processing flow advances to Step 102, in which it is determined whether ETC Cooperation Down-Shift Execution Flag xEtc is set ON meaning that there exist ETC cooperation down-shift execution conditions. If the Flag xEtc is set OFF, the processing flow advances to Step 105, in which a shifting oil pressure control routine (not shown) according to the shift type is executed to make shift to the shift range conforming to the present shift command and this routine is ended.

Figure 10:
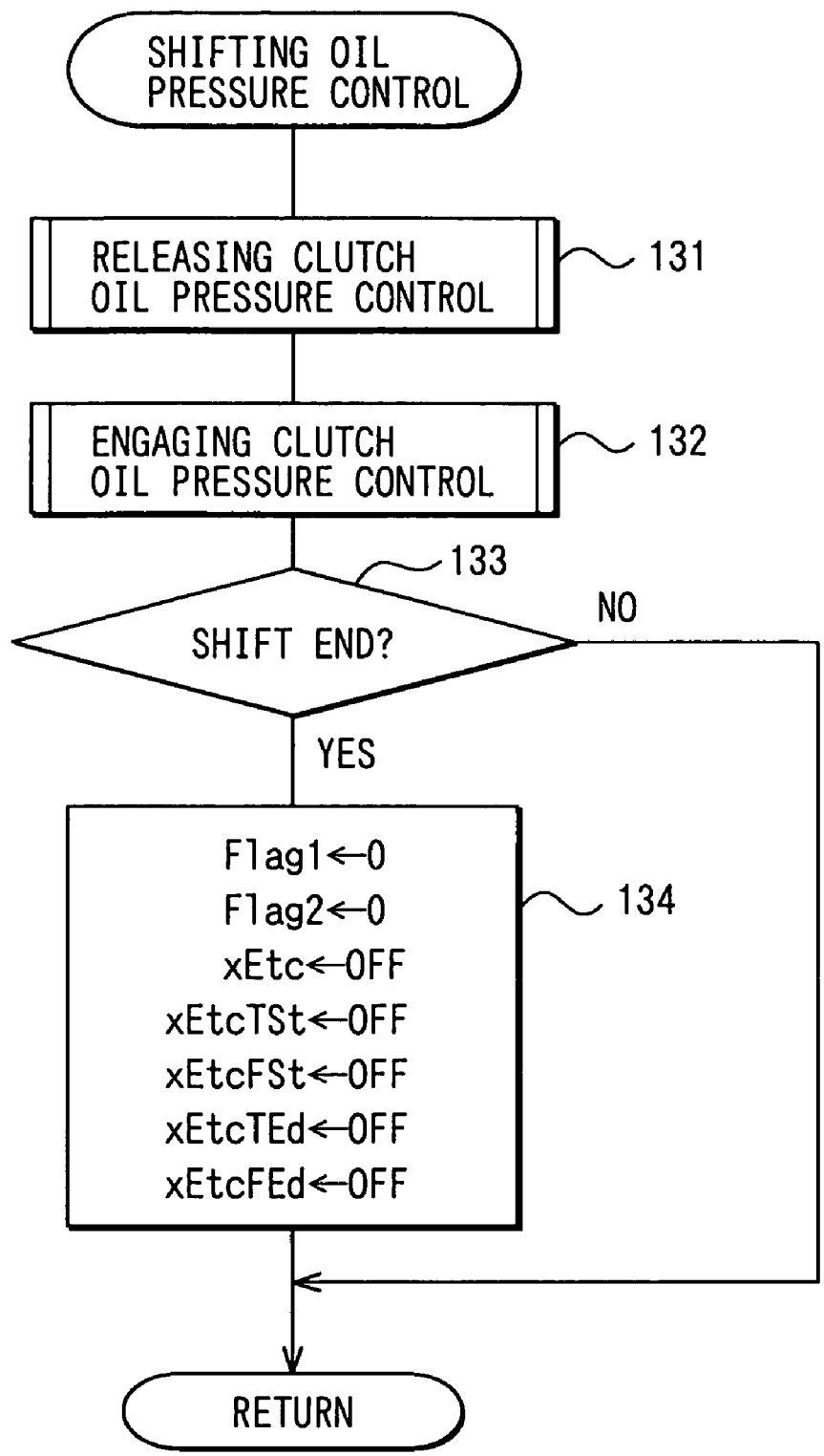
FIG. 10 is a flow chart showing a processing flow of a shifting oil pressure control routine in the first embodiment.

On the other hand, if ETC Cooperation Down-Shift Execution Flag xEtc is set ON, the processing flow advances from Step 102 to Step 103, in which a throttle opening control routine of FIG. 13 to be described later is started and a throttle opening control is executed, then in Step 104 which follows, a fuel injection return control routine of FIG. 18 to be described later is started and a fuel injection return control is executed. Thereafter, the processing flow advances to Step 105, in which a shifting oil pressure control routine of FIG. 10 is executed to make shift to the shift range conforming to the present shift command and this routine is ended.

[Shift Type Determination]

Figure 9:
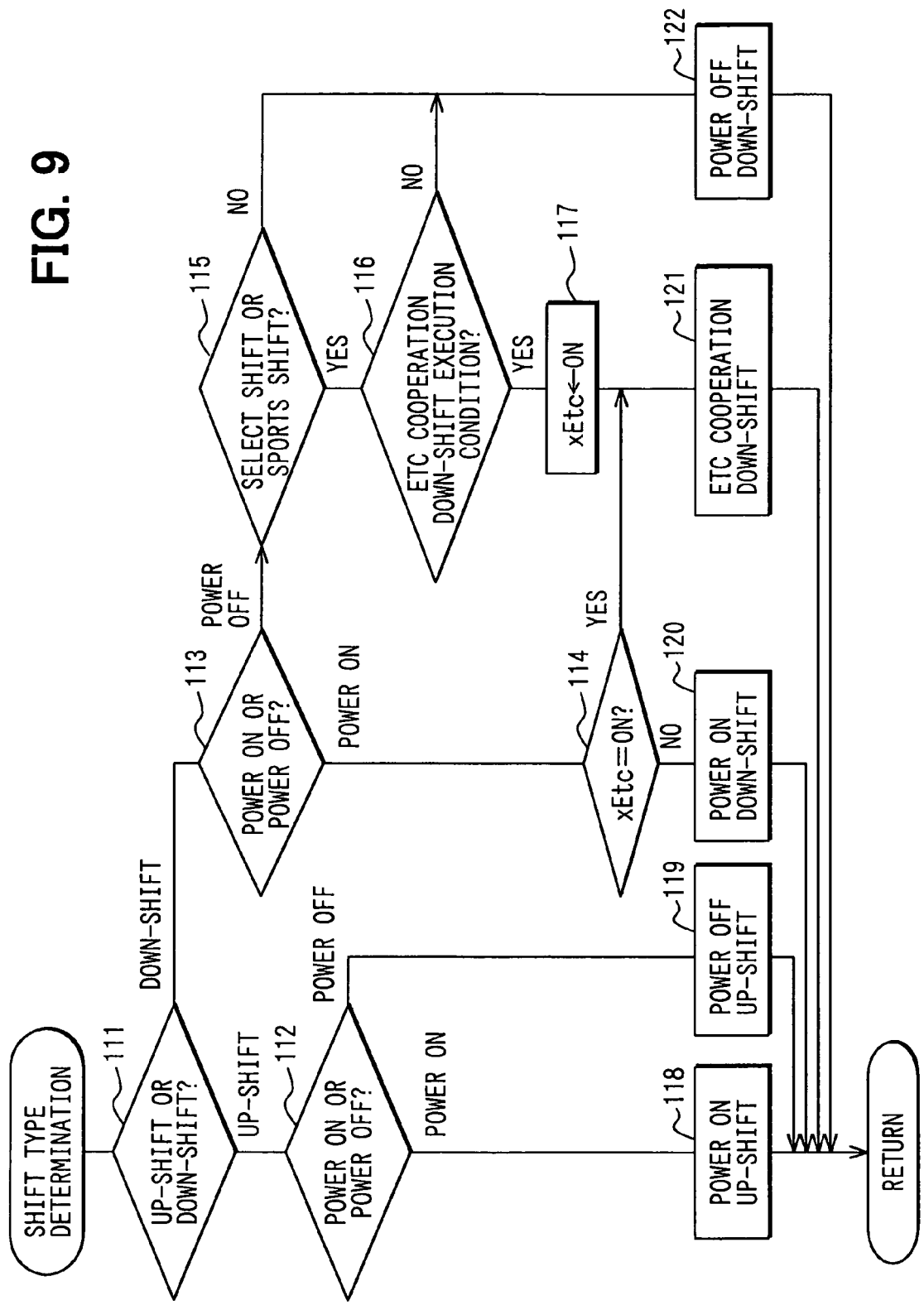
FIG. 9 is a flow chart showing a processing flow of a shift type determination routine in the first embodiment.

The following description is now provided about processing contents of a shift type determination routine of FIG. 9 which is executed in Step 101 in the shift control routine of FIG. 8. Once the shift type determination routine is started, first in Step 111 it is determined whether the present shift command concerns an up-shift or a down-shift, and if it is determined that the present shift command concerns an up-shift, the processing flow advances to Step 112, in which it is determined whether the load condition imposed on the automatic transmission 51 is power ON (the automatic transmission 51 is driven from the engine 11 side) or power OFF (the automatic transmission 51 is driven from the driving wheels side). Then, in accordance with the result of this determination it is determined whether the shift type conforming to the present shift command corresponds to which of a power ON up-shift (Step 118) and a power OFF up-shift (Step 119).

On the other hand, if it is determined in Step 111 that the present shift command concerns a down-shift, the processing flow advances to Step 113, in which it is determined whether the load condition imposed on the automatic transmission 51 is power ON or power OFF, and if it is determined to be power OFF, a check is made to see if the shift type is a down-shift based on the driver's intention of deceleration. In the case of either a select shift by operation of the shift lever 16 or a sports shift by operation of a switch mounted on the steering portion or by operation of the shift lever 16 in manual mode, it is determined that the present shift command concerns a down-shift based on the driver's intention of deceleration. Then, the processing advances to Step 116, in which it is determined whether an execution condition for ETC cooperation down-shift exists or not. For example, for ensuring controllability, it is determined whether the working oil temperature lies in a temperature range superior in response reproducibility to the oil pressure command value. If it is determined that the ETC cooperation down-shift execution condition exists, the processing flow advances to Step 117, in which ETC Cooperation Down-Shift Execution Flag xEtc is set ON. Thereafter, the processing flow advances to Step 121, in which it is determined that the present shift type is the ETC cooperation down-shift.

When it is determined in Step 115 that the present shift command concerns a down-shift based on the driver's intention of deceleration, or when it is determined in Step 116 that the ETC cooperation down-shift execution condition does not exist, the processing flow advances to Step 122, in which it is determined that the present shift type is a power OFF down-shift.

On the other hand, if power ON is determined in Step 113, the processing flow advances to Step 114 for distinguishing between power ON based on the ETC cooperation down-shift control (engine output increasing control) and power ON based on depression of the accelerator pedal 26. In Step 114 it is determined whether ETC Cooperation Down-Shift Execution Flag xEtc is set ON or not, and if it is set ON, the processing flow advances to Step 121, in which it is determined that the present shift type is the ETC cooperation down-shift. Then, if ETC Cooperation Down-Shift Execution Flag xEtc is set OFF, the processing flow advances to Step 120, in which it is determined that the present shift type is a power ON down-shift.

[Shifting Oil Pressure Control]

A shifting oil pressure control routine of FIG. 10 is executed when the shift type is the ETC cooperation down-shift. Once this routine is started, first in Step 131 there is executed a releasing clutch oil pressure control routine of FIG. 11 which will be described later to control the oil pressure of a releasing clutch. Then, in Step 132 which follows, an engaging clutch oil pressure control routine of FIG. 12 to be described later is executed to control the oil pressure of an engaging clutch.

Thereafter, the processing flow advances to Step 133, in which whether the down-shift has been completed or not is determined on the basis of whether Control Stage Flags 1 and 2 to be described later are equal to 4 and 5, respectively. Upon completion of the down-shift, the processing flow advances to Step 134, in which both Control Stage Flags 1 and 2 are reset to an initial value "0" and all the other Flags xEtc, xEtcTSt, xEtcFSt, xEtcTEd and xEtcFEd are reset to "OFF" to terminate this routine.

[Releasing Clutch Oil Pressure Control]

Figure 11:
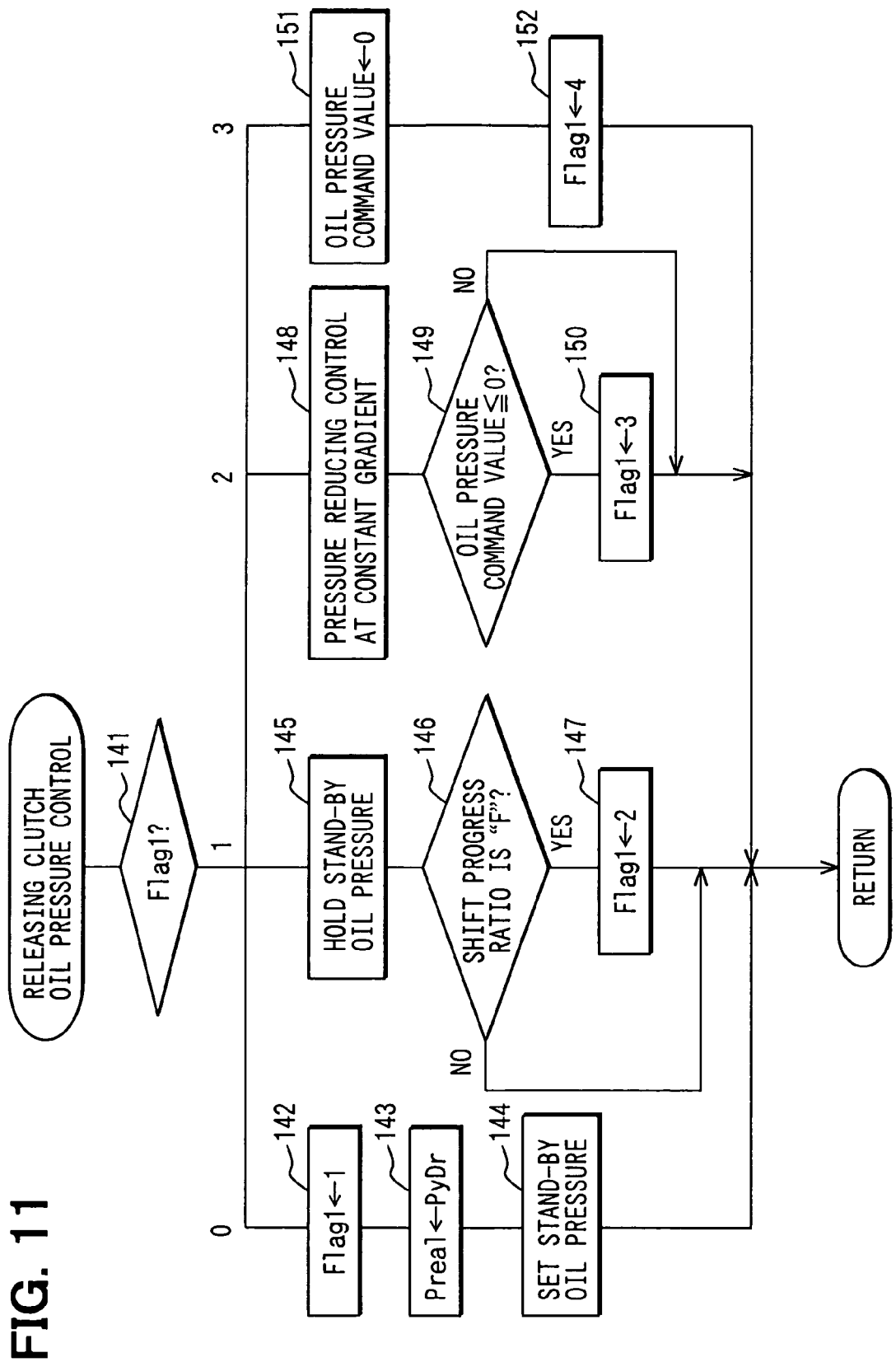
FIG. 11 is a flow chart showing a processing flow of a release-side clutch oil pressure control routine in the first embodiment.

Next, the following description is provided about processing contents of a releasing clutch oil pressure control routine of FIG. 11 which is executed in Step 131 in the shifting oil pressure control routine of FIG. 10. Once this routine is started, first in Step 141 it is determined in what stage the present releasing clutch oil pressure control lies. This determination is made on the basis of to which of 0 to 3 the value Control Stage Flag 1 corresponds. Control Stage Flag 1 is a flag which increments one at every progress to each stage in the releasing clutch oil control, with an initial value being 0 and a maximum value 4. Therefore, the releasing clutch oil pressure control is a four-stage sequence control.

At a time point t0 at which the releasing clutch oil pressure control is started, Control Stage Flag 1 is set to the initial value (0) and therefore the processing flow advances to Step 142, in which Control Stage Flag 1 is set to "1." Then, the processing flow advances to Step 143, in which an initial value of an estimated real oil pressure value Preal of a releasing clutch (y) which is controlled for release in the ETC cooperation down-shift of this time is updated by an oil pressure command value PyDr for the releasing clutch (y). Thereafter, the processing flow advances to Step 144, in which an oil pressure command value for the releasing clutch is set to the stand-by oil pressure PtDr and the oil pressure to be fed to the releasing clutch is thereby lowered to the stand-by oil pressure PtDr (first-stage control).

At the time of the next starting of this routine the Flag 1 is already equal to 1 and therefore the processing flow advances to Step 145, in which the oil pressure of the releasing clutch is held at the stand-by oil pressure PtDr. Then, in the next Step 146 it is determined whether the shift progress ratio SftR has reached a predetermined value F close to 100%, and if the answer is affirmative, this routine is ended. Thereafter, upon arrival of the shift progress ratio SftR at the predetermined value F the processing flow advances to Step 147, in which Control Stage Flag 1 is set to "2" and this second-stage control is ended, followed by shift to the third-stage control.

In the third-stage control, first in Step 148 the oil pressure command value for the releasing clutch is decreased at a constant gradient. Then, in the next Step 149, it is determined whether the oil pressure command value for the releasing clutch has decreased to a value of not larger than 0. This third-stage control (oil pressure decreasing control) is continued until the oil pressure command value for the releasing clutch decreases to a value of not larger than 0. Thereafter, when the oil pressure command value for the releasing clutch decreases to a minimum value (0 or smaller), the processing flow advances to Step 150, in which Control Stage Flag 1 is set to "3" and the third-stage control is ended, followed by shift to the fourth-stage control.

In the fourth-stage control, first in Step 151 the oil pressure command value for the releasing clutch is set to 0 to maintain the releasing clutch in a completely released state. Then, in the next step 152, Control Stage Flag 1 is set to "4" and the releasing clutch oil pressure control is ended.

[Engaging Clutch Oil Pressure Control]

Figure 12:
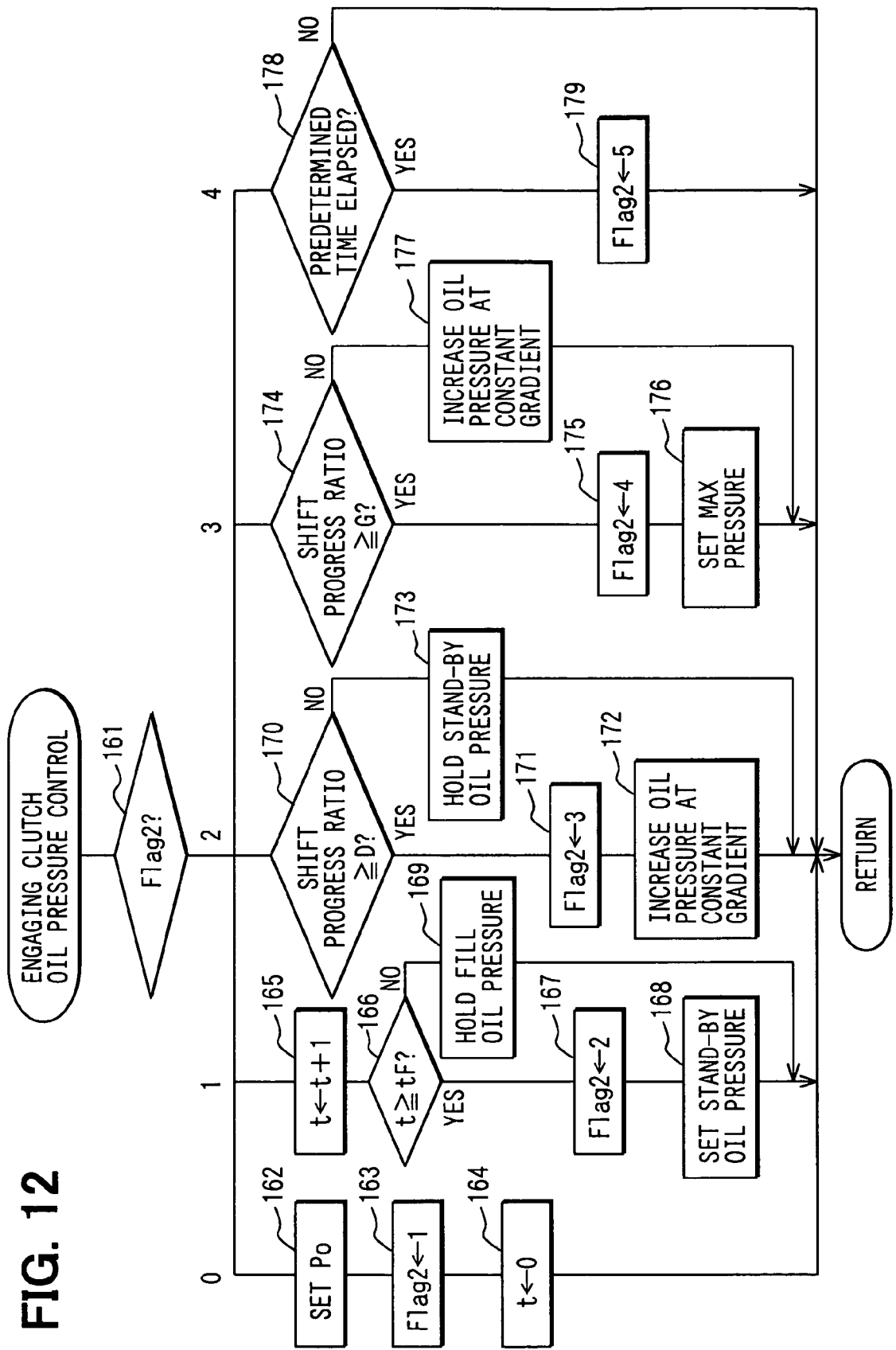
FIG. 12 is a flow chart showing a processing flow of an engagement-side clutch oil pressure control routine in the first embodiment.

Next, the following description is provided about processing contents of an engaging clutch oil pressure control routine of FIG. 12 which is executed in Step 132 in the shifting oil pressure control routine of FIG. 10. Once this routine is started, first in Step 161 it is determined in what stage the present engaging clutch oil pressure control lies. This determination is performed on the basis of to which of 0 to 4 the value of Control Stage Flag 2 corresponds. Control Stage Flag 2 is a flag which increments one at every progress to each stage in the engaging clutch oil pressure control, with an initial value being 0 and a maximum value 5. Thus, the engaging clutch oil pressure control is a five-stage sequence control.

At a time point t0 at which the engaging clutch oil pressure control is started, Control Stage Flag 2 is set to the initial value (0) and therefore the processing flow advances to Step 162, in which an oil pressure command value for the engaging clutch is set to a predetermined fill oil pressure Po and a fill control for filling the engaging clutch with working oil is executed. Then, in Step 163 which follows, Control Stage Flag 2 is set to "1" and thereafter the processing flow advances to Step 164, in which a timer (t) for counting the fill control time is reset to 0 to terminate this routine.

When this routine is started next time, Flag 2 is already set equal to 1 and therefore the processing flow advances to Step 165, in which the fill control time timer (t) is counted up to count the fill control time so far elapsed. Then, in Step 166 which follows, it is determined whether the value of the timer (t) has reached a predetermined time tF or longer. Until the fill control time reaches the predetermined time tF, the oil pressure command value for the engaging clutch is held at the fill oil pressure Po and the fill control is continued (Step 169).

The predetermined time tF is a time necessary for producing by the fill control a state just before the engaging clutch develops an engaging force and it is set beforehand by experiment or simulation.

Thereafter, when the fill control time reaches the predetermined time tF (when the state just before development of an engaging force by the engaging clutch is reached by the fill control), the processing flow advances to Step 167, in which Control Stage Flag 2 is set to "2." Then, in the next Step 168, the oil pressure command value for the engaging clutch is decreased to a stand-by oil pressure PtAp to terminate the fill control. Thereafter, the state just before development of an engaging force by the engaging clutch is held by the stand-by oil pressure PtAp.

When the oil pressure of the engaging clutch is controlled to the stand-by oil pressure PtAp, Control Stage Flag 2 is "2" and therefore the processing flow advances to Step 170, in which it is determined whether the shift progress ratio SftR has reached a predetermined value D (see FIG. 7) or larger. Until the shift progress ratio SftR reaches the predetermined value D or larger, the oil pressure command value for the engaging clutch is held at the stand-by oil pressure PtAp (Step 173).

Thereafter, upon arrival of the shift progress ratio SftR at the predetermined value D or larger, the processing flow advances to Step 171, in which Control Stage Flag 2 is set to "3." Then, in the next Step 172, a shift is made to a control in which the oil pressure command value for the engaging clutch is increased at a constant gradient.

Subsequently, when this routine is started, Control Stage Flag 2 is "3" and therefore the processing flow advances to Step 174, in which it is determined whether the shift progress ratio SftR has reached a predetermined value G close to 100%. Until the shift progress ratio SftR reaches the predetermined value G, the control for increasing the oil command value for the engaging clutch at a constant gradient is continued (Step 177).

Thereafter, upon arrival of the shift progress ratio SftR at the predetermined value G, the processing flow advances to Step 175, in which Control Stage Flag 2 is set to "4." Then, in the next Step 176, the oil pressure command value for the engaging clutch is set to a maximum pressure to increase the oil pressure of the engaging clutch up to the maximum pressure. With this control, the engaging force of the engaging clutch is increased in conformity with the timing of increase of the input shaft rotational speed Nt to a rotational speed equivalent to a lower shift range as a to-be-down-shifted range, and the down-shift is completed.

Subsequently, when this routine is started, since Control Stage Flag 2 is "4," the processing flow advances to Step 178, in which it is determined whether a predetermined time has elapsed after the setting of Control Stage Flag 2 to "4" (that is, whether the predetermined time as elapsed or not after arrival of the shift progress ratio at the predetermined value G). If the answer is affirmative, the processing flow advances to Step 179, in which Control Stage Flag 2 is set to "5" and the engaging clutch oil pressure control is ended.

[Throttle Opening Control]

Figure 13:
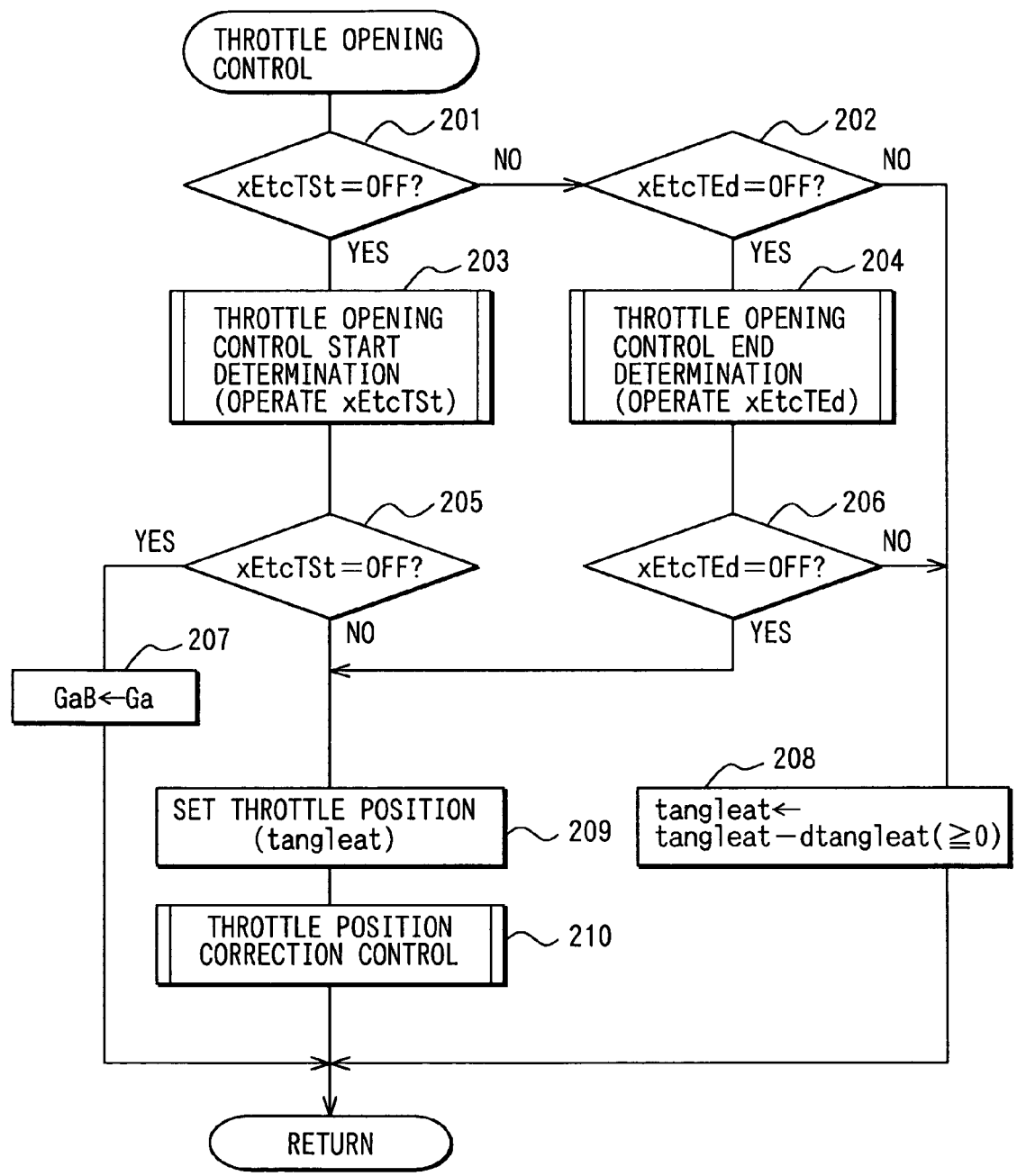
FIG. 13 is a flow chart showing a processing flow of a throttle angle control routine in the first embodiment.

A throttle opening control routine shown in FIG. 13 is a subroutine which is executed in the shift control routine of FIG. 8 and it plays a role as engine output increasing control recited in the appended claims.

When this routine is started, first in Step 201, it is determined whether Throttle Opening Control Start Flag xEtcTSt is OFF which means a state before start of the throttle opening control. If the Flag is OFF, the processing flow advances to Step 203, in which a throttle opening control start determination routine of FIG. 14 to be described later is executed and it is determined whether a throttle opening control start timing has been reached or not. Then, in accordance with the result of the determination Throttle Opening Control Start Flag xEtcTSt is set or reset.

Thereafter, the processing flow advances to Step 205, in which it is determined whether Throttle Opening Control Start Flag xEtcTSt remains OFF or not. If the Flag is OFF, the processing flow advances to Step 207, in which a stored value of intake air quantity before start of the throttle opening control is updated by the present value GaB detected by the air flow meter 14 and this routine is ended.

On the other hand, when it is determined in Step 205 that Throttle Opening Control Start Flag xEtcTSt is set ON, the processing flow advances to Step 209, in which a throttle angle command value tangleat (throttle opening quantity) is set using a throttle opening setting map of FIG. 17 and in accordance with a down-shift range, water temperature and input shaft rotational speed Nt. Thereafter, the processing flow advances to Step 210, in which a throttle opening quantity correction control routine of FIG. 16 to be described later is executed and this routine is ended.

If it is determined in Step 201 that Throttle Opening Control Start Flag xEtcTSt is ON which means that the throttle opening control is being executed, the processing flow advances to Step 202, in which it is determined whether Throttle Opening Control End Flag xEtcTEd is OFF which means a state before end of the throttle opening control. If the Flag is OFF, the processing flow advances to Step 204, in which a throttle opening control end determination routine of FIG. 15 to be described later is executed and a check is made to see if a throttle opening control end timing has reached or not. Then, Throttle Opening Control End Flag xEtcTEd is set or reset in accordance with the result of the determination.

Subsequently, the processing flow advances to Step 206, in which it is determined whether Throttle Opening Control End Flag xEtcTEd remains OFF or not. If the Flag is OFF, the processings of Steps 209 and 210 are executed and the throttle opening control is continued.

On the other hand, if it is determined in Step 206 that Throttle Opening Control End Flag xEtcTEd is set ON, the processing flow advances to Step 208, in which an end control involving decreasing the throttle opening command value tangleat in decrement of a predetermined quantity dtangleat to "0" at a predetermined gradient is executed.

[Throttle Opening Control Start Determination]

Figure 14:
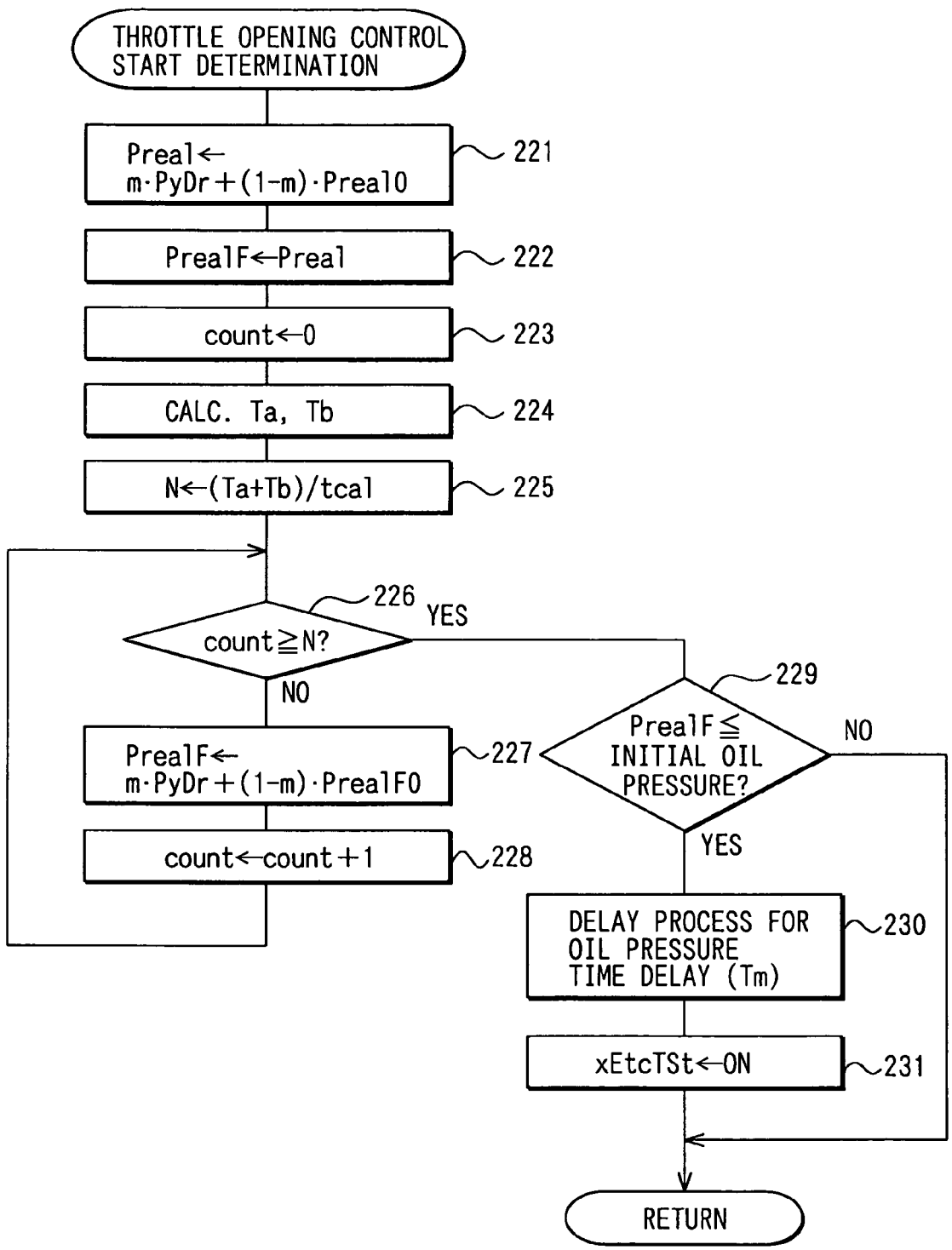
FIG. 14 is a flow chart showing a processing flow of a throttle angle control start determination routine in the first embodiment.

A throttle opening control start determination routine of FIG. 14 is a subroutine which is executed in Step 203 in the throttle opening control routine of FIG. 13 and it plays a role as output increase start timing control means recited in the appended claims.

When this routine is started, first in Step 221, an estimated real oil pressure value Preal of a releasing clutch (y) which is controlled for release in the ETC cooperation down-shift of this time is approximated using a first order lag system of an oil pressure command value PyDr for the releasing clutch (y) and is calculated by the following weighted averaging operation equation:

$$Preal = m \cdot PyDr + (1-m) \cdot PrealO$$

In the above equation, PrealO stands for an estimated real oil pressure value of the last time and m stands for weighted averaging coefficient (0<m<1). An initial value of the estimated real oil pressure value Preal is set to the oil pressure command value PyDr for the releasing clutch just before stand-by oil pressure setting in Step 143 in the releasing clutch oil pressure control routine of FIG. 11.

In the above equation the weighted averaging coefficient m may be a fixed value which is preset for simplification of the arithmetic processing, but taking into account the point that the responsivity of the real oil pressure to the oil pressure command value PyDr varies depending on oil temperature (viscosity of working oil) and the type of clutch, the weighted averaging coefficient m may be calculated using a map or a mathematical expression in accordance with oil temperature or the type of clutch.

After calculation of the estimated real oil pressure value Preal, the processing flow advances to Step 222, in which the estimated real oil pressure value Preal calculated this time is stored as an initial value of an estimated real oil pressure value PrealF in a response delay period which will be described later. Then, the processing flow advances to Step 223, in which a counter (count) for counting the number of times of calculation of the estimated real oil pressure value PrealF in the response delay period is reset to 0. Subsequently, the processing flow advances to Step 224, in which a response delay (Ta) of an opening motion of the throttle valve 15 and a response delay (Tb) in the period after actual opening of the throttle valve 15 until an increase of the engine output are calculated. In this case, as to the response delay (Ta) of an opening motion of the throttle valve 15, it is calculated using a map of parameters (e.g., cooling water temperature and battery voltage) associated with the drive responsivity of the motor 17 in the electronic throttle system. As to the response delay (Tb) in the period after opening of the throttle valve until an increase of the engine output, it is calculated using a delay in the period after introduction of intake air in an amount increased by opening of the throttle valve 15 into a cylinder until combustion and a map of parameters (e.g., engine speed and throttle angle) associated with the intake air flow velocity.

Thereafter, the number of times N of calculation of the estimated real oil pressure value PrealF in the total time (Ta+Tb) of the above two response delays is calculated.

$$N = (Ta + Tb)/tcal$$

In the above equation, tcal stands for a calculation cycle of the estimated real oil pressure value Preal. The number of times N of calculation is calculated to an integer value by omission or rounding of decimals.

Thereafter, the processing flow advances to Step 226, in which it is determined whether the value of the counter (count) has reached the N or not. If the answer is negative, the processing flow advances to Step 227, in which the estimated real oil pressure value PrealF in the response delay period is approximated by a first order lag system of the oil pressure command value PyDr and is calculated by the following weighted averaging operation equation:

$$PrealF = m \cdot PyDr + (1-m) \cdot PrealFO$$

In the above equation, PrealFO stands for an estimated real oil pressure value PrealF of the last time and m stands for the weighted averaging coefficient (0<m<1). Thereafter, in Step 228, the counter (count) is counted up for return to Step 226. By repeating such processings, the calculation of the estimated real oil pressure value PrealF in the response delay period is repeated until the value of the counter (count) reaches the foregoing N.

Upon arrival of the counter (count) value at the foregoing N, the processing flow advances from Step 226 to Step 229, in which it is determined whether the estimated real oil pressure value PrealF has decreased to an initial oil pressure (a predetermined transfer torque capacity-equivalent oil pressure) or lower. The initial oil pressure (a predetermined transfer torque capacity-equivalent oil pressure) is set to such an oil pressure as does not cause an acceleration feeling even when the transfer torque capacity of the releasing clutch becomes small or zero and the engine output increases. The initial oil pressure may be a preset fixed value for simplification of the arithmetic processing, but taking into account the point that the oil pressure not causing an acceleration feeling even with an increase of the engine output varies depending on the type of clutch and input torque Tin, the initial oil pressure may be calculated using a map or a mathematical expression in accordance the type of clutch of input torque Tin.

The input torque Tin may be estimated for example by the following equation on the basis of engine operating conditions and characteristics of the torque converter 52:

$$Tin = C(e) \times tr(e) \times Ne^2$$

C (e): torque converter capacity coefficient
Tr (e): torque ratio
Ne: engine speed The torque converter capacity coefficient C (e) and the torque ratio tr (e) are each calculated using a map or a mathematical expression in accordance with a speed ratio (e) (=Nt/Ne).

There also may be adopted a method wherein an output torque of the engine 11 is calculated on the basis of an intake air quantity or a throttle angle and is then multiplied by the above torque ratio tr (e) to obtain an input shaft torque Tin.

When it is determined in Step 229 that the estimated real oil pressure value PrealF has not been decreased to the initial oil pressure or less, this routine is ended. Then, upon decrease of the estimated real oil pressure value PrealF to the initial oil pressure or less, the processing flow advances to Step 230, in which there is performed a delay processing for a time delay Tm in oil pressure response. Thereafter, the processing flow advances to Step 231, in which Throttle Opening Control Start Flag xEtcTst is set ON and this routine is ended.

[Throttle Opening Control End Determination]

Figure 15:
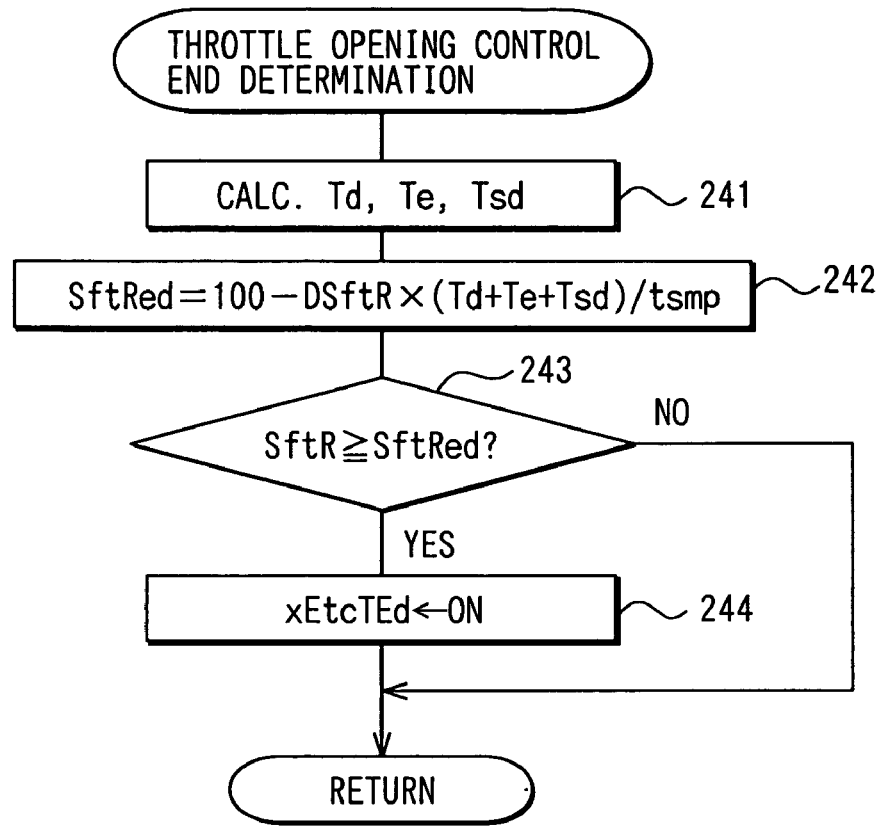
FIG. 15 is a flow chart showing a processing flow of a throttle angle control end determination routine in the first embodiment.

A throttle opening control end determination routine of FIG. 15 is a subroutine which is executed in Step 204 in the throttle opening control routine of FIG. 13, playing a role as output increase end timing control means recited in the appended claims. Once this routine is started, first in Step 241 there are calculated a response delay (Td) of a full closing motion of the throttle valve 15, a response delay (Te) in the period after actual full closing of the throttle valve 15 until actual disappearance of the engine output increase, and time (Tsd) required after end determination until decrease of a throttle opening command value to "0." As to the response delay (Td) of a closing motion of the throttle valve 15, it is calculated using a map of parameters (e.g., cooling water temperature and battery voltage) associated with the drive responsivity of the motor 17 in the electronic throttle system. As to the response delay (Te) in the period after full closing of the throttle valve 15 until disappearance of the engine output increase, it is calculated using a delay in the period after introduction of intake air in an amount decreased by full closing of the throttle valve 15 until combustion and a map of parameters (e.g, engine speed and throttle angle) associated with the intake air flow velocity. Further, as to the time (Tsd) in the period after end determination until decrease of a throttle opening command value to "0," it is calculated on the basis of a throttle opening command value decreasing gradient. The process of Step 241 plays a role as response delay calculating means recited in the appended claims.

Thereafter, the processing flow advances to Step 242, in which a shift progress ratio SftRed at the end of the throttle opening control (at the start of end control) is calculated by the following equation:

$$Sft\text{Red}=100-DSftR\times(Td+Te+Tsd)/tsmp$$

In the above equation, DSftR stands for a change quantity (this time value–last time value) per calculation cycle of the shift progress ratio SftR and tsmp stands for a calculation cycle of DSftR. The shift progress ratio SftRed at the end of the throttle opening control (at the start of end control) is set in accordance with the above equation and taking into account a system response delay (Td+Te+Tsd) associated with the end of the throttle opening control relative to an after-shift gear ratio (SftR=100%).

Thereafter, the processing flow advances to Step 243, in which it is determined whether the present shift progress ratio SftR has reached the above SftRed or more. If the answer is negative, this routine is ended. Then, upon arrival of the shift progress ratio SftR at the above SftRed, it is determined that a predetermined state corresponding to a substantial end of the down-shift has been reached, and the processing flow advances to Step 244, in which Throttle Opening Control End Flag xEtcTEd is set ON.

[Throttle Opening Quantity Correction Control]

Figure 16:
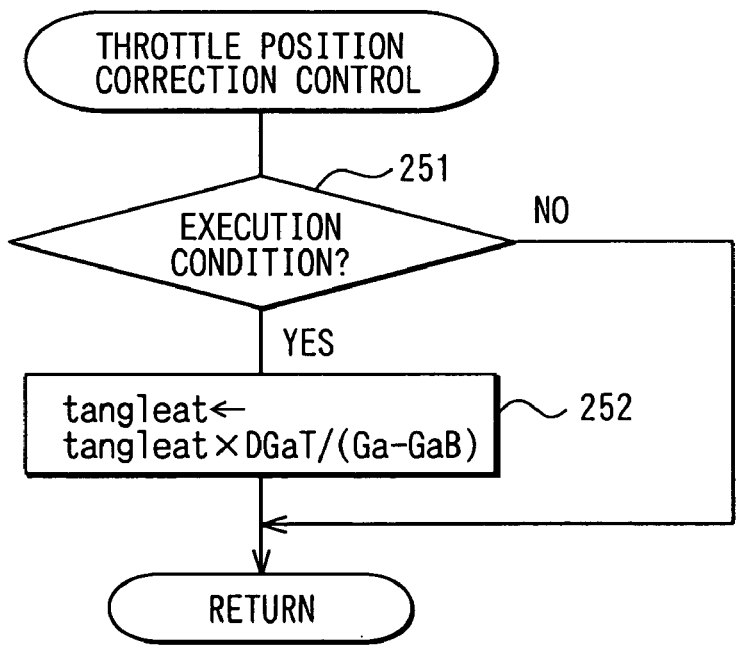
FIG. 16 is a flow chart showing a processing flow of a throttle angle correction routine in the first embodiment.

A throttle opening quantity correction control routine of FIG. 16 is a subroutine which is executed in Step 210 in the throttle opening control routine of FIG. 13. Once this routine is started, first in Step 251 it is determined whether an execution condition for a throttle opening quantity correction control exists or not. For example, this determination is made on the basis of whether an elapsed time after the issuance of a throttle opening command is a response delay-equivalent time or longer. If the said elapsed time is shorter than the response delay-equivalent time, the execution condition for the throttle opening quantity correction control is not established and this routine is ended. Upon subsequent arrival of the said elapsed time at the response delay-equivalent time or longer, the execution condition for the throttle opening quantity correction control is established and the processing flow advances to Step 252, in which the throttle angle command value tangleat (throttle opening quantity) is corrected by the following equation:

$$\text{tangleat}=\text{tangleat}\times DGaT/(Ga-GaB)$$

In the above equation, DGaT stands for a target increment value of the intake air quantity Ga by the throttle opening control and it is set using a table or the like in accordance with the throttle angle command value tangleat, and GaB stands for an intake air quantity just before start of the throttle opening control which has been stored in Step 207 in the throttle opening control routine of FIG. 13. By correcting the throttle angle command value tangleat (throttle opening quantity in accordance with the above equation there are corrected variation in system manufacture, variations caused by secular change, and variations based on operating conditions such as atmospheric pressure and intake air temperature.

[Fuel Injection Return Control]

Figure 18:
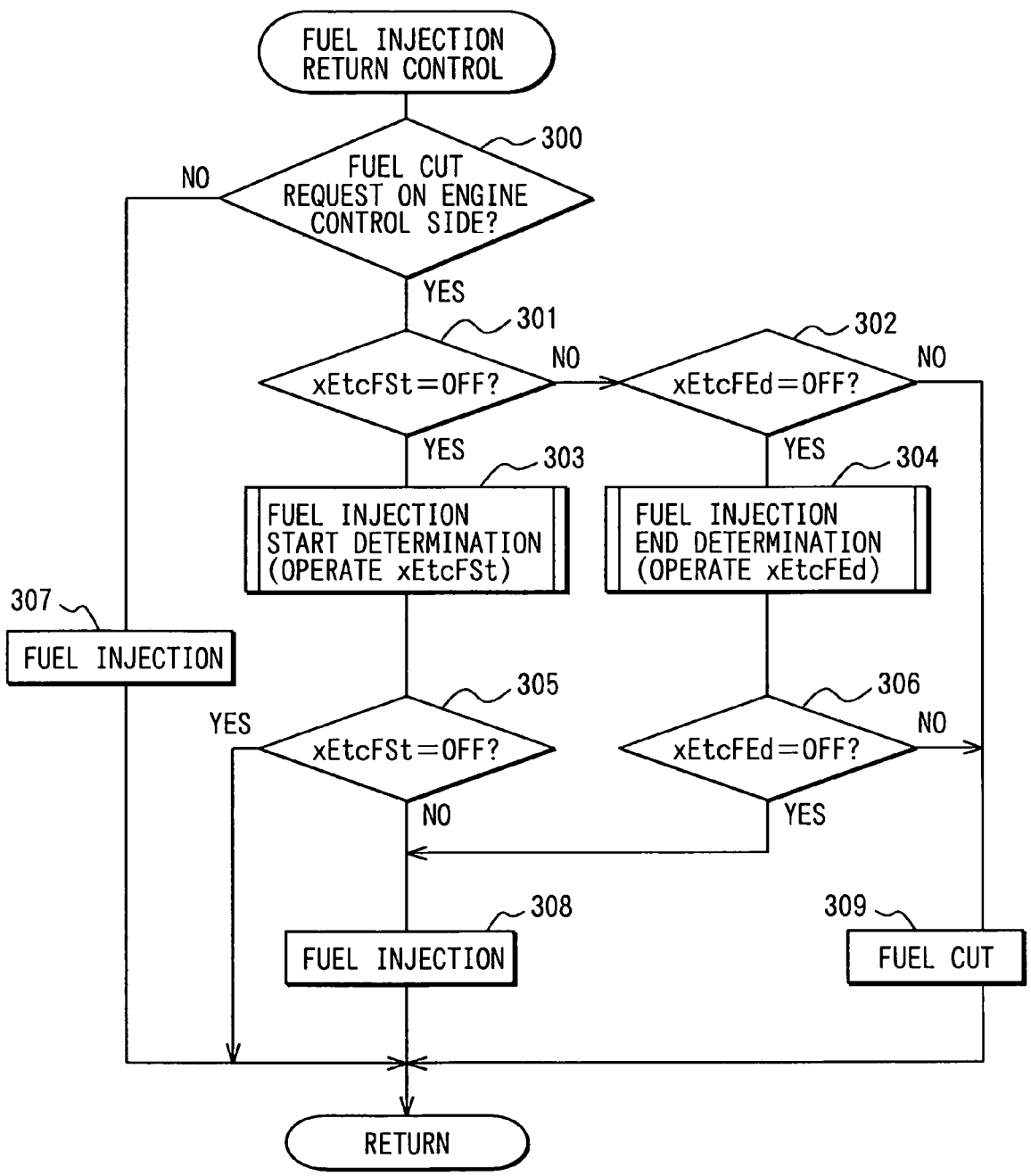
FIG. 18 is a flow chart showing a processing flow of a fuel injection return control routine in the first embodiment.

A fuel injection return control routine of FIG. 18 is a subroutine executed in Step 104 in the shift control routine of FIG. 8, playing a role as engine output increasing control means recited in the appended claims. Once this routine is started, first in Step 300 it is determined whether there is a request for fuel cut on the engine side, and if the answer is negative, the processing flow advances to Step 307, in which the fuel injection is continued.

On the other hand, if it is determined in Step 300 that there is a request for fuel cut (fuel is being cut), the processing flow advances to Step 301, in which it is determined whether Fuel Injection Return Control Start Flag xEtcFSt is OFF which means a state before start of the fuel injection return control. If the Flag is OFF, the processing flow advances to Step 303, in which a fuel injection start determination routine of FIG. 19 to be described later is executed and a check is made to see if a start timing of the fuel injection return control has been reached or not. Then, Fuel Injection Return Control Start Flag xEtcFSt is set or reset in accordance with the result of the determination.

Subsequently, the processing flow advances to Step 305, in which it is determined whether Fuel Injection Return Control Start Flag xEtcFSt remains OFF or not. If the Flag remains OFF, this routine is ended, while if it is determined that the Flag is set ON, the processing flow advances to Step 308, in which fuel injection is performed.

If it is determined in Step 301 that Fuel Injection Return Control Start Flag xEtcFSt is ON which means a state of the fuel injection return control being under execution, the processing flow advances to Step 302, in which it is determined whether Fuel Injection Return Control End Flag xEtcFEd is OFF meaning a state before end of the fuel injection return control. If the Flag is OFF, the processing flow advances to Step 304, in which a fuel injection return control end determination routine of FIG. 20 to be described later is executed and a check is made to see if an end timing of the fuel injection return control has been reached or not. Then, Fuel Injection Return Control End Flag xEtcFEd is set or reset in accordance with the result of the determination.

Thereafter, the processing flow advances to Step 306, in which it is determined whether Fuel Injection Return Control End Flag xEtcFEd remains OFF or not. If the Flag remains OFF, the processing flow advances to Step 308, in which fuel injection is performed.

If it is determined in Step 306 that Fuel Injection Return Control End Flag xEtcFEd is ON meaning the end of the fuel injection return control, the processing flow advances to Step 309, in which fuel cut is resumed.

[Fuel Injection Start Determination]

Figure 19:
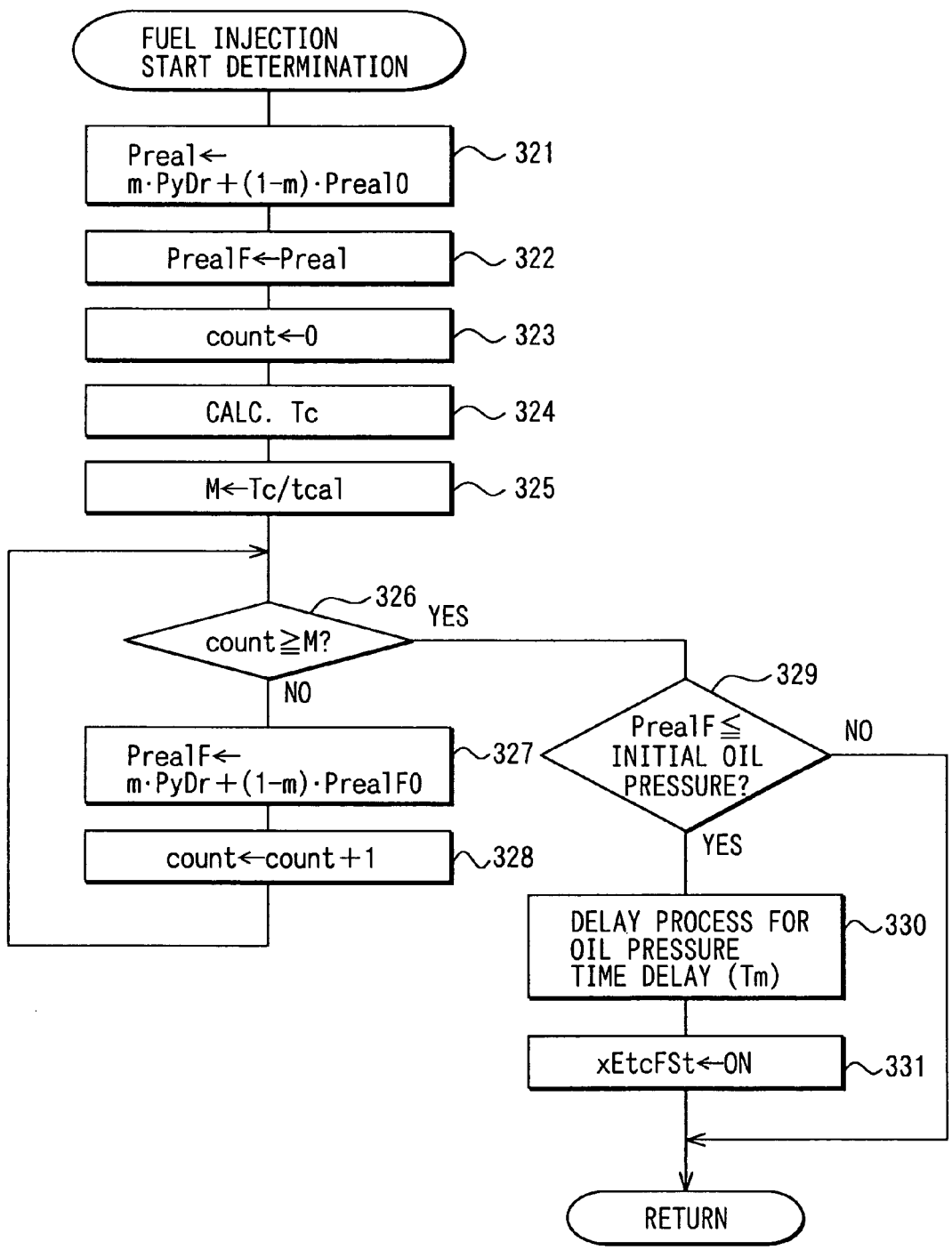
FIG. 19 is a flow chart showing a processing flow of a fuel injection start determination routine in the first embodiment.

A fuel injection start determination routine of FIG. 19 is a subroutine which is executed in Step 303 in the fuel injection return control routine of FIG. 18, playing a role as output increase start timing control means recited in the appended claims.

Once this routine is started, first in Step 321, an estimated real oil pressure value Preal of a releasing clutch of this time is calculated by the following weighted averaging operation equation in the same way as in Step 221 in FIG. 14 and using an oil pressure command value PyDr for the releasing clutch, an estimated real oil pressure value PrealO of this time and the weighted averaging coefficient m:

$$Preal=m \cdot PyDr+(1-m) \cdot PrealO$$

Thereafter, the processing flow advances to Step 322, in which the estimated real oil pressure value Preal calculated this time is stored as an initial value of an estimated real oil pressure value PrealF in a response delay period to be described later. Then, the processing flow advances to Step 323, in which the counter (count) for counting the number of times of calculation of the real oil pressure estimated value PrealF in the response delay period is reset to 0. Subsequently, the processing flow advances to Step 324, in which a response delay (Tc) in the period after resuming of fuel injection until an increase of engine output is calculated. In this case, time T720° C.A required for the crankshaft to rotate 720° C.A is calculated as the response delay (Tc).

Thereafter, the processing flow advances to Step 325, in which the number of times M of calculation of the estimated real oil pressure value PrealF in the response delay (Tc) is calculated.

$$M=Tc/tcal$$

In the above equation, tcal stands for a calculation period of the estimated real oil pressure value Preal. The number of times M of calculation is calculated to an integer value by omission or rounding of decimals.

Subsequently, the processing flow advances to Step 326, in which it is determined whether the value of the counter (count) has reached the above M or not. If the answer is negative, the processing flow advances to Step 327, in which the estimated real oil pressure value PrealF in the response delay period is calculated by the weighted averaging operation of the oil pressure command value PyDr.

$$PrealF=m \cdot PyDr+(1-m) \cdot PrealFO$$

Thereafter, in Step 328, the counter (count) is counted up and the processing flow returns to Step 326. By repeating such processings, the calculation of the estimated real oil pressure value PrealF in the response delay period is repeated until the value of the counter (count) reaches the above M.

Upon arrival of the counter (count) value at the above M, the processing flow advances from Step 326 to Step 329, in which, as in Step 229 shown in FIG. 14, it is determined whether the estimated real oil pressure value PrealF has decreased to an initial oil pressure (a predetermined transfer torque capacity-equivalent oil pressure) or lower. The initial oil pressure (a predetermined transfer torque-equivalent oil pressure) is set to such an oil pressure as does not create an acceleration feeling even when the transfer torque capacity on the releasing clutch becomes small or zero and the engine output increases. When it is determined in Step 329 that the estimated real oil pressure value PrealF has not yet decreased to the initial oil pressure or lower, this routine is ended. Then, when the estimated real oil pressure value has decreased to the initial oil pressure or lower, the processing flow advances to Step 330, in which there is performed a delay processing for a time delay Tm in oil pressure response. Then, the processing flow advances to Step 331, in which Fuel Injection Return Control Start Flag xEtcFSt is set ON and this routine is ended.

[Fuel Injection End Determination]

Figure 20:
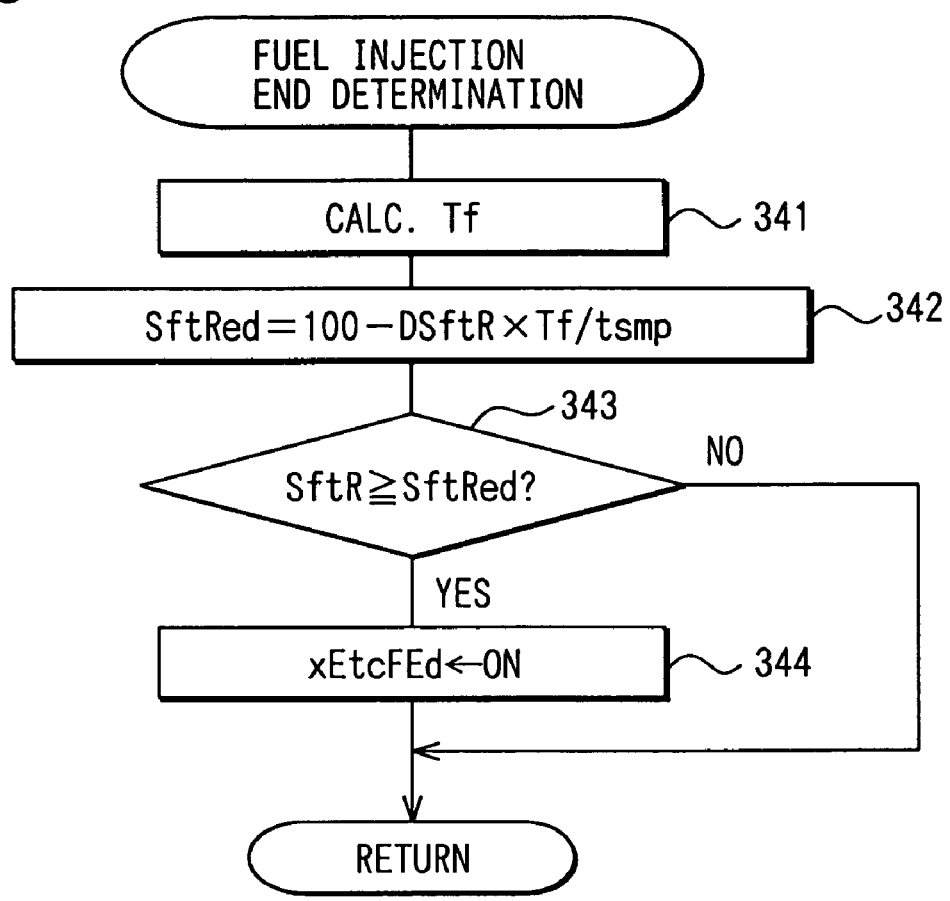
FIG. 20 is a flow chart showing a processing flow of a fuel injection end determination routine in the first embodiment.

A fuel injection end determination routine of FIG. 20 is a subroutine which is executed in Step 304 in the fuel injection return control routine of FIG. 18, playing a role as output increase end timing control means recited in the appended claims. Once this routine is started, first in Step 341, a response delay (Tf) in the period after resuming of fuel cut until disappearance of engine output is calculated. In this case, time T720° C.A required for the crankshaft to rotate 720° C.A is calculated as the response delay (Tf).

Thereafter, the processing flow advances to Step 342, in which a shift progress ratio SftRed at the end of the fuel injection return control (at the start of end control) is calculated by the following equation:

$$SftRed=100-DSftR \times Tf/tsmp$$

In the above equation, DSftR stands for a change quantity (this time value−last time value of SftR) per calculation cycle of the shift progress ratio SftR and tsmp stands for a calculation cycle of DSftR. In accordance with the above equation the shift progress ratio SftRed at the end of the fuel injection return control (at the start of end control) is set taking into account the response delay (Tf) of the system associated with the end of the fuel injection return control relative to an after-shift gear ratio (SftR=100%).

Thereafter, the processing flow advances to Step 343, in which it is determined whether the present shift progress ratio SftR has reached the SftRed or higher, and if the answer is negative, this routine is ended. Upon arrival of the shift progress ratio SftR at the above SftRed, the processing flow advances to Step 344, in which Fuel Injection Return Control End Flag xEtcFEd is set ON.

According to this first embodiment described above, in the system which, when ETC cooperation down-shift is to be performed on the basis of the driver's intention of deceleration, makes an engine output increasing control for increasing the engine output without depending on the driver's accelerator operation, a start timing of the engine output increasing control (throttle opening control and fuel injection return control) is set at a time point when the real oil pressure estimated value PrealF of the releasing clutch decreases to an initial oil pressure (a predetermined transfer torque-equivalent oil pressure) or lower. Therefore, in ETC cooperation down-shift, the engine output increasing control can be started when the oil pressure of the releasing clutch decreases to a level of not higher than a predetermined transfer torque capacity-equivalent oil pressure at which neither an acceleration feeling nor a shock occurs even upon starting of the engine output increasing control. Thus, the start timing of the engine output increasing control can be set with a high accuracy and the driver is not given an acceleration feeling or a shock by the engine output increasing control. Besides, since the start timing of the engine output increasing control can be set without depending on the timer, the engine output increasing control can be executed by a simple logic configuration and the setting of reduced parameters. Thus, there also accrues an advantage that the practical application of the controller is easy.

In this first embodiment, moreover, it is taken into account that an initial oil pressure which causes neither an acceleration feeling nor a shock even upon starting of the engine output increasing control during ETC cooperation down-shift varies depending on the input torque of the speed change gear mechanism 55 and the type of the releasing clutch, and the initial oil pressure is set on the basis of an estimated value of the input torque and the type of the releasing clutch. Therefore, an initial oil pressure not causing an acceleration feeling or a shock can be set without excess or deficiency in accordance with the input torque of the shift mechanism and the type of the releasing clutch. Thus, there is an advantage that the start timing setting accuracy for the engine output increasing control can be further improved.

According to this first embodiment described above, in the system which, when performing ETC cooperation down-shift on the basis of the driver's intention of deceleration, makes an engine output increasing control for increasing the engine output without depending on the driver's accelerator operation, the time point at which the down-shift is determined to have reached a predetermined substantial end state is determined to be an end timing of the engine output increasing control (throttle opening control and fuel injection return control). Therefore, when performing a down-shift on the basis of the driver's intention of deceleration, the engine output can be decreased to a proper value (a value free of output increase) in conformity with the timing at which the engaging clutch has come to possess a transfer torque capacity necessary for completion of the down-shift, and thus it is possible to prevent the occurrence of an unpleasant shock such as a push-out feeling or a deceleration shock at the end of the engine output increasing control.

In this first embodiment, moreover, the shift progress ratio SftRed at the end of the engine output increasing control (at the start of end control) is set taking into account a response delay of the system at the end of the engine output increasing control relative to the shift progress ratio (SftR=100%) after shift, then upon arrival of the shift progress ratio SftR at the shift progress ratio SftRed during the engine output increasing control, it is determined that a predetermined state corresponding to a substantial end of the down-shift has been reached, and the engine output increasing control is ended. Therefore, an end timing of the engine output increasing control can be set more appropriately in anticipation of a response delay of the system associated with the end of the same control.

Further, since an end timing of the engine output increasing control is determined on the basis of a change DSftR of the shift progress ratio SftR[=100×(input shaft rotational speed Nt−output shaft rotational speed No×gear ratio before shift)/(output shaft rotational speed No×gear ratio after shift−output shaft rotational speed No×gear ratio before shift)], i.e., a change in gear ratio (input shaft rotational speed Nt/output shaft rotation speed No), it is also possible to compensate for a change in vehicle speed during a down-shift caused by a change of the output shaft rotational speed No, i.e., a change in running resistance based on a road surface gradient, whether the brakes have been applied or not and whether the braking force is large or small.

Further, in this first embodiment, a start timing of the engine output increasing control is set at a time point at which the estimated real oil pressure value PrealF of the releasing clutch decreases to an initial oil pressure (a predetermined transfer torque capacity-equivalent oil pressure) or lower. Therefore, in ETC cooperation down-shift, the engine output increasing control can be started at a time point at which the oil pressure of the releasing clutch decreases to a level of not higher than a predetermined transfer torque capacity-equivalent oil pressure causing neither an acceleration feeling nor a shock even upon starting of the engine output increasing control. As a result, a start timing of the engine output increasing control can be set with a high accuracy and it is possible to prevent the driver from receiving an acceleration feeling or a shock by the engine output increasing control. Besides, since it is possible to set a start timing of the engine output increasing control without dependency on the timer, the same control can be performed by a simple logic configuration and the setting of reduced parameters, and thus there also accrues an advantage that the practical application of the controller is easy.

Further, in this first embodiment, it is taken into account that an initial oil pressure causing neither an acceleration feeling nor a shock even upon starting of the engine output increasing control during ETC cooperation down-shift varies depending on the input torque of the speed change gear mechanism 55 and the type of the releasing torque, and the initial oil pressure is set on the basis of an estimated value of input torque and the type of the releasing clutch. Therefore, an initial oil pressure causing neither an acceleration feeling nor a shock can be set without excess or deficiency in accordance with the input torque of the shift mechanism and the type of the releasing clutch. Thus, there also is an advantage that the start timing setting accuracy for the engine output increasing control can be further improved.

In this first embodiment, moreover, the response of a real oil pressure relative to the oil pressure command value for the releasing clutch is approximated by the transfer characteristic "first order lag+time delay" and the real oil pressure of the releasing clutch is calculated by the weighted averaging calculation based on the oil pressure command value. Therefore, the real oil pressure of the releasing clutch can be calculated in an extremely simple manner.

Second Embodiment

Figure 21:
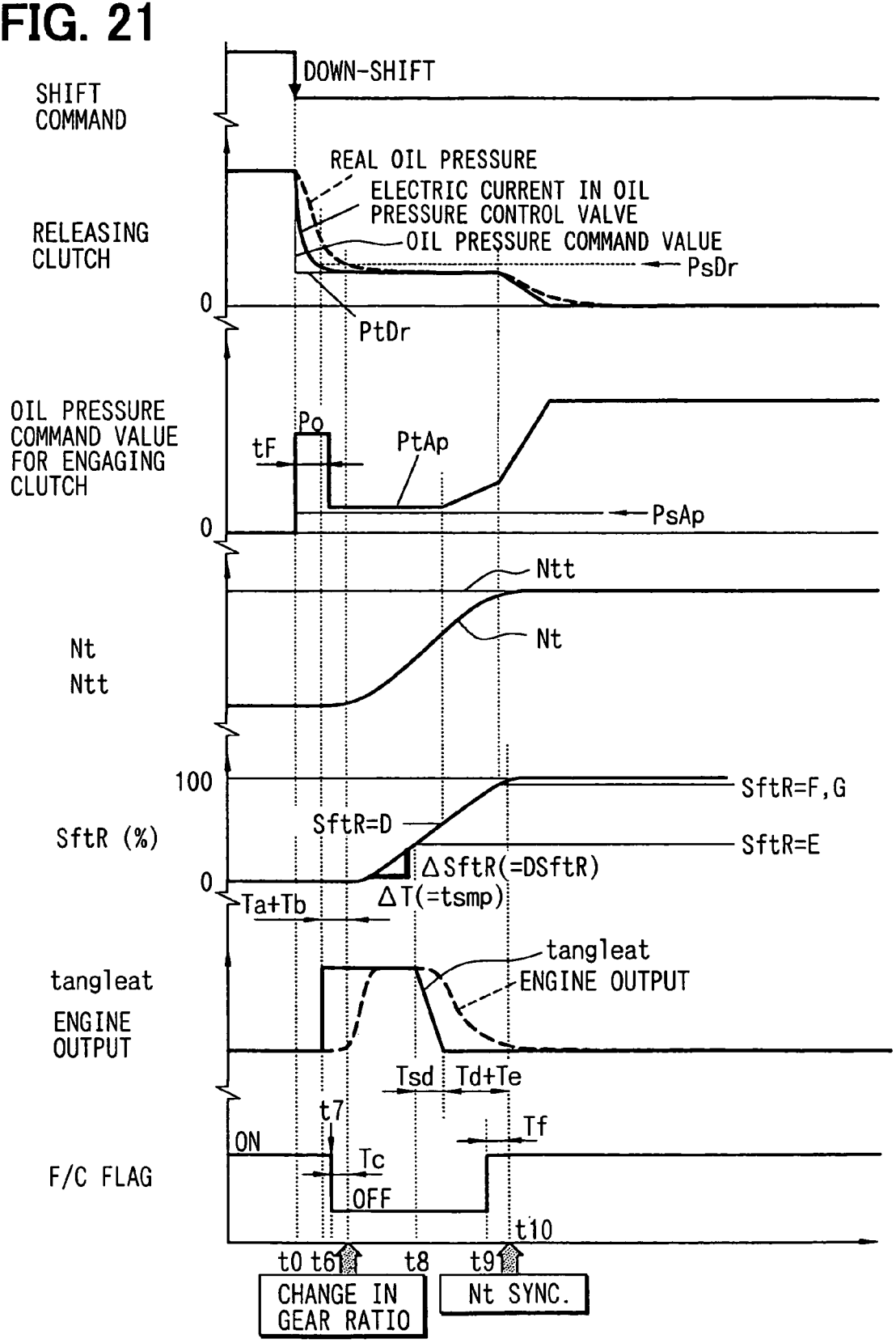
FIG. 21 is a time chart showing an example of an ETC cooperation down-shift control in a second embodiment of the present invention.

Thus, in the above first embodiment the response of a real oil pressure relative to the oil pressure command value of the releasing clutch is approximated by the transfer characteristic "first order lag+time delay" and the real oil pressure of the releasing clutch is calculated by the weighted averaging calculation based on the oil pressure command value. But in a second embodiment of the present invention, which is illustrated in FIG. 21, attention is paid to the existence of a correlation between an electric current value of an oil pressure control valve (electromagnetic valve) for controlling the oil pressure of the releasing clutch and the amount of operation, and hence oil pressure, of the oil control valve, then the response of a real oil pressure relative to a detected electric current value of the oil pressure control valve is approximated by the transfer characteristic "first order lag+time delay" and a real oil pressure of the releasing clutch is calculated by the weighted averaging calculation of an oil pressure command value. In this second embodiment it is the following processings that are different from the processings in the first embodiment.

(1) According to this second embodiment, in Step 143 in the releasing clutch oil pressure control routine of FIG. 11, an electric current value of the oil pressure control valve for controlling the oil pressure of the releasing clutch is detected, then this detected electric current value is converted to an oil pressure with use of a map constructed beforehand on the basis of experiment data or the like or by a mathematical expression, and the thus-converted oil pressure value is stored as an initial value of an estimated real oil pressure value Preal of the releasing clutch in the present stage.

(2) According to this second embodiment, in Step 221 in the throttle opening control start determination routine of FIG. 14 and Step 321 in the fuel injection start determination routine of FIG. 19, an electric current value of the oil pressure control valve is detected, then this detected electric current value is converted to an oil pressure Pcon with use of a map or a mathematical expression, and using this converted oil pressure value Pcon, an estimated real oil pressure value Preal of the releasing clutch of this time is calculated by the following weighted averaging operation equation:

$$Preal = m \cdot Pcon + (1-m) \cdot PrealO$$

In the above equation, PrealO stands for an estimated real oil pressure value of last time and m stands for the weighted averaging coefficient (0<m<1). As an initial value of the estimated real oil pressure value Preal there is used the foregoing value.

(3) According to this second embodiment, in Step 227 in the throttle opening control start determination routine of FIG. 14 and Step 327 in the fuel injection start determination routine of FIG. 19, as in the above (2), an estimated real oil pressure value PrealF in the response delay period is calculated by the following weighted averaging operation equation:

$$PrealF = m \cdot Pcon + (1-m) \cdot PrealFO$$

In the above formula, PrealF stands for an estimated real oil pressure value of last time and m stands for the weighted averaging coefficient (0<m<1).

The other processings than the above (1) to (3) are the same as in the first embodiment.

Also in this second embodiment it is possible to obtain the same effect as in the first embodiment.

Third Embodiment

In the above first and second embodiments, at the time of performing ETC cooperation down-shift in accordance with the driver's intention of deceleration, a start timing of the engine output increasing control (throttle opening control and fuel injection return control) is set equal to the time point when the estimated real oil pressure value PrealF decreases to an initial oil pressure (a predetermined transfer torque capacity-equivalent oil pressure). But in a third embodiment of the present invention illustrated in FIGS. 22 to 31, at the time of performing ETC cooperation down-shift, a start timing of the engine output increasing control (throttle opening control and fuel injection return control) is set to the earliest one of the following three time points T1, T2 and T3:

(1) a time point T1 at which it is determined that the oil pressure of the releasing clutch has decreased to an initial oil pressure (a predetermined transfer torque capacity-equivalent oil pressure) or lower during ETC cooperation down-shift;

(2) a detected time point T2 of a change in gear ratio; and (3) an elapsed time point T3 of a set time after the start of shift.

In this case, the set time (T3) after the start of a shift may be a preset constant time for the simplification of control processings. But, for example, as the vehicle speed becomes higher, there is a tendency that the driver is not given an acceleration feeling or a shock even if the start timing of the engine output increasing control is quickened. Therefore, the set time (T3) after the start of shift may be set in accordance with an operating condition such as the vehicle speed. By so doing, for example in a down-shift during high-speed running, the engine output increasing control can be started in an earlier stage and hence it is possible to quicken the action of engine brake in high-speed running.

The following description is now provided about processing contents of various routines used in this third embodiment.

[Shifting Oil Pressure Control]

Figure 22:
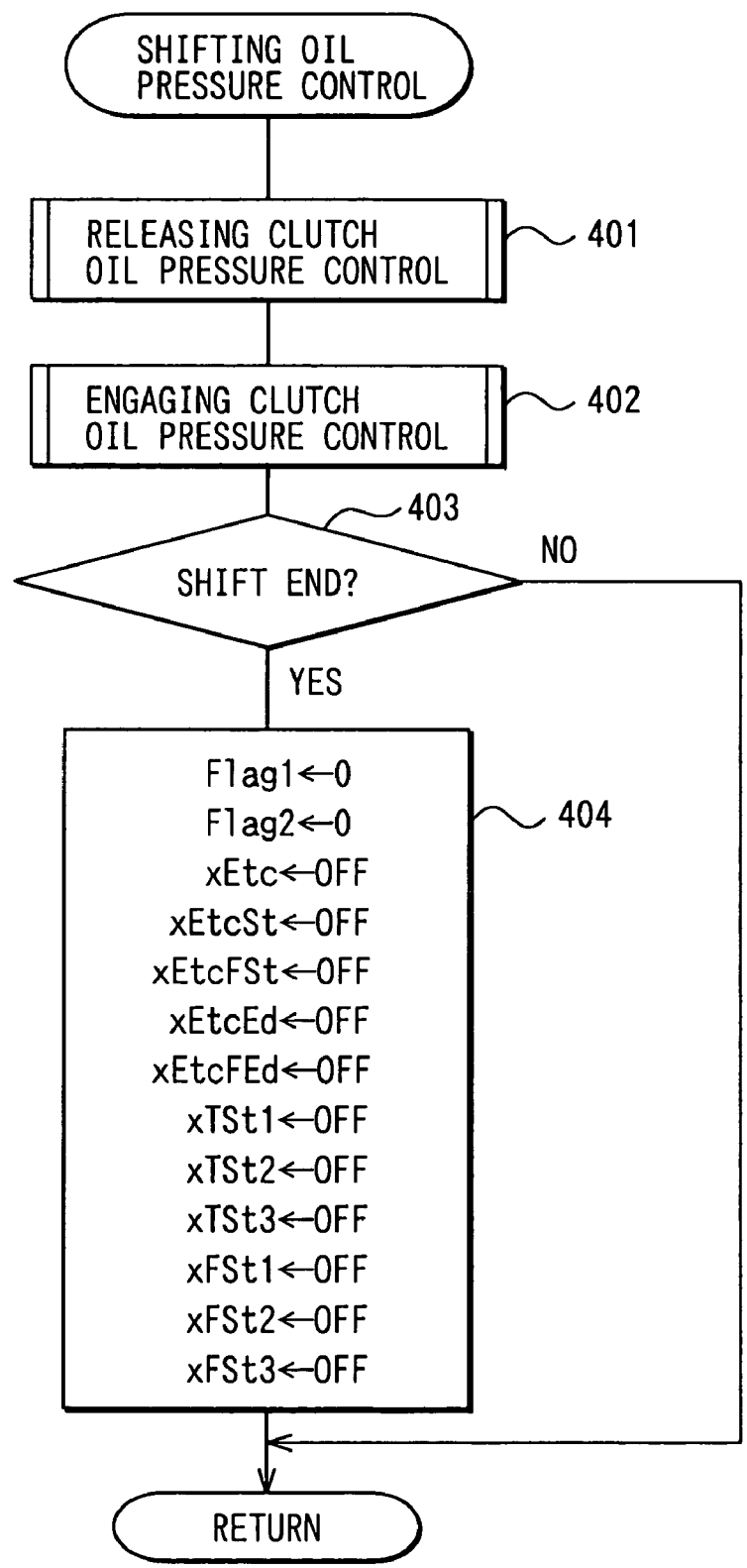
FIG. 22 is a flow chart showing a processing flow of a shifting oil pressure control routine in a third embodiment of the present invention.

A shifting oil pressure control routine of FIG. 22 is executed in the case where the shift type is ETC cooperation down-shift. Once this routine is started, first in Step 401, a releasing clutch oil pressure control routine of FIG. 23 to be described later is executed to control the oil pressure of the releasing clutch, then in Step 402 which follows, the engaging clutch oil pressure control routine of FIG. 12 described above is executed to control the oil pressure of the engaging clutch.

Thereafter, the processing flow advances to Step 403, in which whether the down-shift has been completed or not is determined on the basis of whether Control Stage Flags 1 and 2 to be described later are equal to 4 and 5, respectively. Upon completion of the down-shift, the processing flow advances to Step 404, in which Control Stage Flags 1 and 2 are reset to the initial value "0" and all of other Flags xEtc, xEtcTSt, xEtcFSt, xEtcTEd, xEtcFED, xTSt1, xTSt2, xTSt3, xFSt1, xFSt2 and xFSt3 are reset to "OFF" to terminate this routine.

[Releasing Clutch Oil Pressure Control]

Figure 23:
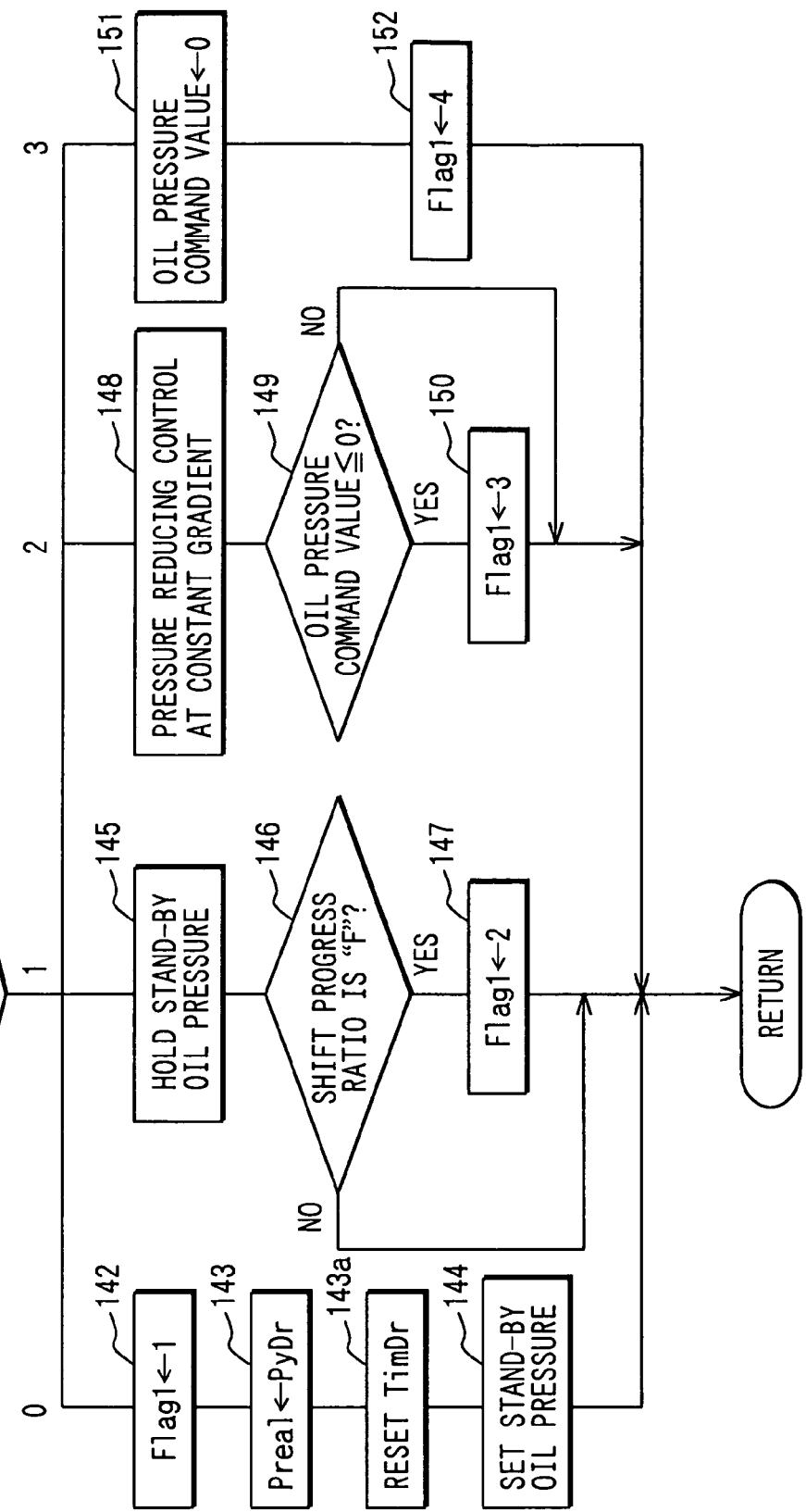
FIG. 23 is a flow chart showing a processing flow of a release-side clutch oil pressure control routine in the third embodiment.

A description will now be given about processing contents of a releasing clutch oil pressure control routine of FIG. 23 which is executed in Step 401 in the shifting oil pressure control routine of FIG. 22. This routine corresponds to the addition of a processing of Step 143*a* between Steps 142 and 143 in the releasing clutch oil pressure control routine of FIG. 11 described in the first embodiment.

According to this routine, when Control Stage Flag 1 is determined equal to 0 in Step 141 and the first-stage control is executed, Control Stage Flag 1 is set to "1" in Step 142, then in Step 143 the initial value of an estimated real oil pressure value Preal of a releasing clutch is updated by an oil pressure command value PyDr for the releasing clutch. Thereafter, the processing flow advances to Step 143*a*, in which a timer TimDr for measuring an elapsed time after the start of shift is reset, then in the next Step 144 the oil pressure command value for the releasing clutch is set to a stand-by oil pressure PtDr.

Subsequent processings are the same as in the releasing clutch oil pressure control routine of FIG. 11 described in the first embodiment.

[Throttle Opening Control Start Determination]

Figure 24:
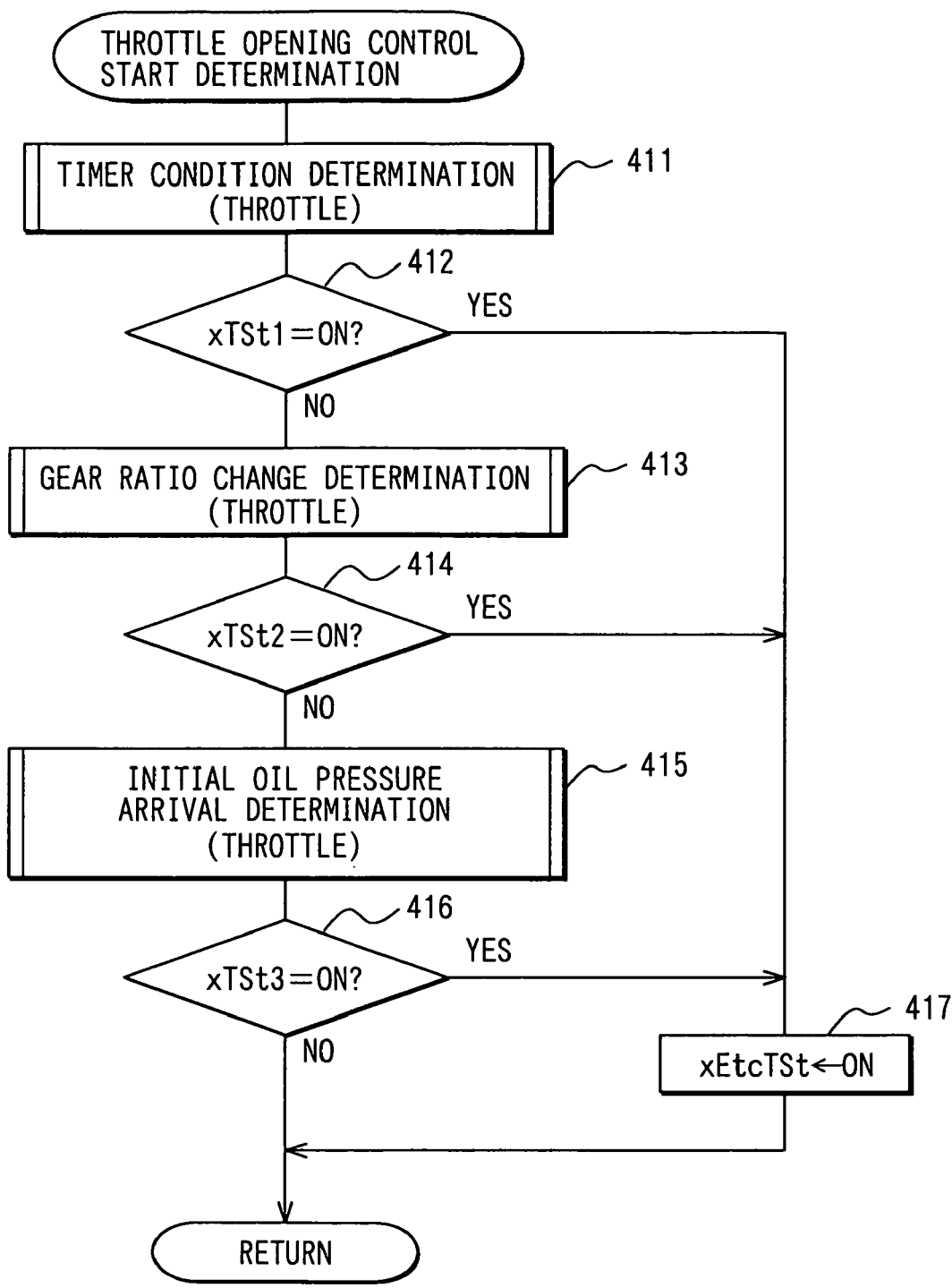
FIG. 24 is a flow chart showing a processing flow of a throttle angle control start determination routine in the third embodiment.
Figure 25:
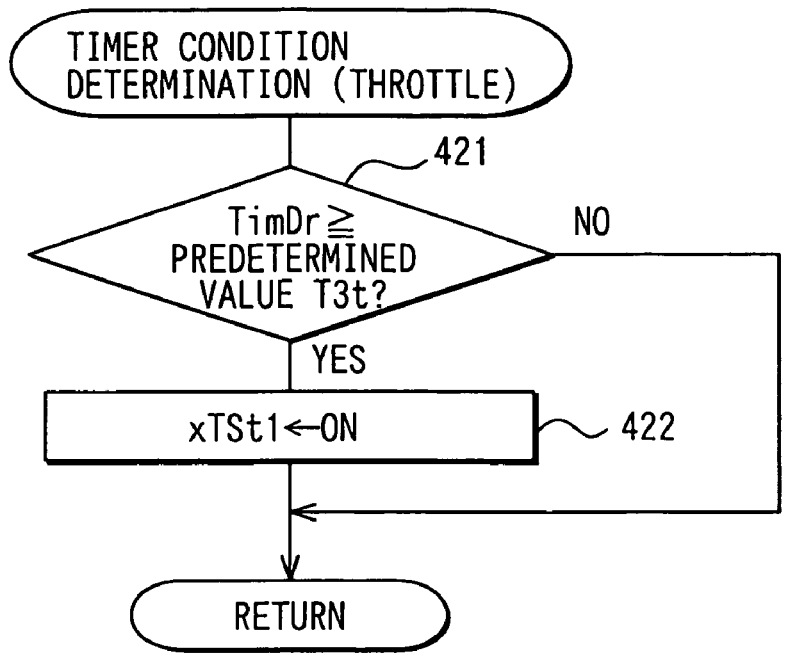
FIG. 25 is a flow chart showing a processing flow of a timer condition determination (throttle) routine in the third embodiment.

Also in this third embodiment the throttle opening control routine FIG. 13 described in the first embodiment is executed and in Step 203 in the same routine there is executed a throttle opening control start determination routine of FIG. 24. First in Step 411, a timer condition determination (throttle) routine of FIG. 25 is executed and it is determined whether the time measured by the timer TimDr which is for measuring an elapsed time after the start of shift is a predetermined time T3*t* or longer (Step 421). If the elapsed time (TimDr) after the start of shift is the predetermined time T3 or longer, First Throttle Opening Control Start Determination Flag xTSt1 is set ON, while if the elapsed time (TimDr) after the start of shift is shorter than the predetermined time T3*t*, First Throttle Opening Control Start Determination Flag xTSt1 is kept OFF.

The predetermined time T3t may be a preset fixed time for the simplification of control processings, but may be set using a map or a mathematical expression in accordance with operating conditions such as vehicle speed and shift position. For example, the predetermined time T3t may be set so as to become shorter as the vehicle speed increases or as the shift range becomes higher.

When the timer condition determination (throttle) routine of FIG. 25 is ended, the processing flow advances to Step 412 in FIG. 24, in which it is determined whether First Throttle Opening Control Start Determination Flag xTSt1 is ON or not. If the Flag is ON, the processing flow advances to Step 417, in which Throttle Opening Control Start Flag xEtcTSt is set ON.

Figure 26:
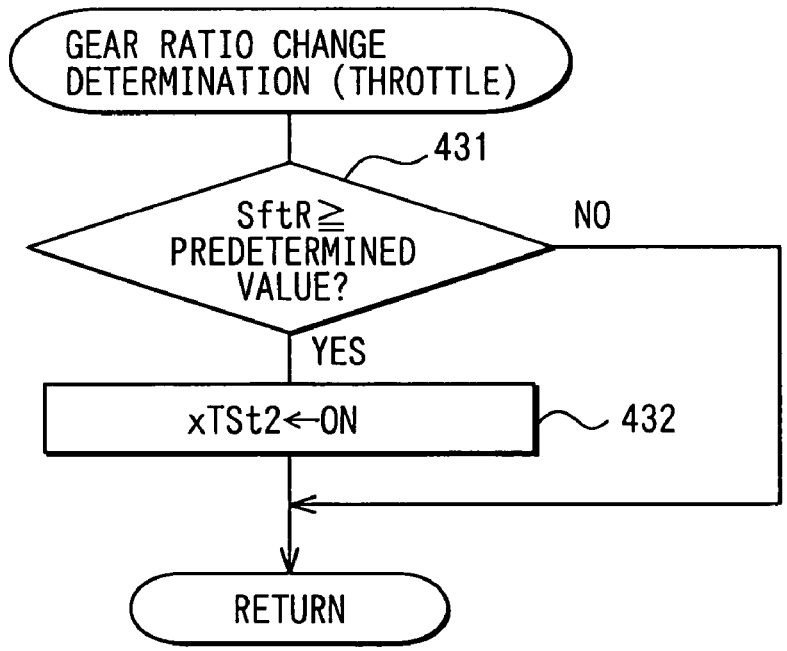
FIG. 26 is a flow chart showing a processing flow of a change in gear ratio determination (throttle) routine in the third embodiment.

On the other hand, if First Throttle Opening Control Start Determination Flag xTSt1 is OFF, the processing flow advances to Step 413, in which a change in gear ratio determination (throttle) routine of FIG. 26 is executed and it is determined whether the shift progress ratio SftR (gear ratio) is a predetermined value or larger (Step 431). Since the shift progress ratio SftR is calculated on the basis of both a detected value of the input shaft rotational speed Nt and a detected value of the output shaft rotational speed No in the speed change gear mechanism 55, the shift progress ratio SftR varies in the vicinity of "0" due to variations in both detected values even if a change in gear ratio does not occur. Therefore, in Step 431 it is determined whether the shift progress ratio SftR is a predetermined value or larger which predetermined value somewhat exceeds the range of variations of SftR before occurrence of a change in gear ratio. If the shift progress ratio SftR is not lower than the predetermined value, it is determined that a change in gear ratio has occurred, and Second Throttle Opening Control Start Determination Flag xTSt2 is set ON (Step 432). On the other hand, if the shift progress ratio SftR is lower than the predetermined value, it is determined that a change in gear ratio has not occurred yet, and Second Throttle Opening Control Start Determination Flag xTSt2 is kept OFF.

When the change in gear ratio determination (throttle) routine of FIG. 26 is ended, the processing flow advances to Step 414, in which it is determined whether Second Throttle Opening Control Start Determination Flag xTSt2 is ON or not. If the Flag is ON, the processing flow advances to Step 417, in which Throttle Opening Control Start Flag xEtcTSt is set ON.

Figure 27:
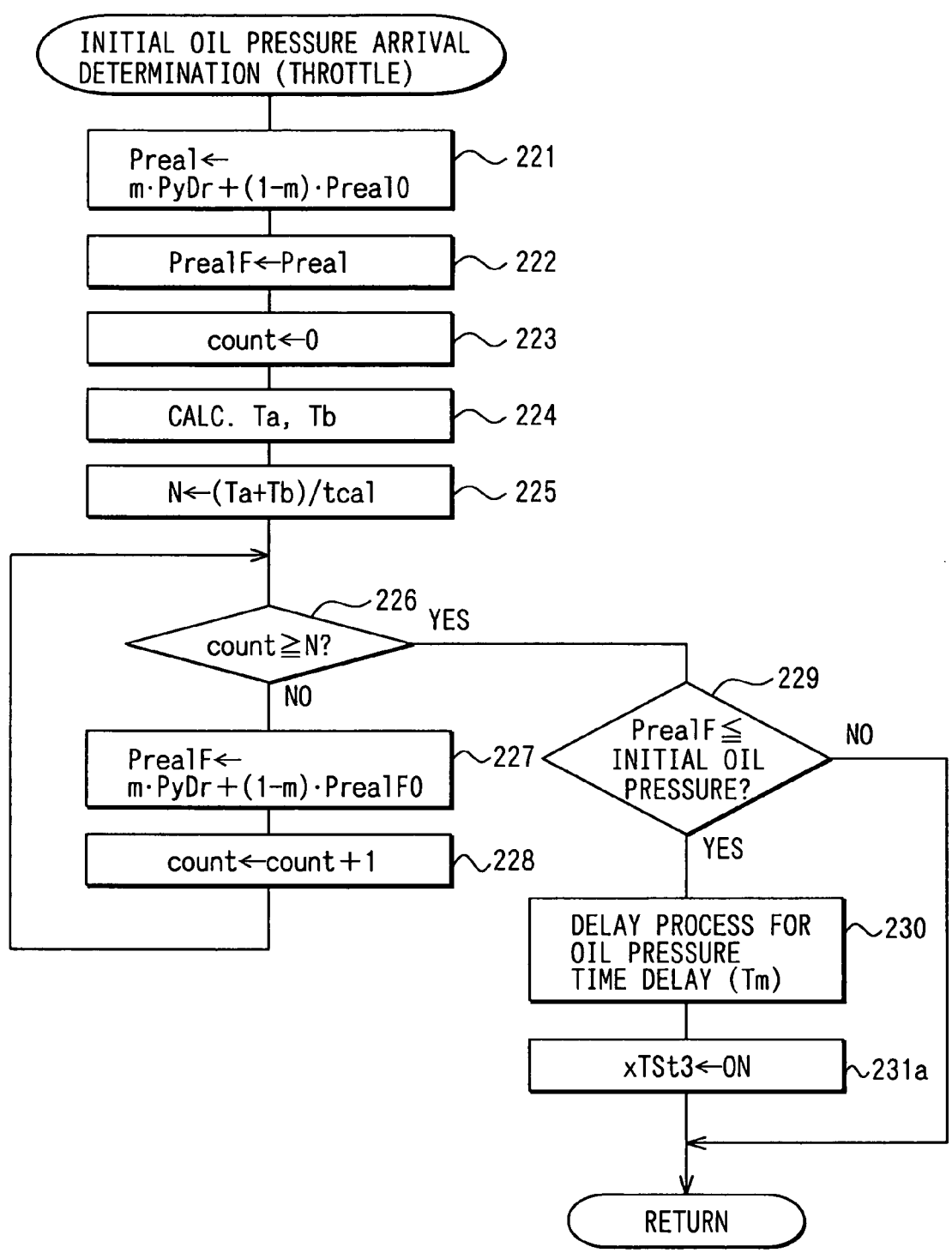
FIG. 27 is a flow chart showing a processing flow of an initial oil pressure arrival determination (throttle) routine in the third embodiment.

On the other hand, if Second Throttle Opening Control Start Determination Flag xTSt2 is OFF, the processing flow advances to Step 415, in which an initial oil pressure arrival determination (throttle) routine of FIG. 27 is executed and in the same way as in the routine of FIG. 14 it is determined whether the estimated real oil pressure value PrealF has decreased to an initial oil pressure (a predetermined transfer torque capacity-equivalent oil pressure) or lower. Upon decrease of the estimated real oil pressure value PrealF to the initial oil pressure or lower, the processing flow advances to Step 230, in which a delay processing for the time delay Tm in oil pressure response is performed. Thereafter, the processing flow advances to Step 231a, in which Third Throttle Opening Control Start Determination Flag xTSt3 is set ON. If the estimated real oil pressure value PrealF has not decreased to the initial oil pressure or lower, Third Throttle Opening Control Start Determination Flag xTSt3 is kept OFF. The processings of Steps 221 to 230 in the initial oil pressure arrival determination (throttle) routine of FIG. 27 are the same the processings of Steps 221 to 230 in the routine of FIG. 27.

When the initial oil pressure arrival determination (throttle) routine is ended, the processing flow advances to Step 416 in FIG. 24, in which it is determined whether Third Throttle Opening Control Start Determination Flag xTSt3 is ON or not. If the Flag is ON, the processing flow advances to Step 417, in which Throttle Opening Control Start Flag xEtcTSt is set ON. On the other hand, if Third Throttle Opening Control Start Determination Flag xTSt3 is OFF, Throttle Opening Control Flag xEtcTSt is kept OFF.

[Fuel Injection Start Determination]

Figure 28:
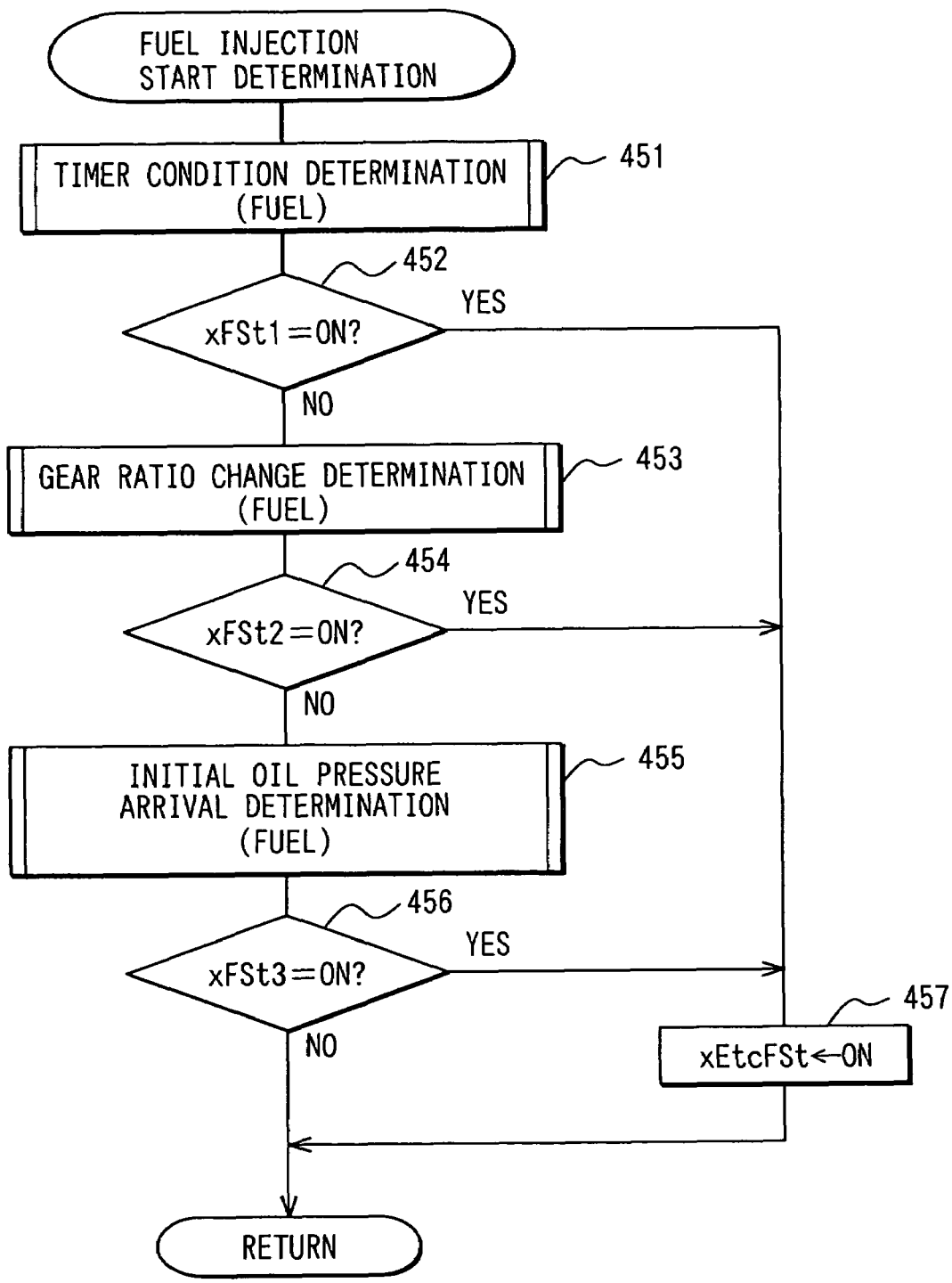
FIG. 28 is a flow chart showing a processing flow of a fuel injection start determination routine in the third embodiment.

Also in this third embodiment the fuel injection return control routine of FIG. 18 described in the first embodiment is executed and in Step 303 of the same routine there is executed a fuel injection start determination routine of FIG. 28. Once this routine is started, first in Step 451 there is executed a timer condition determination (fuel) routine of FIG. 29 and it is determined whether the time measured by a timer TimDr which is for measuring an elapsed time after the start of shift is a predetermined time T3f or longer (Step 461). If the elapsed time (TimDr) is not shorter than the predetermined time T3f, First fuel Injection Start Determination Flag xFSt1 is set ON, while if the elapsed time (TimDr) has not yet reached the predetermined time T3, First Fuel Injection Start Determination Flag xFSt1 is kept OFF. The predetermined time T3f may be a preset fixed time for the simplification of control processings, but may be set using a map or a mathematical expression in accordance with operating conditions such as vehicle speed and shift position. For example, the predetermined time T3f may be set so as to become shorter as the vehicle speed becomes higher or as the shift range becomes higher.

Figure 29:
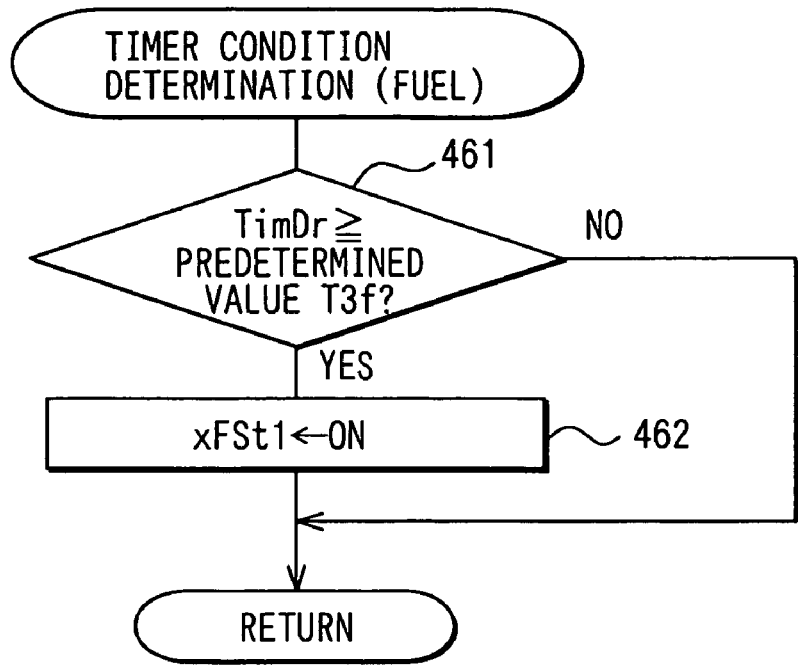
FIG. 29 is a flow chart showing a processing flow of a timer condition determination (fuel) routine in the third embodiment.

When the timer condition determination (fuel) routine of FIG. 29 is ended, the processing flow advances to Step 452 in FIG. 28, in which it is determined whether First Fuel Injection Start Determination Flag xFSt1 is ON or not. If the Flag is ON, the processing flow advances to Step 457, in which Fuel Injection Return Control Start Flag xEtcFSt is set ON.

Figure 30:
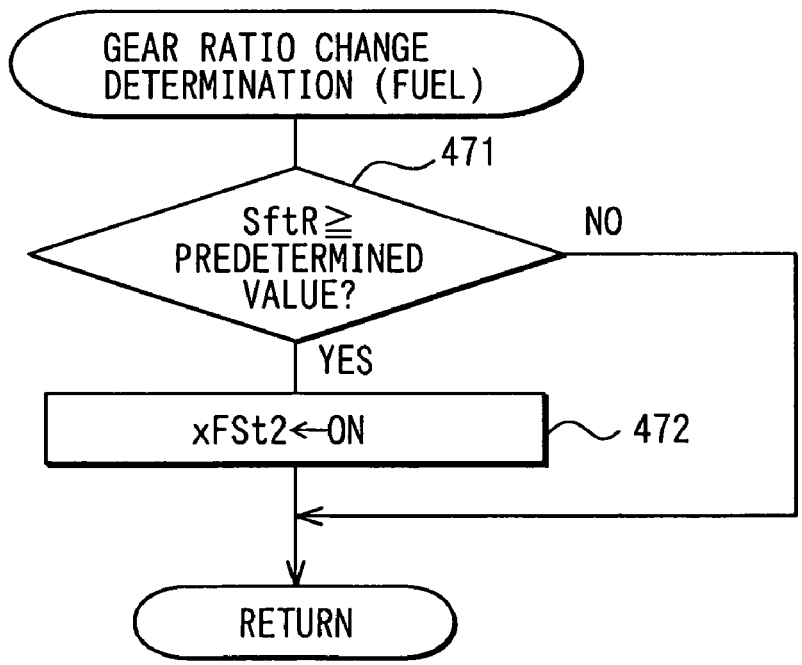
FIG. 30 is a flow chart showing a processing flow of a change in gear ratio determination (fuel) routine in the third embodiment.

On the other hand, if First Fuel Injection Start Determination Flag xFSt1 is OFF, the processing flow advances to Step 453, in which a change in gear ratio determination (fuel) routine of FIG. 30 is executed and whether a change in gear ratio has occurred or not is determined on the basis of whether the shift progress ratio SftR (gear ratio) is a predetermined value of higher which predetermined value somewhat exceeds the range of variation in the shift progress ration SftR before occurrence of a change in gear ratio (Step 471). As a result, if the shift progress ratio SftR is determined to be not lower than the predetermined value, it is determined that there occurred a change in gear ratio, and Second Fuel Injection Start Determination Flag xFSt2 is set ON (Step 472). On the other hand, if the shift progress ratio SftR is lower than the predetermined value, it is determined that a change in gear ratio has not occurred yet, and Second Fuel Injection Start Determination Flag xFSt2 is kept OFF.

When the change in gear ratio determination (fuel) routine of FIG. 30 is ended, the processing flow advances to Step 454 in FIG. 28, in which it is determined whether Second Fuel Injection Start Determination Flag xFSt2 is ON or nor. If the Flag is ON, the processing flow advances to Step 457, in which Fuel Injection Return Control Start Flag xEtcFSt is set ON.

Figure 31:
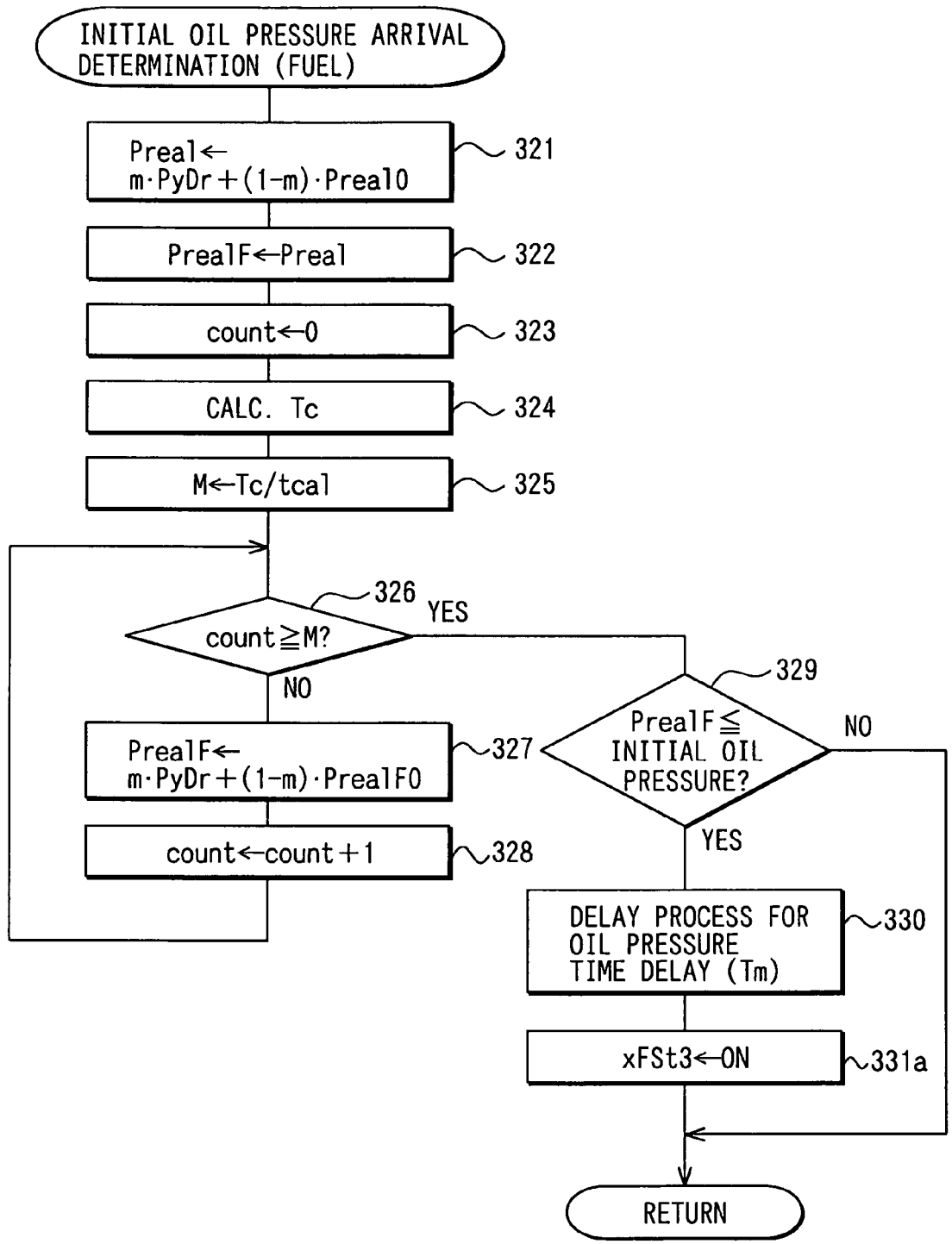
FIG. 31 is a flow chart showing a processing flow of an initial oil pressure arrival determination (fuel) routine in the third embodiment.

On the other hand, if Second Fuel Injection Start Determination Flag xFSt2 is OFF, the processing flow advances to Step 455, in which an initial oil pressure arrival determination (fuel) routine of FIG. 31 is executed and in the same way as in the routine of FIG. 19 described above it is determined whether the estimated real oil pressure value PrealF has decreased to an initial oil pressure (a predetermined transfer torque capacity-equivalent oil pressure) or less. Upon decrease of the estimated real oil pressure value PrealF to the initial oil pressure or less, the processing flow advances to Step 330, in which a delay processing for the time delay Tm in oil pressure response is performed. Then, the processing flow advances to Step 331a, in which Third Fuel Injection Start Determination Flag xFSt3 is set ON. When the estimated real oil pressure value PrealF has not decreased to the initial oil pressure or less, Third Fuel Injection Start Determination Flag xFSt3 is kept OFF. The processings of Steps 321 to 330 in the initial oil pressure arrival determination (fuel) routine of FIG. 31 are the same as the processings of Steps 321 to 330 in the routine of FIG. 19.

When the initial oil pressure arrival determination (fuel) routine of FIG. 31 is ended, the processing flow advances to Step 456 in FIG. 28, in which it is determined whether Third Fuel Injection Start Determination Flag xFSt3 is ON or not. If the Flag is ON, the processing flow advances to Step 457, in which Fuel Injection Return Control Start Flag xEtcFSt is set ON. On the other hand, if Third Fuel Injection Start Determination Flag xFSt3 is OFF, Fuel Injection Return Control Start Flag xEtcFSt is kept OFF.

In this third embodiment described above, by both the throttle opening control start determination routine of FIG. 24 and the fuel injection start determination routine of FIG. 28, a start timing of the engine output increasing control (throttle opening control and fuel injection return control) is set to the earliest one of the following three time points T1, T2 and T3:

(1) a time point T1 at which it is determined that the oil pressure of the releasing clutch has decreased to an initial oil pressure or lower during ETC cooperation down-shift;
(2) a detected time point T2 of a change in gear ratio; and
(3) an elapsed time point T3 of a predetermined time after the start of shift.

According to this construction, the engine output increasing control can be started in an earlier stage and the engine brake can be allowed to act quickly during a down-shift without causing the driver to receive an acceleration feeling or a shock by the engine output increasing control. Particularly, if the set time (T3) after the start of shift is set according to an operating condition such as vehicle speed, then in a down-shift during high-speed running, the engine output increasing control can be started in an earlier stage and the action of engine brake in high-speed running can be improved.

Fourth Embodiment

Figure 32:
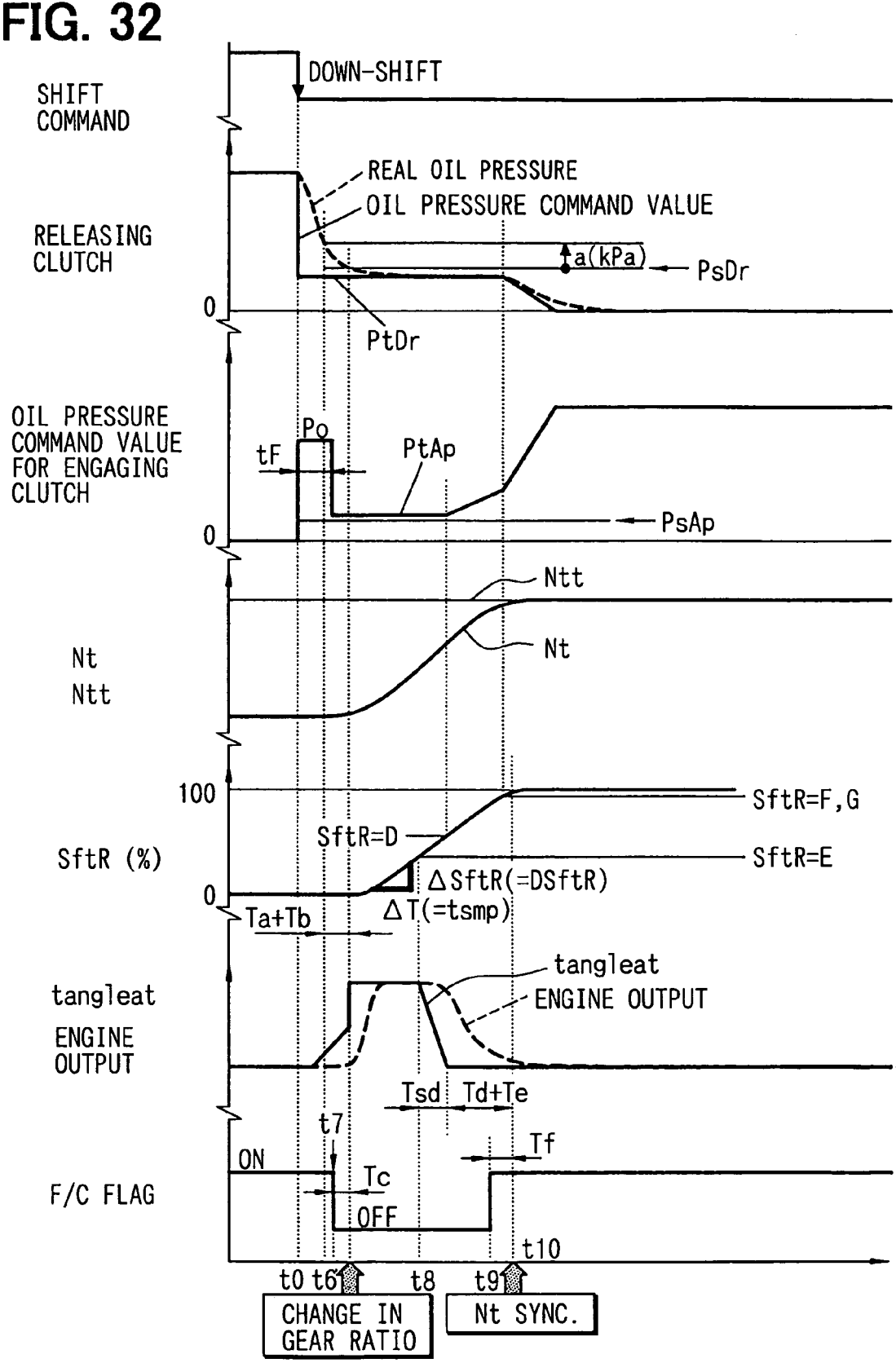
FIG. 32 is a time chart showing an example of an ETC cooperation down-shift in a fourth embodiment of the present invention.
Figure 33:
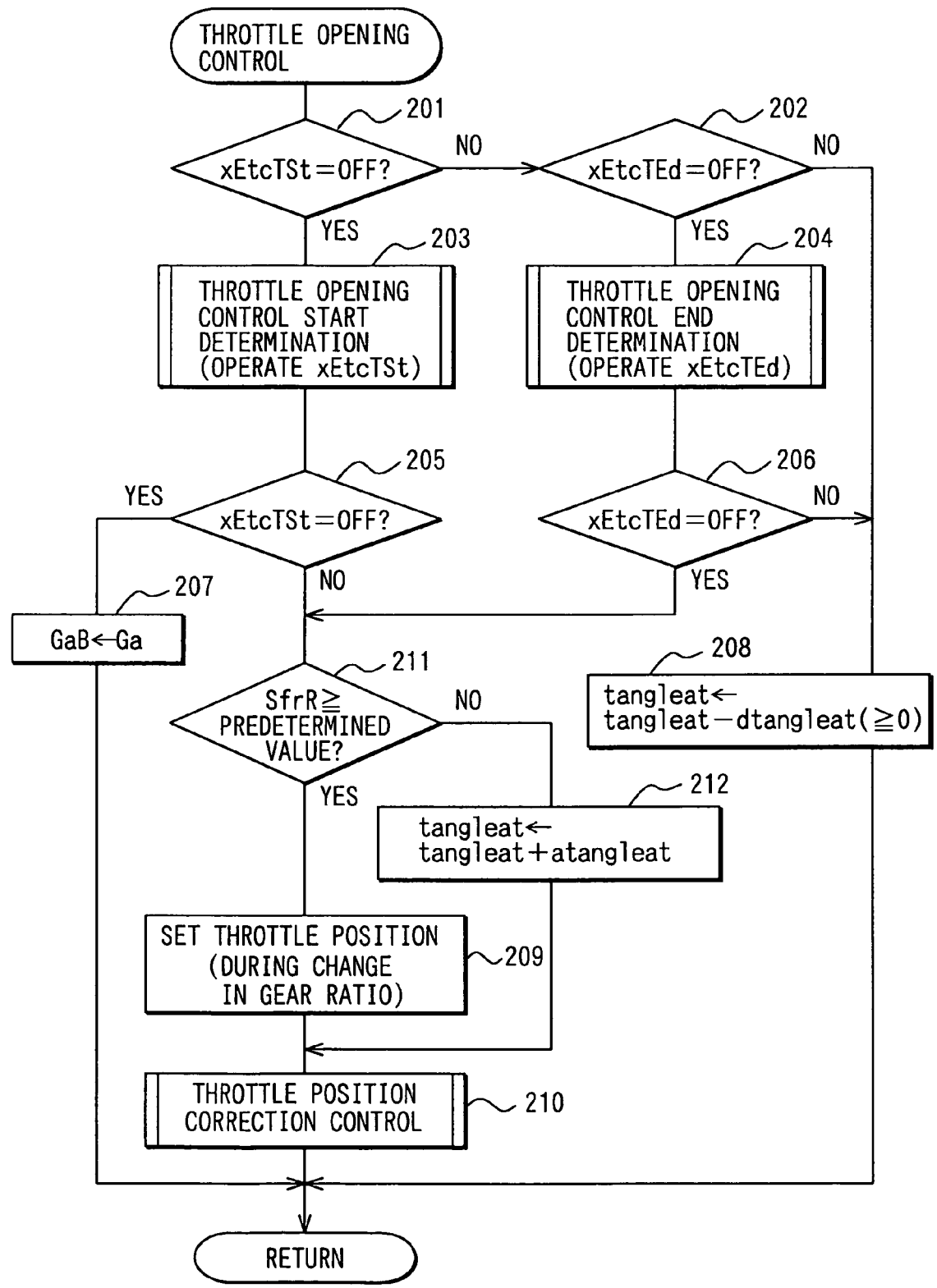
FIG. 33 is a flow chart showing a processing flow of a throttle angle control routine in the fourth embodiment.

In the above first to third embodiments, when the throttle opening control is started, the throttle angle command value is changed up to a target throttle opening quantity continuously at a stretch, but in a fourth embodiment of the present invention illustrated in FIGS. 32 and 33, in the period until detection of a change in gear ratio, a control is made so that the engine output which increases under the engine output increasing control changes gradually, and upon detection of a change in gear ratio, the throttle angle command value tangleat is changed up to a target throttle opening quantity.

The throttle opening control of this fourth embodiment is executed by a throttle opening control routine of FIG. 33. This routine corresponds to the addition of two steps 211 and 212 to the throttle opening control routine of FIG. 13 described in the first embodiment and the processings of the other Steps 201 to 210 are the same as in the first embodiment.

In this fourth embodiment, after the start of ETC cooperation down-shift control, if the estimated real oil pressure value PrealF of the releasing clutch decreases to a level of not higher than the initial oil pressure and Throttle Opening Control Start Flag xEtcTSt is set ON, the processing flow advances like Steps 201→203→205→211 at every starting of the routine of FIG. 33, then in Step 211 it is determined if the shift progress ratio SftR is not lower than a predetermined value which somewhat exceeds the range of variations in the shift progress ratio SftR before occurrence of a change in gear ratio. If the shift progress ratio SftR is lower than the predetermined value, it is determined that a change in gear ratio has not occurred, and the processing flow advances to Step 212, in which the throttle angle command value tangleat is corrected so as to increase gradually on a predetermined quantity atanglea basis to open the throttle position gradually, causing the engine output to increase gradually. This gradual change control is continued until the shift progress ratio SftR reaches a predetermined value (until a change in gear ratio is detected).

Thereafter, upon arrival of the shift progress ratio SftR at the predetermined value and detection of a change in gear ratio, the processing flow advances from Step 211 to Step 209, in which the throttle angle command value tangleat (throttle opening quantity) is set using a throttle opening quantity setting map of FIG. 17 and in accordance with a to-be-down-shifted range and water temperature and the input shaft rotational speed Nt. The control which follows is the same as in the first embodiment.

According to this fourth embodiment, in the period after start of the throttle opening control until detection of a change in gear ratio, a control is made so that the engine output which increases under the engine output increasing control increases gradually. Therefore, it is possible to make a transfer to a state of slip and the start of a change in gear ratio can be more quickened while suppressing an acceleration feeling and a push-out shock which occur as a result of increasing the engine output in a period in which the releasing clutch still possesses a sufficient transfer torque capacity.

Fifth Embodiment

Figure 34:
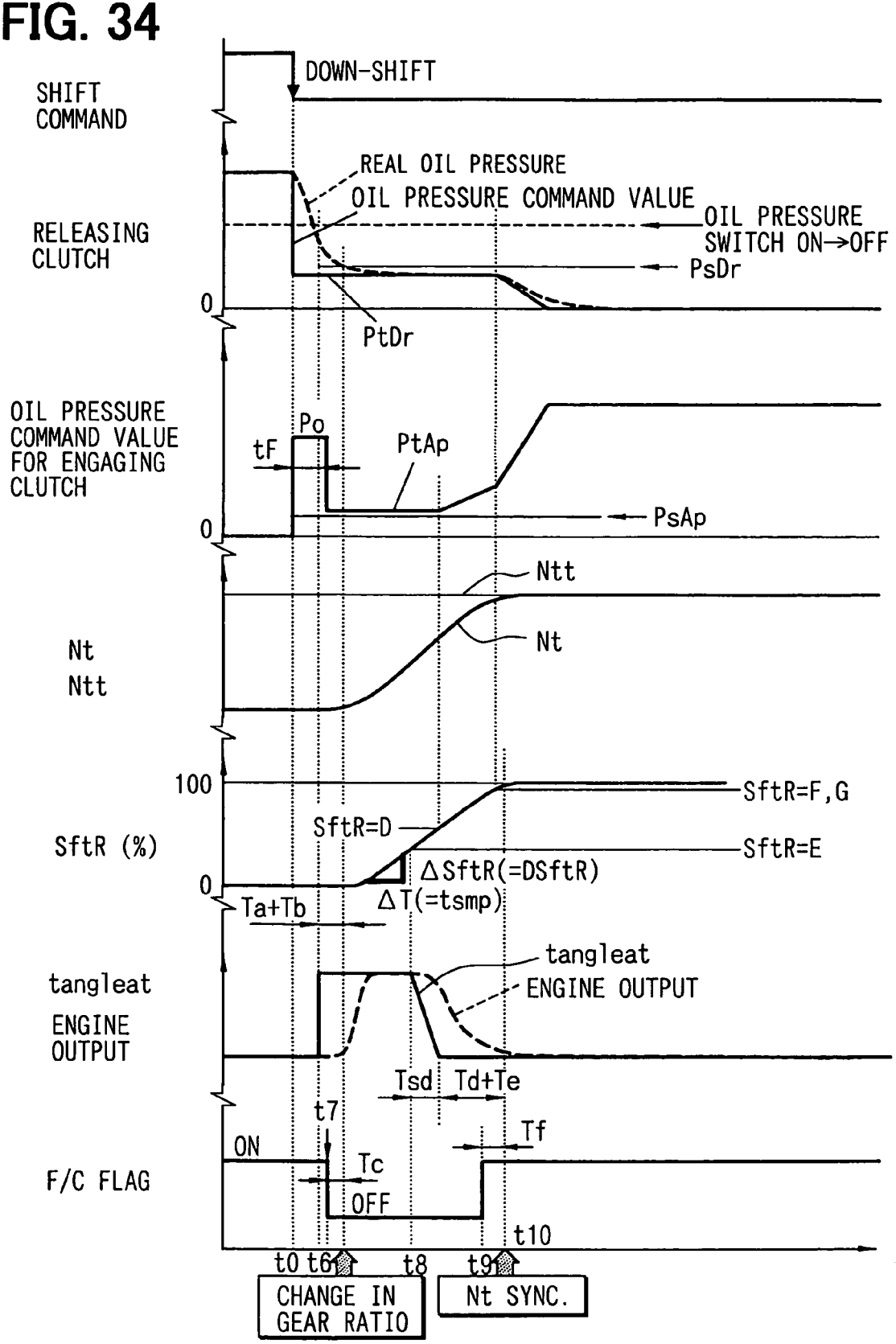
FIG. 34 is a time chart showing an example of an ETC cooperation down-shift control in a fifth embodiment of the present invention.

In the above first to fourth embodiments an estimated real oil pressure value of a releasing clutch is calculated by the weighted averaging calculation of an oil pressure command value for a releasing clutch or a detected electric current value (operation quantity) of the oil pressure control valve and then on the basis of the estimated real oil pressure value there is estimated a time point at which the oil pressure of the releasing clutch decreases to a level of not higher than the initial oil pressure (a predetermined transfer torque capacity-equivalent oil pressure). However, in a fifth embodiment of the present invention illustrated in FIGS. 34 to 36, the oil pressure of a releasing clutch is estimated by utilizing the output of an oil pressure switch which is provided as fail detecting means for the oil pressure control valve for controlling the oil pressure of each releasing clutch, and a time point corresponding to a decrease in oil pressure of the releasing clutch to a level of not higher than the initial oil pressure (a predetermined transfer torque capacity-equivalent oil pressure) is estimated.

The oil pressure switch is constructed so as to turn ON (Hi output) when the real oil pressure is not lower than a threshold value and turn OFF (Lo output) when the real oil pressure is lower than the threshold value. A defective clutch is detected by determining whether the output (real oil pressure) of the oil pressure switch and an oil pressure command value are in a proper relation or not.

Figure 35:
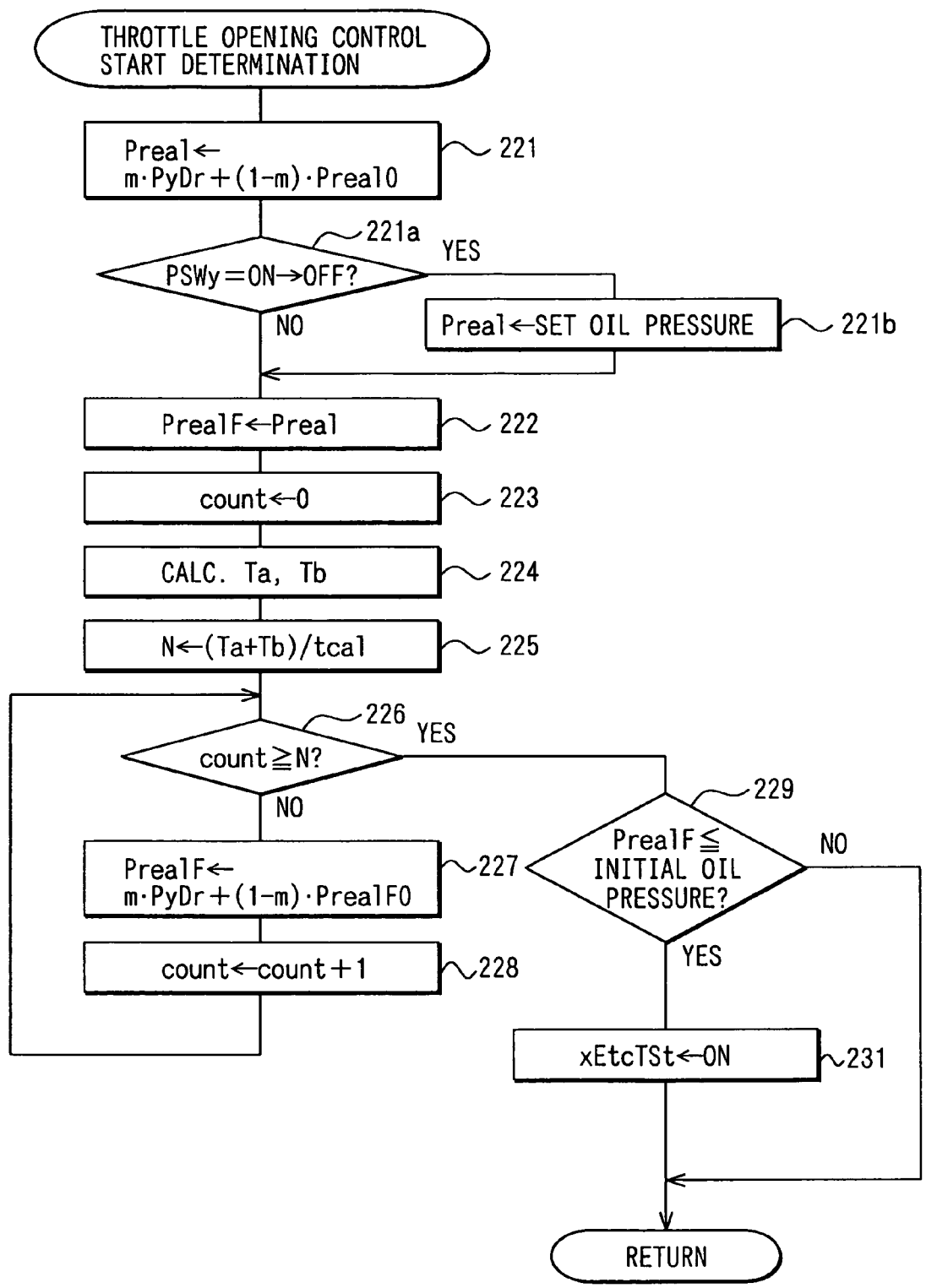
FIG. 35 is a flow chart showing a processing flow of a throttle angle control start determination routine in the fifth embodiment.
Figure 36:
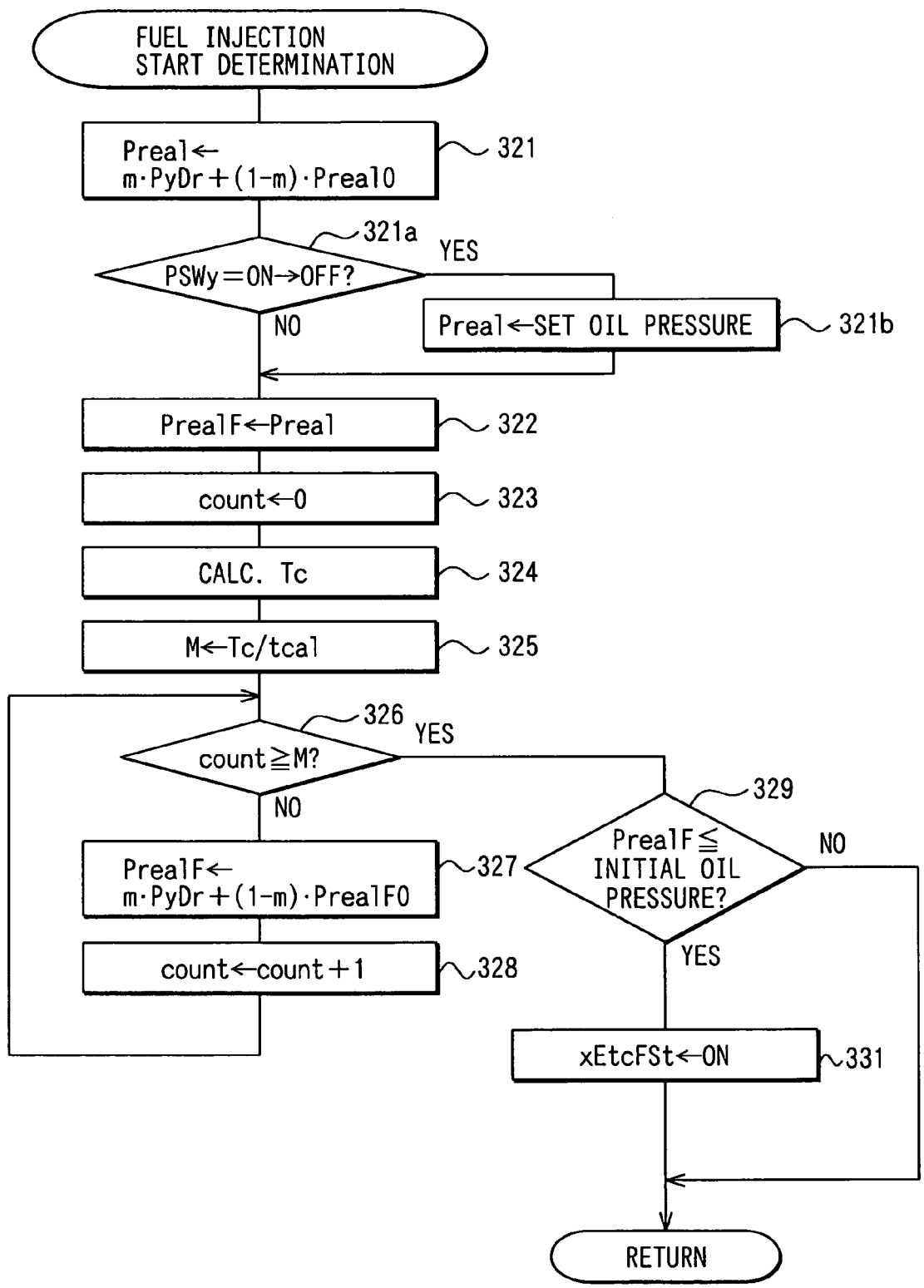
FIG. 36 is a flow chart showing a processing flow of a fuel injection start determination routine in the fifth embodiment.

According to this fifth embodiment, in the routines of FIGS. 35 and 36, when calculating an estimated real oil pressure value of a releasing clutch by the weighted averaging calculation based on an oil pressure command value PyDr for a releasing clutch and when the output PSWy of the oil pressure switch changes from ON to OFF, an ON→OFF switching threshold value (set oil pressure) of the oil pressure switch is inputted to the estimated real oil pressure value of the releasing clutch.

A throttle opening control start determination routine of FIG. 35 corresponds to the addition of two Steps 221a and 221b between Steps 221 and 222 in the throttle opening control start determination routine of FIG. 14 described in the first embodiment and deletion of the delay processing of Step 230. Once this routine is started, an estimated real oil pressure value Preal of a releasing clutch (y) to be controlled for release by ETC cooperation down-shift of this time is calculated by the weighted averaging calculation based on an oil pressure command value PyDr for the releasing clutch (y), then the processing flow advances to Step 221a, in which it is determined whether the present state is a state just after switching from ON to OFF of the output PSWy of the oil pressure switch which is for detecting the oil pressure of the releasing clutch (y). If the answer is negative, the processing flow advances to Step 222, in which the estimated real oil pressure value Preal calculated in Step 221 is stored as an initial value of the estimated real oil pressure value PrealF in the response delay period.

Upon subsequent switching from ON to OFF of the output PSWy of the oil pressure switch, the processing flow advances from Step 221a to Step 221b, in which an ON→OFF switching threshold value (set oil pressure) of the oil pressure switch is inputted to the estimated real oil pressure value Preal of the releasing clutch. Then, in the next Step 222, this estimated real oil pressure value Preal is stored as an initial value of the estimated real oil pressure value PrealF in the response delay period. Subsequent processings are the same as in the throttle opening control start determination routine of FIG. 14. However, since the time point of arrival of the real oil pressure at the predetermined oil pressure through a time delay relative to the oil pressure command is detected by the oil pressure switch, such a delay processing as Step 230 in FIG. 14 is not necessary.

A fuel injection start determination routine of FIG. 36 corresponds to the addition of two Steps 321a and 321b between Steps 321 and 322 in the fuel injection start determination routine of FIG. 19 and deletion of the delay processing of Step 330. Once this routine is started, first in Step 321, an estimated real oil pressure value Preal of a releasing clutch (y) to be controlled for release by ETC cooperation down-shift of this time is calculated by an oil pressure command value PyDr of the releasing clutch (y). Thereafter, the processing flow advances to Step 321a, in which it is determined whether the present state is a state just after switching from ON to OFF of the output PSW of an oil pressure switch which is for detecting the oil pressure of the releasing clutch (y). If the answer is negative, the processing flow advances to Step 322, in which the estimated real oil pressure Preal calculated in Step 321 is stored as an initial value of the estimated real oil pressure value PrealF in the response delay period.

Thereafter, upon switching from ON to OFF of the output PSWy of the oil pressure switch, the processing flow advances from Step 321a to Step 321b, in which an ON→OFF switching threshold value (set oil pressure) of the oil pressure switch is inputted to the estimated real oil pressure value Preal of the releasing clutch. Then, in Step 322 which follows, this estimated real oil pressure value is stored as an initial value of the estimated real oil pressure value PrealF in the response delay period. Subsequent processings are the same as in the fuel injection start determination routine of FIG. 19 described above. However, since the time point of arrival of the real oil pressure at the predetermined oil pressure through a time delay relative to the oil pressure command is detected by the oil pressure switch, such a delay processing as Step 330 in FIG. 19 is not necessary.

Since in this fifth embodiment described above the estimated real oil pressure value Preal calculated by the weighted averaging calculation of the oil pressure command value PyDr of the releasing clutch is corrected by utilizing the output of the oil pressure switch, the oil pressure can be estimated with a high accuracy by utilizing the output of the oil pressure switch which also serves as fail detecting means in the oil pressure control means, thus giving rise to an advantage that the time point of decrease of the oil pressure of the releasing clutch to a level of not higher than the initial oil pressure can be estimated more accurately.

Sixth Embodiment

There is a system provided with, other than the oil pressure switch, an oil pressure sensor able to detect an oil pressure continuously. The fifth embodiment of the present invention shown in FIGS. 37 and 38 may be applied to the system provided with the oil pressure sensor and an oil pressure Pseny detected by the oil pressure sensor may be used as an initial value of the estimated real oil pressure value PrealF in the response delay period.

Figure 37:
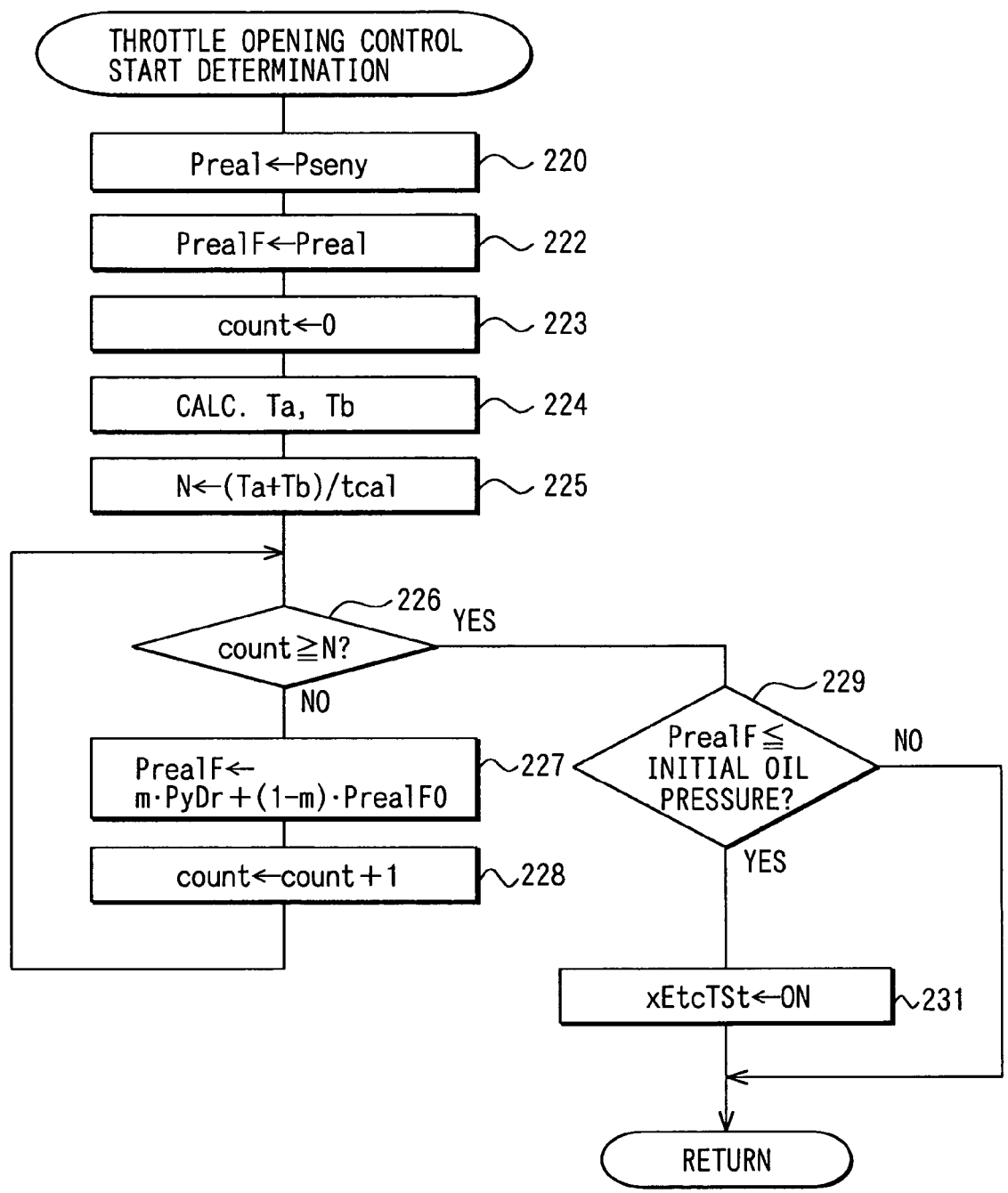
FIG. 37 is a flow chart showing a processing flow of a throttle angle control start determination routine in a sixth embodiment of the present invention.

A throttle opening control start determination routine of FIG. 37 corresponds to replacing the processing of Step 221 in the throttle opening control start determination routine of FIG. 14 described in the first embodiment by Step 220 and deletion of the delay processing of Step 230. Other processings are the same as in FIG. 14.

Figure 38:
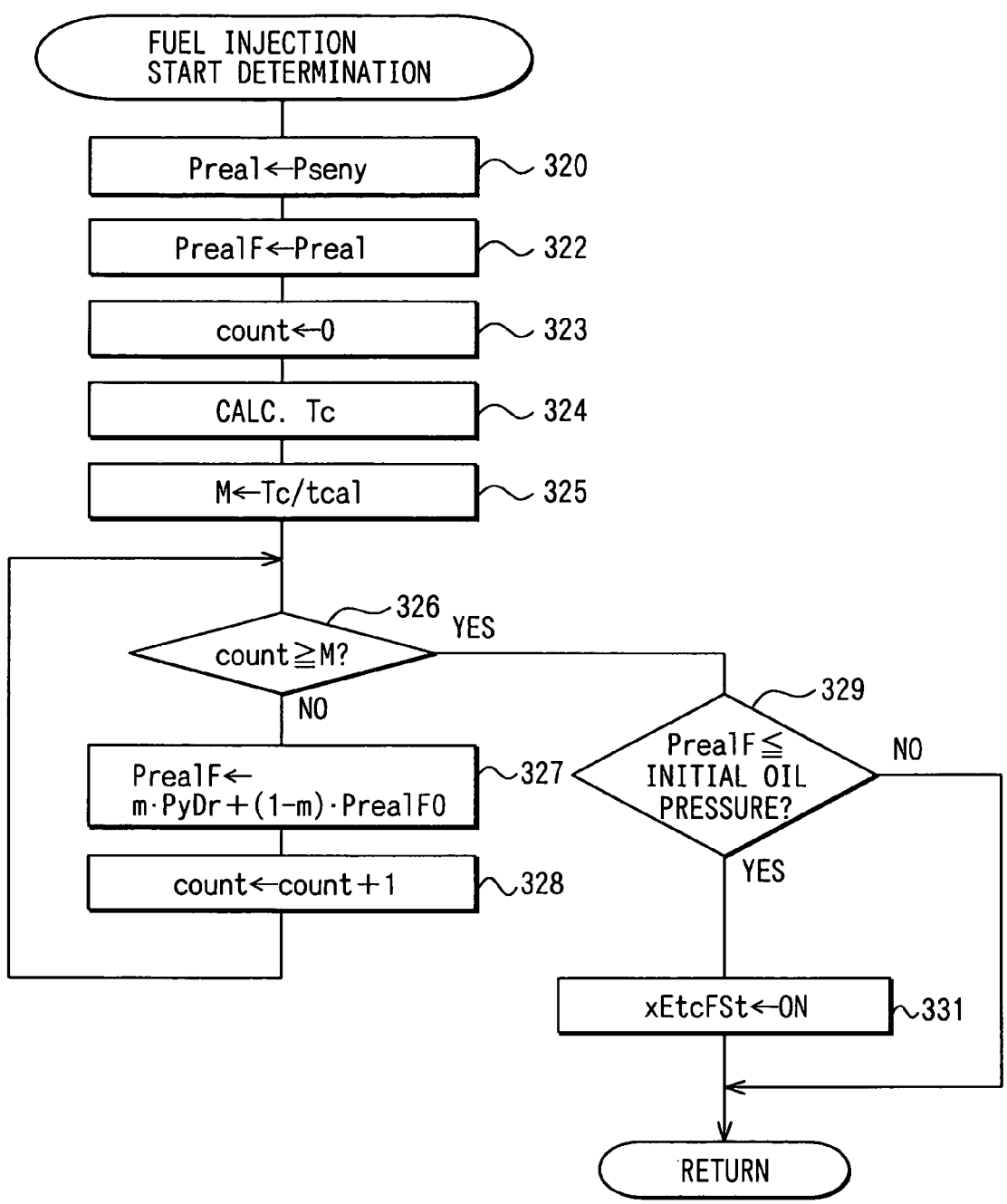
FIG. 38 is a flow chart showing a processing flow of a fuel injection start determination routine in the sixth embodiment.

A fuel injection start determination routine of FIG. 38 corresponds to replacing the processing of Step 321 in the fuel injection start determination routine of FIG. 19 by Step 320 and deletion of the delay processing of Step 230. Other processings are the same as in FIG. 19.

Once the routines of FIGS. 37 and 38 are stated, first in Steps 220 and 320, an oil pressure Pseny detected by an oil pressure sensor which is for detecting the oil pressure of a releasing clutch (y) to be controlled for release by ETC cooperation down-shift of this time is inputted to an oil pressure value Preal of the releasing clutch (y). Then, in the next Steps 221 and 322, the oil pressure value Preal is stored as an initial value of the estimated real pressure value PrealF in the response delay period. Subsequent processings are the same as in the first embodiment. However, since the real oil pressure is monitored by the oil pressure sensor, it is not necessary to perform such delay-based time delay processings as Steps 230 and 330 in FIGS. 14 and 19.

As to the estimated real oil pressure value PrealF in the response delay period which is calculated in Steps 226 to 228 and 326 to 328, since it predicts a future oil pressure, the estimated real oil pressure value PrealF in the response delay period is calculated by the weighted averaging calculation of the oil pressure command value PyDr as in the first embodiment, etc.

This sixth embodiment described above is also advantageous in that the time point of decrease of the oil pressure of the releasing clutch to a level of not higher than the initial oil pressure can be estimated with a high accuracy by utilizing the output of the oil pressure sensor which also serves as fail detecting means in the oil pressure control means.

Seventh Embodiment

Figure 39:
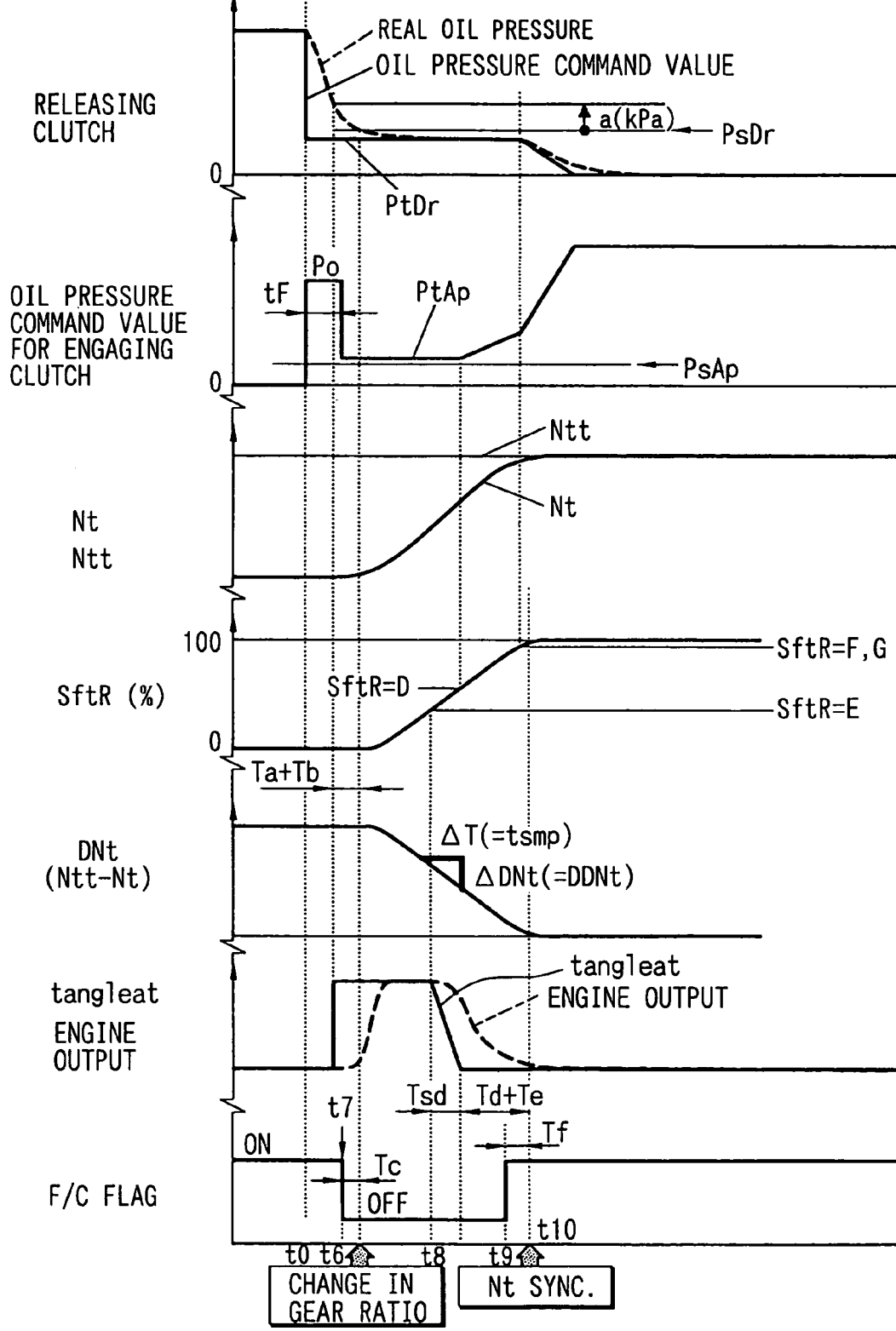
FIG. 39 is a flow chart showing an example of an ETC cooperation down-shift control in a seventh embodiment of the present invention.

In the first embodiment, the shift progress ratio SftRed at the end of the engine output increasing control (at start of end control) is set taking into account the response delay of the system related to the end of the engine output increasing control relative to the gear ratio (SftR=100%) after shift, then upon arrival of the shift progress ratio SftR at the shift progress ratio SftRed in the engine output increasing control, it is determined that a predetermined state corresponding to a substantial end of the down-shift has been reached, and the engine output increasing control is ended. In a seventh embodiment of the present invention shown in FIGS. 39 to 41, it is taken into account that the end of a down-shift can be determined at a time point at which the input shaft rotational speed Nt of the speed change gear mechanism 55 in down-shift reaches an after-shift synchronous rotational speed Ntt determined from both output shaft rotational speed No and the gear ratio after shift. In view of this point, when the input shaft rotational speed Nt, in the engine output increasing control, has reached a rotational speed lower by a predetermined amount DNted which is set in consideration of a system response delay related to the end of the engine output increasing control relative to the after-shift synchronous rotational speed Ntt [in other words, when a deviation DNt(=Ntt−Nt) between the input shaft rotational speed Nt and the after-shift synchronous rotational speed Ntt has become the predetermined amount DNted or less], it is determined that a predetermined state corresponding to a substantial end of the down-shift has been reached, and the engine output increasing control is ended.

Figure 40:
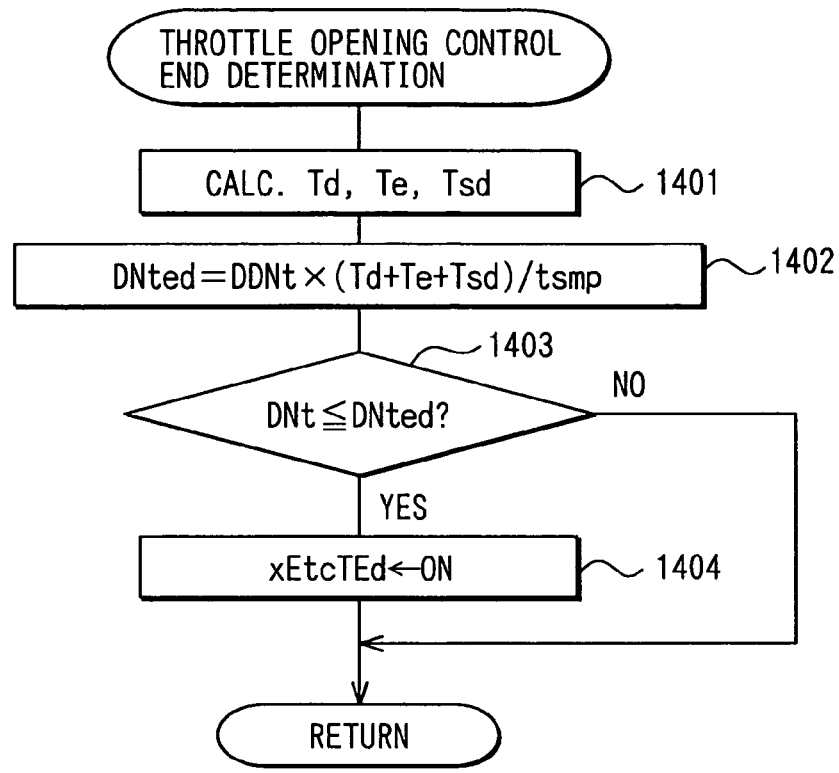
FIG. 40 is a flow chart showing a processing flow of a throttle angle control end determination routine in the seventh embodiment.
Figure 41:
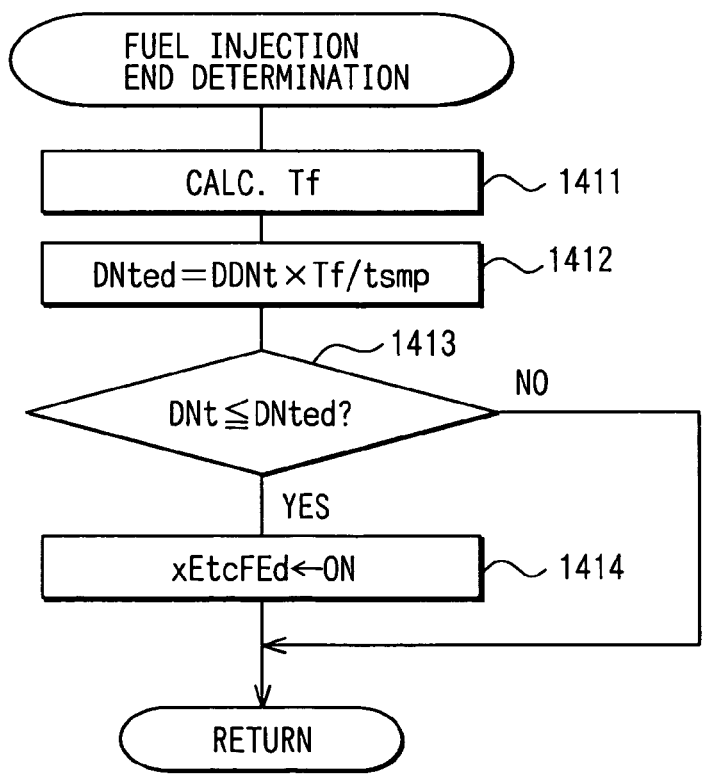
FIG. 41 is a flow chart showing a processing flow of a fuel injection end determination routine in the seventh embodiment.

The following description is now provided about processing contents of routines of FIGS. 40 and 41 which are executed in this seventh embodiment. Other routines are the same as in the first embodiment.

[Throttle Opening Control End Determination]

When a throttle opening control end determination routine of FIG. 40 is started, first in Step 1401, there are calculated, in the same way as in the first embodiment, a response delay (Td) of a full closing motion of the throttle valve 15, a response delay (Te) in the period after actual full closing of the throttle valve 15 until actual disappearance of an increase of engine output, and time (Tsd) required after end determination until decrease of the throttle opening command value to "0."

Thereafter, the processing flow advances to Step 1402, in which a threshold value DNted for throttle opening control end determination (for end control start determination) relative to a deviation (hereinafter referred to as "input shaft rotational speed deviation") between the after-shift synchronous rotational speed Ntt and the input shaft rotational speed Nt is calculated by the following equation:

$$DNted=DDNt \times (Td+Te+Tsd)/tsmp$$

In the above equation, DDNt stands for a change quantity (last time value−this time value of DDNt) per calculation cycle of the deviation DNt between the after-shift synchronous rotational speed Ntt and the input shaft rotational speed Nt, and tsmp stands for a calculation cycle. The threshold value DNted for throttle opening control end determination (for end control start determination) is set in accordance with the above equation and taking into account a response delay (Td+Te+Tsd) of the system related to the end of the throttle opening control.

Thereafter, the processing flow advances to Step 1403, in which it is determined whether the present input shaft rotational speed deviation DNt (=Ntt−Nt) is not larger than the threshold value DNted. If the input shaft rotation speed deviation DNt has not reached the threshold value DNted yet, this routine is ended. Upon arrival of the deviation DNt at the threshold value DNted, it is determined that a predetermined state corresponding to a substantial end of the down-shift has been reached, then the processing flow advances to Step 1404, in which Throttle Opening Control End Flag xEtcTEd is set ON.

[Fuel Injection End Determination]

When a fuel injection end determination routine of FIG. 41 is started, first in Step 1411, a response delay (Tf) in the period after resuming of fuel cut until disappearance of engine output is calculated in the same way as in the first embodiment.

Thereafter, the processing flow advances to Step 1412, in which a threshold value DNted for throttle opening control end determination (for end control start determination) relative to the input shaft rotational speed deviation DNt(=Ntt−Nt) is calculated by the following equation:

$$DNted=DDNt \times Tf/tsmp$$

A threshold value DNted for fuel injection return control end determination (for end control start determination) is set in accordance with the above equation and in consideration of the response delay (Tf) of the system related to the end of fuel injection return control.

Subsequently, the processing flow advances to Step 1413, in which it is determined whether the present input shaft rotational speed deviation DNt (=Ntt−Nt) has become the threshold value DNted or less. If the input shaft rotational speed deviation DNt has not reached the threshold value dNted yet, this routine is ended. Upon arrival of the input shaft rotational speed deviation DNt at the threshold value DNted, it is determined that a predetermined state corresponding to a substantial end of the down-shift has been reached, then the processing flow advances to Step 1414, in which Fuel Injection Return Control End Flag xEtcFEd is set ON.

Also in this seventh embodiment described above it is possible to obtain the same effect as in the first embodiment.

[Eighth Embodiment]

Figure 42:
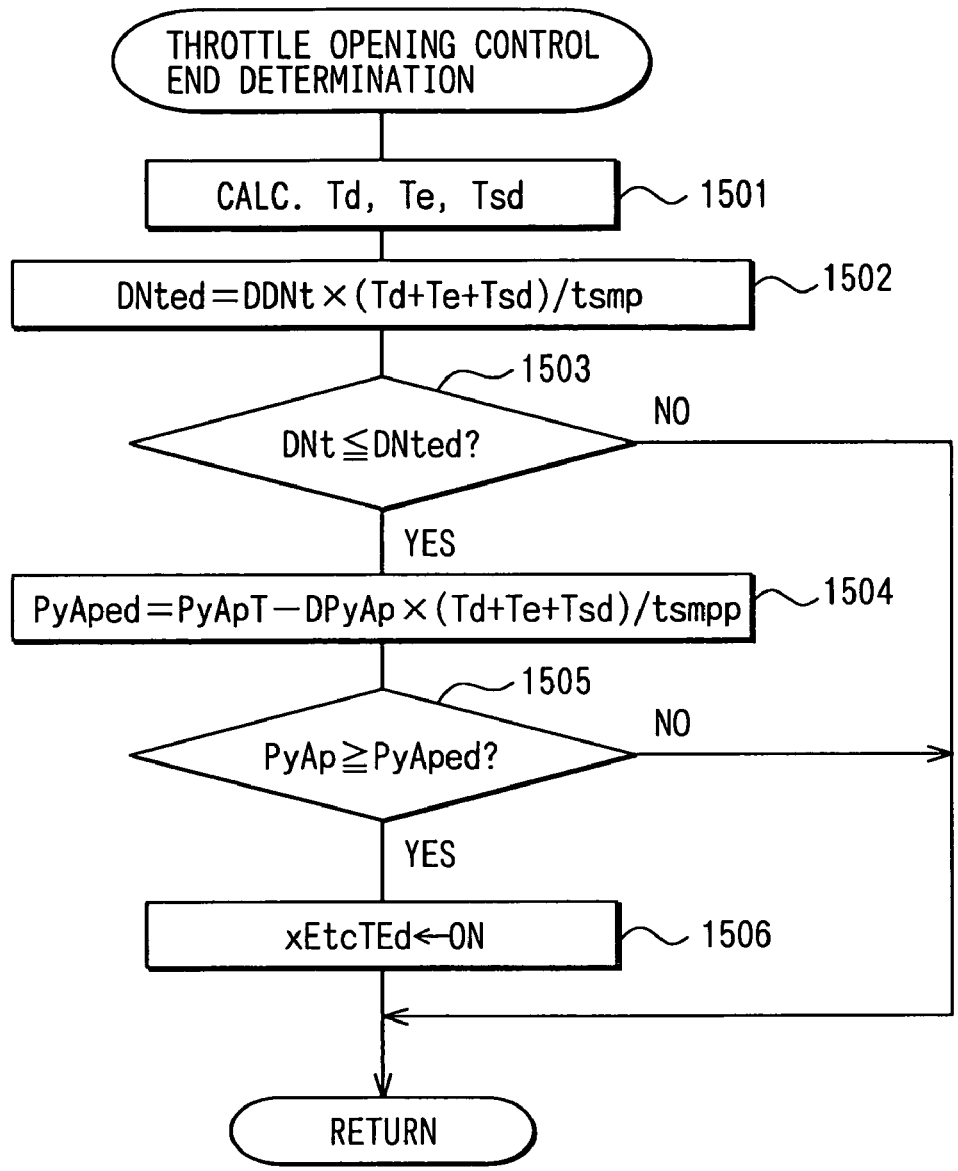
FIG. 42 is a flow chart showing a processing flow of a throttle angle control end determination routine in an eighth embodiment of the present invention.
Figure 43:
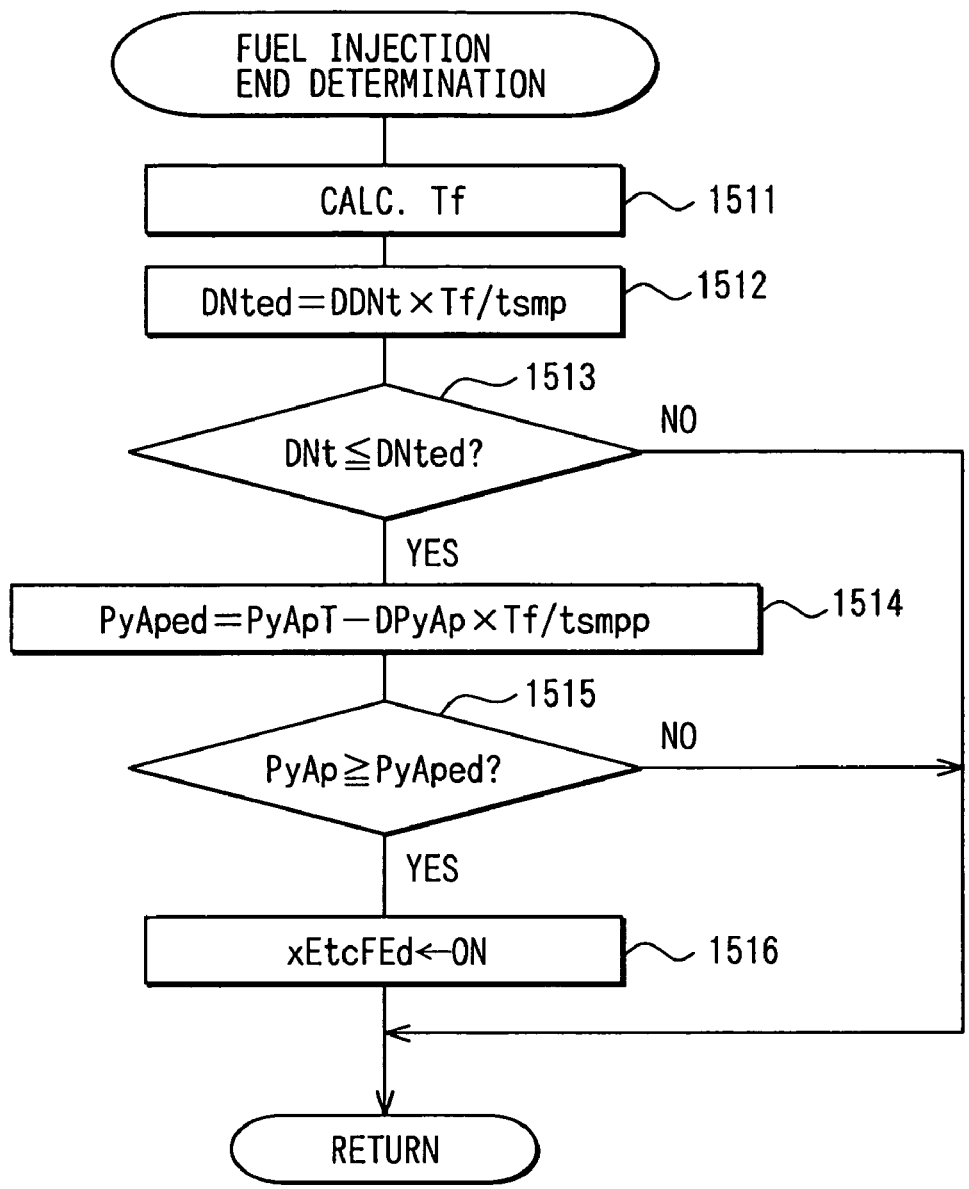
FIG. 43 is a flow chart showing a processing flow of a fuel injection end determination routine in the eighth embodiment.

In an eighth embodiment of the present invention illustrated in FIGS. 42 and 43, it is taken into account that the end of a down-shift can be determined when the transfer torque capacity of an engaging clutch which is controlled for engagement in the down-shift has reached a divided torque-equivalent value after shift. In view of this point, when the transfer torque capacity of the engaging clutch which is controlled for engagement in the engine output increasing control has reached a transfer torque capacity lower by a predetermined amount which is set in consideration of a response delay of the system associated with the end of the engine output increasing control relative to the divided torque-equivalent value after shift, it is determined that a predetermined state corresponding to a substantial end of the down-shift has been reached, and the engine output increasing control is ended.

The following description is now provided about processing contents of routines of FIGS. 42 and 43 which are executed in this eighth embodiment. Other routines are the same as in the first embodiment.

[Throttle Opening Control End Determination]

When a throttle opening control end determination routine of FIG. 42 is started, first in Steps 1501 and 1502, a threshold value DNted for throttle opening control end determination (for end control start determination) is calculated in the same way as in the seventh embodiment and taking into account a response delay (Td+Te+Tsd) of the system related to the end of throttle opening control. Then, the processing flow advances to Step 1503, in which it is determined whether the present input shaft rotational speed deviation DNt (=Ntt−Nt) has become the threshold value DNted or less. If the input shaft rotational speed deviation DNt has not reached the threshold value DNted yet, this routine is ended.

Then, upon arrival of the input shaft rotational speed deviation DNt at the threshold value DNted, the processing flow advances to Step 1504, in which an oil pressure threshold value PyAped for end determination related to an engaging clutch (y) now under control for engagement is calculated by the following equation:

$$PyAped = PyApT - DPyAp \times (Td+Te+Tsd)/tsmpp$$

In the above equation, PyApT stands for an oil pressure-equivalent value at which the transfer torque capacity of the engaging clutch becomes a divided torque value after shift or more, DPyAp stands for a change quantity (this time value−last time value of PyAp) per calculation cycle of the oil pressure PyAp of the engaging clutch (y), and tsmpp stands for a calculation cycle of DPyAp. A threshold value PyAped for the oil pressure PyAp of the engaging clutch (y) at the end of throttle opening control is set in accordance with the above equation and in consideration of the response delay (Td+Te+Tsd) of the system associated with the end of throttle opening control.

Thereafter, the processing flow advances Step 1505, in which it is determined whether the oil pressure PyAp of the engaging clutch (y) has reached a level of not lower than the oil pressure threshold value PyAp for end determination. If the oil pressure PyAp has not yet reached the oil pressure threshold value PyAped, this routine is ended. Upon arrival of the oil pressure PyAp at the threshold value PyAped, it is determined that a predetermined state corresponding to a substantial end of the down-shift has been reached, and the processing flow advances to Step 1506, in which Throttle Opening Control End Flag xEtcTEd is set ON.

As the oil pressure PyAp of the engaging clutch (y) there may be used an estimated value obtained by the weighted averaging calculation of an oil pressure command value for example or there may be used a value detected by the oil pressure sensor.

[Fuel Injection End Determination]

When a fuel injection end determination routine of FIG. 43 is started, first in Steps 1511 and 1512, a threshold value DNted for fuel injection return control end determination (for end control start determination) is calculated in the same way as in the seventh embodiment and in consideration of a response delay (Tf) of the system related to the end of the fuel injection return control. Then, the processing flow advances to Step 1513, in which it is determined whether the present input shaft rotational speed deviation DNt(=Ntt−Nt) has become the threshold value DNted or less. If the input shaft rotational speed deviation DNt has not reached to the threshold value DNted yet, this routine is ended.

Upon arrival of the input shaft rotational speed deviation DNt at the threshold value DNted, the processing flow advances to Step 1514, in which an oil pressure threshold value PyAped for end determination related to an engaging clutch (y) now under control for engagement is calculated by the following equation:

$$PyAped = PyApT - DPyAp \times Tf/tsmpp$$

In the above equation, PyApT stands for an oil pressure-equivalent value at which the transfer torque capacity of the engaging clutch becomes a divided torque after shift or more, DPyAp stands for a change quantity (this time value−last time value of PyAp) per calculation cycle of the oil pressure PyAp of the engaging clutch (y), and tsmpp stands for a calculation cycle if DPyAp. A threshold value PyAped for the oil pressure PyAp of the engaging clutch (y) at the end of the fuel injection return control is set in accordance with the above equation and in consideration of the response delay (Tf) of the system related to the end of the fuel injection return control. Thereafter, the processing flow advances to Step 1515, in which it is determined whether the oil pressure PyAp of the engaging clutch (y) has become the oil pressure threshold value PyAped for end determination or more, and if the oil pressure PyAp has not reached the threshold value PyAped yet, this routine is ended. Then, upon arrival of the oil pressure PyAp at the threshold value PyAped, it is determined that a predetermined state corresponding to a substantial end of the down-shift has been reached, and the processing flow advances to Step 1516, in which Fuel Injection Return Control End Flag xEtcFEd is set ON.

In this eighth embodiment described above, since en end timing of the engine output increasing control is determined using both the input shaft rotational speed deviation DNt and the oil pressure PyAp of the engaging clutch, there accrues an advantage that the end timing of the engine output increasing control can be determined more accurately.

The present invention is not limited to the above first, seventh and eighth embodiments, but may be constructed as follows for example.

(1) An end timing of a down-shift in the engine output increasing control, (hereinafter referred to as "predictive down-shift end timing"), is predicted, and relative to the predictive down-shift end timing, a timing which is earlier by a predetermined time is set taking into account a response delay of the system related to the end of the engine output increasing control, then upon arrival of the said earlier timing it is determined that a predetermined state corresponding to a substantial end of the down-shift has been reached, and the engine output increasing control is ended.

(2) During the engine output increasing control, it is predicted at what timing the input shaft rotational speed reaches a predictive after-shift synchronous rotational speed which is determined from both output shaft rotational speed and a gear ratio after shift, (the said timing will hereinafter be referred to as "predictive synchronous timing"), and relative to this predictive synchronous timing, a timing which is earlier by a predetermined time is set taking into account a response delay of the system related to the end of the engine output increasing control, then upon arrival at the said earlier timing it is determined that a state corresponding to a substantial end of a down-shift has been reached, and the engine output increasing control is ended.

(3) A threshold value for determining a predetermined state corresponding to a substantial end of a down-shift may be set taking the vehicle body deceleration also into account. By so doing, even when the vehicle speed changes, with a change in after-shift synchronous rotational speed and a consequent change of shift time, due to a change in running resistance based on a road surface gradient or depending on whether a braking operation has been performed or not or whether a brake operating force is large or small, it is possible to let the engine output increasing control be ended properly.

Although in the above embodiments the engine output increasing control is effected by both throttle opening control and fuel injection return control, even by the addition of a fuel quantity increasing control or an ignition delay control to the engine output increasing control, or by replacing both throttle opening control and fuel injection return control with an fuel quantity increasing control or an ignition delay control, the engine output increasing control can be effected in the way of thinking as above. Further, although the above embodiments are concerned with a gasoline engine, also in a diesel engine, the present invention can be effected by performing a fuel injection quantity increasing control as the engine output increasing control.

Ninth Embodiment

Figure 44:
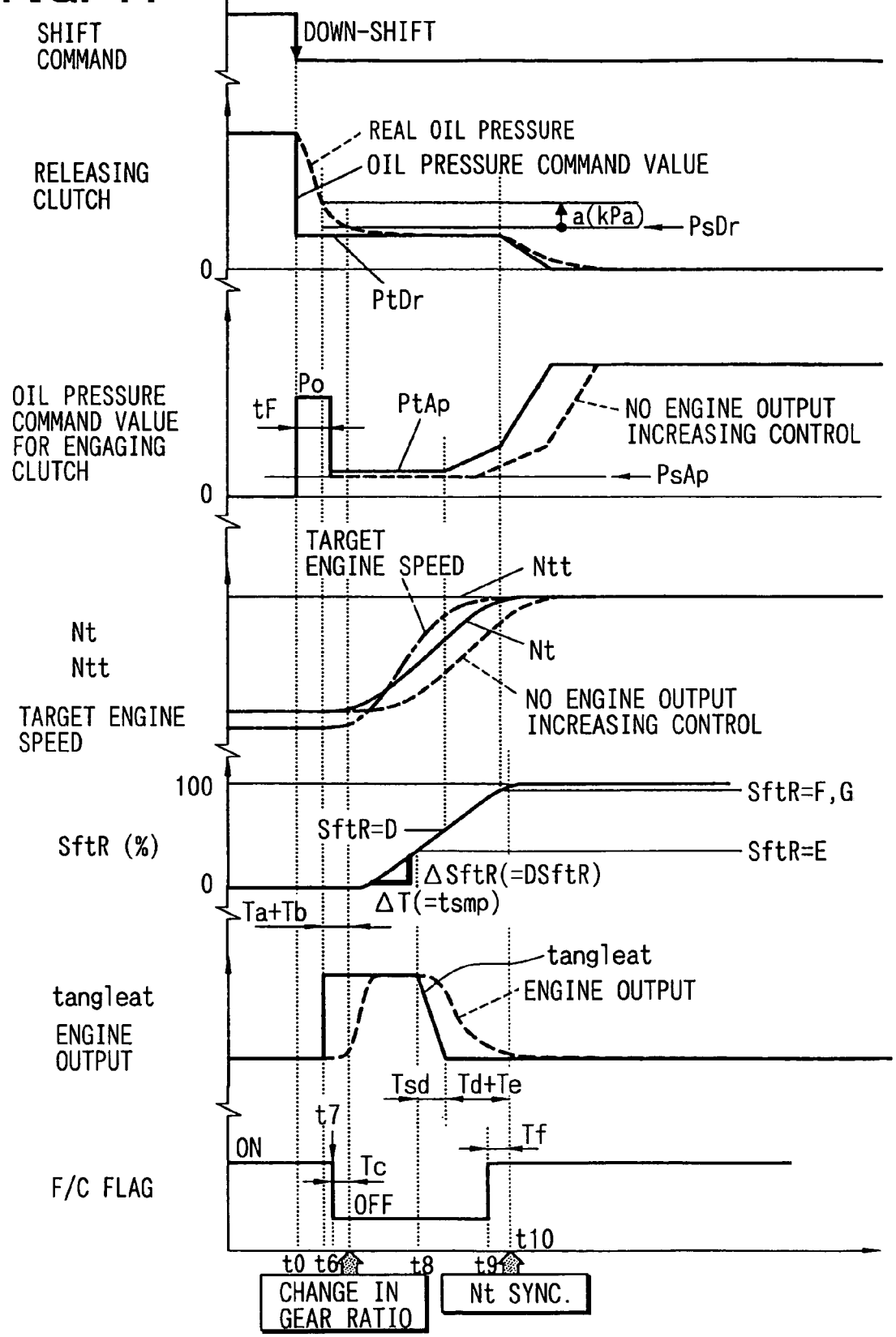
FIG. 44 is a time chart showing an example of an ETC cooperation down-shift control in a ninth embodiment of the present invention.

Next, a control example in ETC cooperation down-shift according to an ninth embodiment of the present invention will be described with reference to FIG. 44. At a time point t0 at which an ETC cooperation down-shift execution condition exists and a down-shift command is outputted, an oil pressure command value for a releasing clutch is decreased rapidly to a stand-by oil pressure PtDr (a little lower oil pressure than the set load-equivalent oil pressure PsDr of the return spring of the releasing clutch). A subsequent state is held to a state just before development of an engaging force of the releasing clutch under the stand-by oil pressure PtDr. This is for the purpose of not only promoting the increase of the input shaft rotational speed Nt by the engine output increasing control but also suppressing a vehicle rush-out feeling caused by the engine output increasing control.

Also in this ETC cooperation down-shift, an oil pressure control for an engaging clutch is almost the same as in power ON down-shift. At an output time point t0 of a down-shift command, an oil pressure command value for the engaging clutch is set to a predetermined fill oil pressure Po and a fill control for filling the engaging clutch with working oil is executed. The fill control is continued for a predetermined time tF, and upon arrival at a state just before development of an engaging force of the engaging clutch, the oil pressure command value for the engaging clutch is decreased to a stand-by oil pressure PtAp (near the set load-equivalent oil pressure PsAp of the return spring of the engaging clutch) and the fill control is terminated. A subsequent state is held to a state in which the engaging force of the engaging clutch develops a desired engine brake feeling under its stand-by oil pressure PtAp. As to the subsequent pressure increasing control, the same processing as in the foregoing power ON down-shift is performed.

This ETC cooperation down-shift is characteristic in that the engine output increasing control is executed in the following manner. In the course of decrease of a real oil pressure of the releasing clutch down to the stand-by oil pressure PtDr, at a time point t6 of decrease to "initial oil pressure" at which the transfer torque capacity of the releasing clutch becomes small or zero and an acceleration feeling is not created even with an increase of the engine output, the engine output increasing control is started.

In this case, for estimating the time point t6 at which the real oil pressure of the releasing clutch decreases to the initial oil pressure or lower, the response of the real oil pressure to the oil pressure command value of the releasing clutch is approximated by the transfer characteristic of "first order lag+time delay," then an estimated value of the real oil pressure calculated on the basis of the said transfer characteristic is compared with the aforesaid initial oil pressure, and at the time point t6 at which the estimated real oil pressure value decreases to the initial oil pressure, it is determined that a start timing of the engine output increasing control has been reached.

At the time point t6 at which the start timing of the engine output increasing control is thus determined, a target throttle opening is calculated by a method to be described later and a throttle opening control is started, then at a somewhat later time point t7 Fuel Cut Flag ("F/C Flag" hereinafter) is turned OFF, a fuel injection return control is started and the injection of fuel is resumed.

The engine output increases through a predetermined delay after the start of the engine output increasing control (both throttle opening control and fuel injection return control). As engine output increase delay factors there are, in connection with the throttle opening control, a response delay (Ta) of an opening motion of the throttle valve 15 and a response delay (Tb) in the period after actual opening of the throttle valve 15 until increase of the engine output, while in connection with the fuel injection return control there is a response delay (Tc) in the period after resuming of fuel injection until increase of the engine output.

The response delay (Ta) of an opening motion of the throttle valve 15 is calculated using a map of parameters (e.g., cooling water temperature and battery voltage) associated with the drive responsivity of the motor 17 in the electronic throttle system. The response delay (Tb) in the period after opening of the throttle valve 15 until increase of the engine output is calculated using a delay in the period after introduction of intake air in an amount increased by opening of the throttle valve 15 into a cylinder and a map of parameters (e.g., engine speed and throttle angle) associated with intake air flow velocity. The response delay (Tc) in the period after resuming of fuel injection until increase of the engine output is set on the basis of time (time T720° C.A required for the crank shaft to rotate 720° C.A) after fuel injection until combustion.

Once the start of control is determined by the start timing determination in the throttle opening control (engine output increasing control) described above, a target throttle angle which is set so as to afford such an input shaft rotational speed Nt behavior as attains desired shift time and shift feeling is outputted and held. The target throttle angle is set on the basis of friction loss of the engine 11, detection results of parameters [e.g., shift pattern (change in gear ratio), cooling water temperature, and input shaft rotational speed Nt], and a desired shift time. Further, by changing the target throttle angle in accordance with the magnitude of a road surface gradient and that of deceleration of the vehicle body, the feeling can be matched more minutely to a desired state. In this case, the target throttle angle is set small during deceleration and large during acceleration. The target throttle angle is corrected by the output of the air flow meter 14. As a result, the input shaft rotational speed Nt (output shaft rotational speed of the torque converter 52) of the speed change gear mechanism 55 begins to increase upon arrival of the oil pressure of the releasing clutch at the stand-by oil pressure PtDr or thereabouts.

During execution of the engine output increasing control, a predetermined engine output increase quantity is held while making an end determination for terminating the actual increase of engine output by the engine output increasing control in conformity with a time point (a 100% time point of the shift progress ratio SftR) corresponding to the final down-shift end. In this end determination, a response delay in the period after the issuance of an end command until actual disappearance of an increase of engine output is taken into account on the basis of the shift progress ratio SftR and a change quantity ΔSftR per unit time ΔT of the shift progress ratio, then to which value of the shift progress ratio SftR a control end timing capable of offsetting the said response delay corresponds is calculated, then whether a predetermined state corresponding to a substantial end of the downshift has been reached or not is determined on the basis of whether the shift progress ratio SftR has exceeded the calculated value or not, and an end timing (t8) of both throttle opening control and fuel injection return control, as the engine output increasing control, is determined. If the end timing (t8) is determined, then in the throttle opening control, an end control is executed for decreasing the target throttle angle to "0." In the end control, a throttle opening control command value is decreased to "0" with a predetermined gradient in order to ensure a transient reproducibility of the electronic throttle. In the fuel injection return control, F/C Flag is returned to ON in accordance with the end determination to resume fuel cut. But this does not apply when the request for fuel cut from the engine 11 side has vanished due to a sudden decrease of the engine speed or by any other cause.

As response delay factors related to the end of engine output increase there are, in connection with the throttle opening control, a response delay (Td) of a full closing motion of the throttle valve 15, a response delay (Te) in the period after actual full closing of the throttle valve 15 until actual disappearance of an increase of engine output, and time (Tsd) in the period after end determination until decrease of the target throttle angle to "0," while in connection with the fuel injection return control there is a response delay (Tf) in the period after resuming of fuel cut until disappearance of the engine output.

The response delay (Td) of a closing motion of the throttle valve 15 is calculated using a map of parameters (e.g., cooling water temperature and battery voltage) associated with the drive responsivity of the motor 17 in the electronic throttle system. The response delay (Te) in the period after full closing of the throttle valve 15 until disappearance of an increase of engine output is calculated using a delay in the period after introduction f of intake air in an amount decreased by full closing of the throttle valve into a cylinder until combustion and a map of parameters (e.g., engine speed and throttle angle) associated with the intake air flow velocity. The time (Tsd) after end determination until decrease of a target throttle angle to "0" is calculated on the basis of a target throttle angle decreasing gradient. The response delay (Tf) in the period after resuming of fuel cut until disappearance of the engine output is set on the basis f time (time T720° C.A required for the crank shaft to rotate 720° C.A) after resuming of fuel cut until arrival of the fuel-cut cylinder at a combustion stroke.

In this ninth embodiment, as described above, at a time point t8 at which the shift progress ratio SftR reaches a predetermined value E, during execution of the engine output increasing control (both throttle opening control and fuel injection return control), an end control for the engine output increasing control is started and the target throttle angle is decreased to "0" with a predetermined gradient, then the response delays Tsd, Td, Te and Tf are calculated to predict a time point t10 at which the engine output disappears by the end control, and on the basis of the time point t10, the time point t9 of resuming fuel cut is predicted taking into account the response delay (Tf) in the period after resuming of fuel cut until disappearance of the engine output. Upon arrival at the time point t9, F/C Flag is returned ON to resume fuel cut.

On the other hand, as to the oil pressure command value for the releasing clutch, it is decreased with a constant gradient at a time point of arrival of the shift progress ratio SftR at 100%.

The ETC cooperation down-shift is completed by such control.

Figure 47:
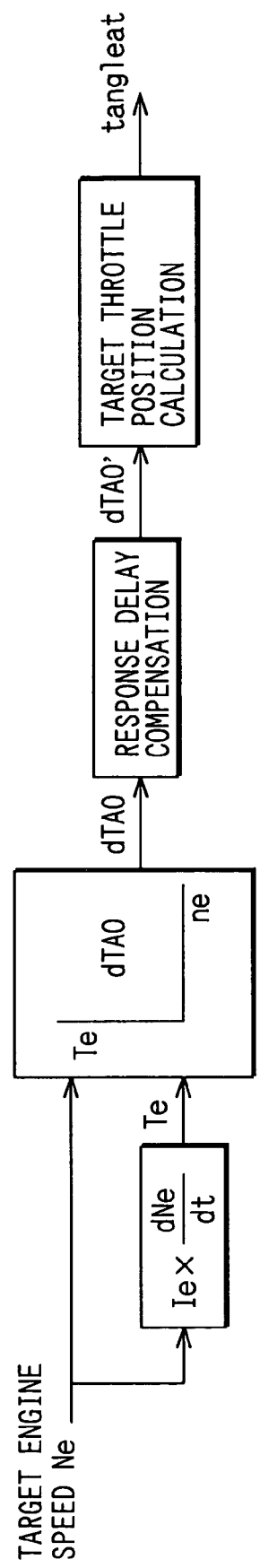
FIG. 47 is a block diagram explaining an engine output increasing control function in the ninth embodiment.

A description will now be given about a method for setting an output increase control quantity (target throttle angle) by the engine output increasing control. In this ninth embodiment, a target throttle angle tangleat is set so that an engine torque (required torque Te) corresponding to a desired engine speed change rate dNe/dt during the engine output increasing control. More specifically, the following calculation is performed. As shown in FIG. 47, first the engine speed change rate dNe/dt is calculated and then multiplied by an engine-side inertia Ie to obtain a required torque Te.

$$Te = Ie \times dNe/dt$$

The above equation may be substituted by the following equation to calculate the required torque Te:

$$Te = Ie \times \{Ne0 \times (gr2/gr1)/Tt\}$$

gr1: gear ratio before shift
gr2: gear ratio after shift
Tt: target shift time
Ie: engine-side inertia
Ne0: engine speed at time t0

Thereafter, a map for calculation of a throttle angle change quantity dTAO with engine speed ne and required torque Te as parameters is retrieved and a required throttle angle change quantity dTAO proportional to a target engine speed Ne and required torque Te at every moment is calculated.

Then, the required throttle angle change quantity dTAO is subjected to a response delay compensation processing, taking into account a response delay in the period after output of the target throttle angle tanleat to the electronic throttle system until actual increase or decrease of the amount of intake air and increase or decrease of the engine output, to obtain a required throttle angle change rate dTAO' as a response delay-compensated value. Thereafter, the required throttle angle change quantity dTAO' after the response delay compensation is added to the target throttle angle tangleat of last time to obtain a target throttle angle tangleat of this time.

In this case, in a down-shift involving execution of the engine output increasing control, as compared with a down-shift not involving execution of the same control, it is preferable to promote a decrease in working oil pressure of a releasing clutch and/or promote an increase in working oil pressure of an engaging clutch. By so doing, in the down-shift involving execution of the engine output increasing control, it is possible to promote the progress of the shift and hence possible to shorten the shift time.

The shift control according to this ninth embodiment described above is performed in various routines by cooperation of both AT-ECU 70 and engine ECU 25. The various routines are the same as in the first embodiment except the following routines, and explanations of portions common to the first embodiment will be omitted.

[Throttle Opening Control]

Figure 45:
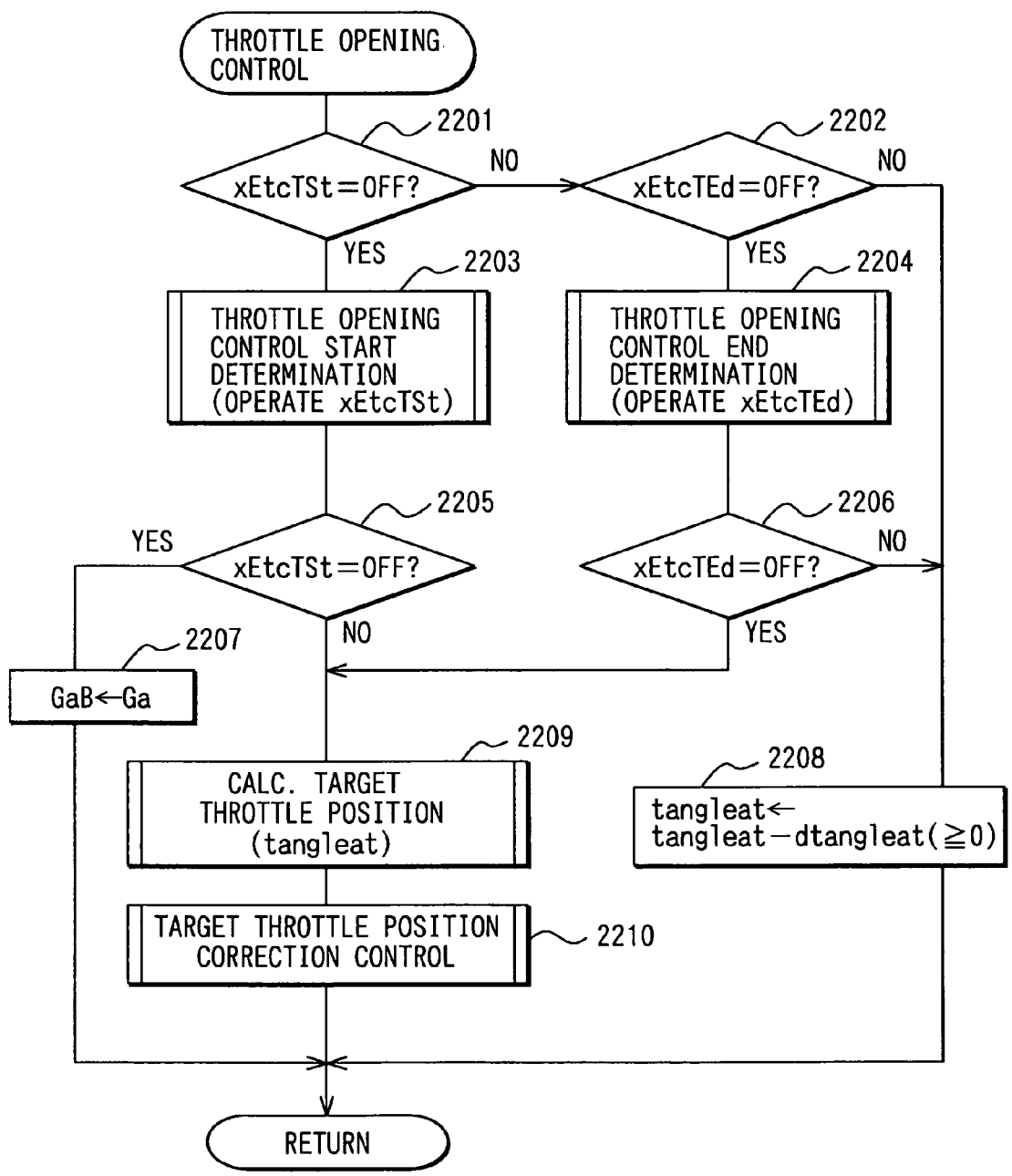
FIG. 45 is a flow chart showing a throttle angle control routine in the ninth embodiment.

A throttle opening control routine of FIG. 45 is a subroutine which is executed in Step 103 in the shift control routine of FIG. 8, playing a role as engine output increasing control means recited in the appended claims.

Once this routine is started, first in Step 2201, it is determined whether Throttle Opening Control Start Flag xEtcTSt is OFF which means a state before start of the throttle opening control. If the Flag is OFF, the processing flow advances to Step 2203, in which the throttle opening control start determination routine of FIG. 14 is executed and it is determined whether a throttle opening control start timing has been reached or not. Then, Throttle Opening Control Start Flag xEtcTSt is set or reset in accordance with the result of the determination.

Thereafter, the processing flow advances to Step 2205, in which it is determined whether Throttle Opening Control Start Flag xEtcTSt remains OFF or not. If the Flag remains OFF, the processing flow advances to Step 2207, in which a stored value GaB of the intake air quantity before start of the throttle opening control is updated by the present value Ga detected by the air flow meter 14 and this routine is ended.

The other steps in FIG. 45 are the same as the steps shown in FIG. 13.

[Target Throttle Angle Calculation]

Figure 46:
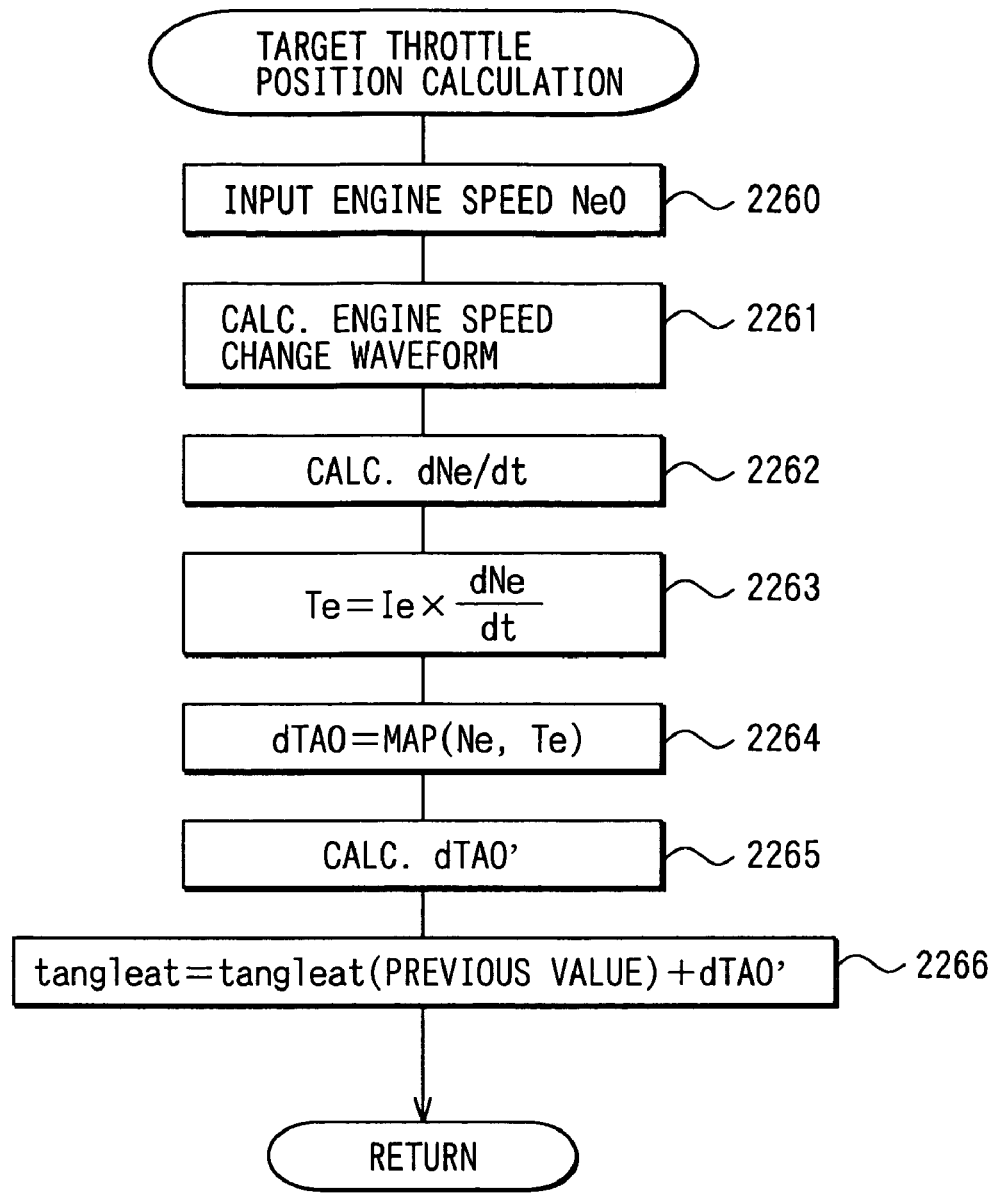
FIG. 46 is a flow chart showing a processing flow of a target throttle angle calculation routine in the ninth embodiment.

A target throttle angle calculation routine of FIG. 46 is a subroutine which is executed in Step 2209 in the throttle opening control routine of FIG. 45. Once this routine is started, first in Step 2260, the engine speed at time t0 detected on the basis of a pulse interval of output pulses from the crank angle sensor 24 is inputted and in the next Step 2261 there is calculated a target change waveform Ne of the engine speed in a shift period which is determined from a requested value of shift response time. In Step 2262 which follows, an engine speed change rate dNe/dt which is a time differential value of a target change waveform Ne is calculated. Then, the processing flow advances to Step 2263, in which the engine speed change rate dNe/dt is multiplied by an engine-side inertia Ie to obtain a required torque T.

$$Te = Ie \times dNe/dt$$

Thereafter, the processing flow advances to Step 2264, in which a map for calculation of a required throttle angle change quantity dTAO with engine speed Ne and required torque Te as parameters is retrieved and a required throttle angle change quantity dTAO proportional to the present engine speed Ne and required torque Te is calculated.

Then, the processing flow advances to Step 2265, in which the required throttle angle change quantity dTAO is subjected to a response delay compensation processing while taking into account a response delay in the period after output of a target throttle angle tangleat to the electronic throttle system until actual increase or decrease of the intake air quantity with consequent increase or decrease of the engine output, to obtain a required throttle angle change quantity dTAO' as a response delay-compensated value. Thereafter, the processing flow advances to Step 2266, in which the required throttle angle change quantity dTAO' after the response delay compensation is added to the target throttle angle tangleat of last time to obtain a target throttle angle tangleat of this time.

[Target Throttle Angle Compensation Control]

Figure 57:
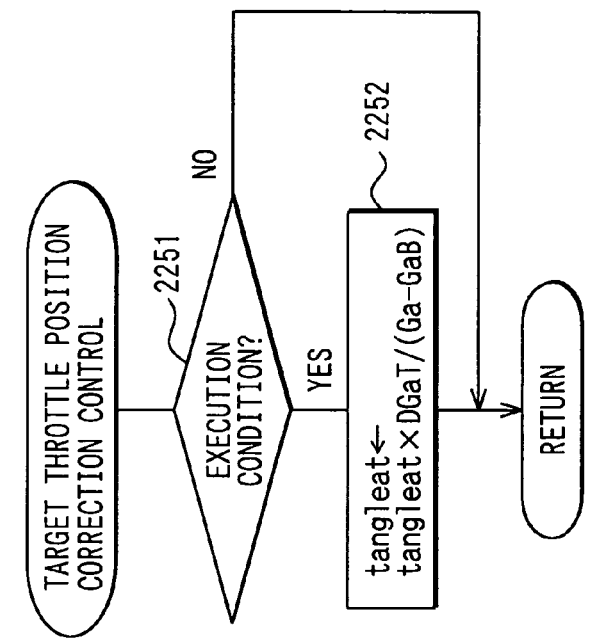
FIG. 57 is a flow chart showing a processing flow of a throttle angle correction routine in the ninth embodiment.

A target throttle angle correction control routine of FIG. 57 is a subroutine which is executed in Step 2210 in the throttle opening control routine of FIG. 45. Once this routine is started, first in Step 2251, it is determined whether an execution condition for a throttle opening quantity correction control exists or not. For example, the execution condition is determined on the basis of whether an elapsed time after the issuance of a throttle opening command is a response delay-equivalent time or longer. If the elapsed time after the issuance of the throttle opening command is shorter than the response delay-equivalent time, the execution condition for the throttle opening quantity correction control is not established and this routine is ended. Upon subsequent arrival of the elapsed time after the issuance of the throttle opening command at the response delay-equivalent time or a longer time, the execution condition for the throttle opening quantity correction control becomes valid and the processing flow advances to Step 2252, in which the target throttle angle tangleat is corrected by the following equation:

$$tangleat = tangleat \times DGaT/(Ga-GaB)$$

In the above equation, DGaT stands for a target value of the intake air quantity Ga, which value is set using a table or the like in accordance with the target throttle angle tangleat and GaB stands for an intake air quantity just before start of the throttle opening control which has been stored in Step 2207 in the throttle opening control routine of FIG. 45. Variations in system fabrication, variations caused by secular change and variations caused by operating conditions such as atmospheric pressure and intake air temperature are corrected by correcting the target throttle angle tangleat in accordance with the above equation.

According to this ninth embodiment described above, in a system wherein an engine output increasing control for increasing the engine output is executed without depending on the driver's accelerator operation at the time of performing ETC cooperation down-shift on the basis of the driver's intention of deceleration, an output increase control quantity (target throttle angle) is set in such a manner that an engine torque corresponding to a desired engine speed change rate is developed during the engine output increasing control. Therefore, the engine torque can be increased by only an amount corresponding to an inertia torque of members (e.g., engine and torque converter) whose rotations are required to increase in a down-shift, and thus an output increase quantity (target throttle angle) free of excess or deficiency can always be set. Besides, it is possible to solve the foregoing various problems of the prior art.

Further, in this ninth embodiment, a response delay of the required throttle angle change quantity dTAO is compensated while taking into account a response delay in the period after output of the target throttle angle tangleat to the electronic throttle system until actual increase or decrease of the intake air quantity with a consequent increase or decrease of the engine output, and the target throttle angle tangleat is set. Therefore, a transient excess or deficiency of the throttle opening quantity can be corrected and it is possible to enhance the accuracy of the engine output increasing control.

Tenth Embodiment

In the above ninth embodiment the required torque Te is obtained by multiplying the engine speed change rate dNe/dt by the engine-side inertia Ie. But in a tenth embodiment of the present invention illustrated in FIGS. 48 and 49, the required torque Te is calculated taking both vehicle body deceleration (vehicle body acceleration) and the gradient of a running road surface into account.

Figure 48:
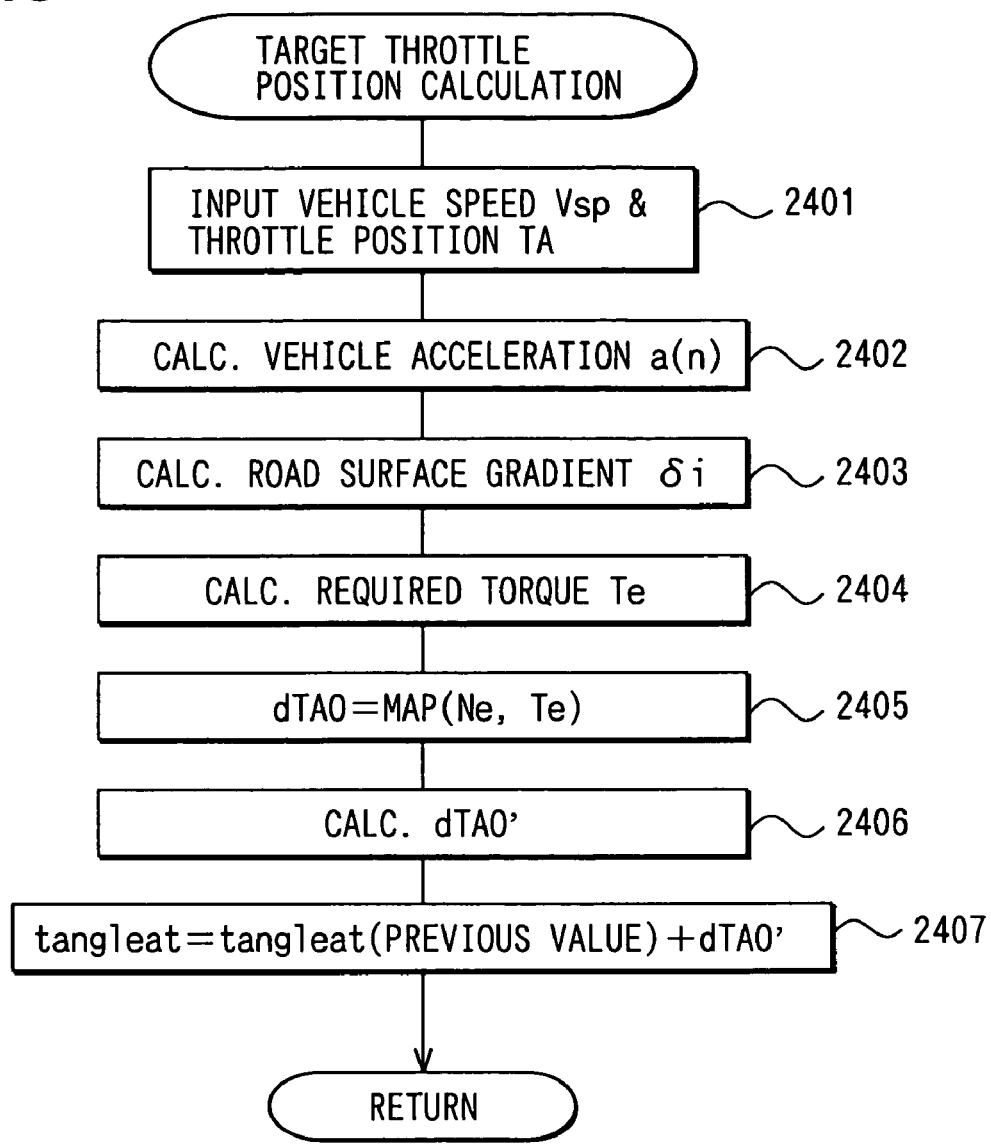
FIG. 48 is a flow chart showing a processing flow of a target throttle angle calculation routine in a tenth embodiment of the present invention.

A target throttle angle calculation routine of FIG. 48 is executed in this tenth embodiment. Once this routine is started, first in Step 2401, a vehicle speed Vsp detected by a vehicle speed sensor (not shown) and a throttle angle TA detected by the throttle angle sensor 18 are inputted, then in the next Step 2402 a vehicle body acceleration a (n) is calculated by the following equation:

$$A(n) = \{Vsp(n) - Vsp(n-1)\}/\Delta t$$

In the above equation, Vsp (n) stands for a vehicle speed of this time, Vsp (n−1) stands for a vehicle speed of last time, and $\Delta t$ stands for a sampling cycle of the vehicle speed Vsp.

Figure 49:
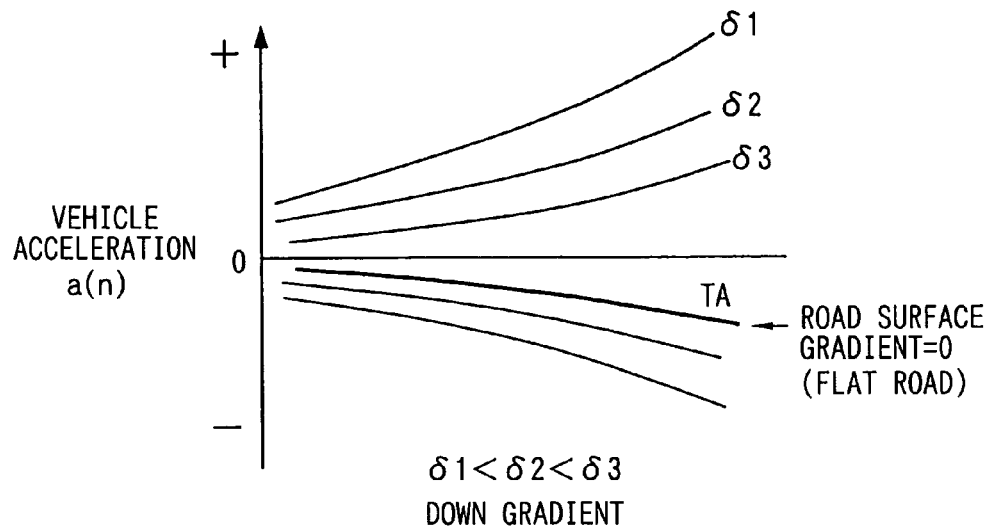
FIG. 49 is a diagram showing conceptually a road surface gradient map in the tenth embodiment.

Thereafter, the processing flow advances to Step 2403, in which a gradient $\delta i$ (i=1, 2, 3, . . . ) of a running road surface relative to the vehicle body acceleration a(n) and the throttle angle TA is determined using a road surface gradient map of FIG. 49. The road surface gradient map of FIG. 49 is set in such a manner that the higher the vehicle body acceleration a (n), the smaller the road surface gradient δi(δ1<δ2<δ3< ... ). At a down gradient, the value of δi takes a negative value. The processing of this Step 2403 plays a role as road surface gradient determining means recited in the appended claims.

Then, in the next Step 2404, a required torque Te is calculated by the following equation using the road surface gradient δi:

$$Te=Ie\times[Ne0\times\{(gr2+k\cdot\delta1)/gr1\}/Tt]$$

gr1: gear ratio before shift
gr2: gear ratio after shift
Tr: target shift time
Ie: engine-side inertia
Ne0: engine speed at time t0
k: constant By the above equation the required torque Te is corrected in accordance with the road surface gradient δi. More particularly, the required torque Te corrected so as to decrease at an up gradient and increase at a down gradient.

In the case where the road surface gradient δi is not detected, the required torque Te may be calculated by the following equation using a vehicle body acceleration (a):

$$Te=Ie\times[Ne0\times\{(gr2+k\cdot a)/gr1\}/Tt]$$

By the above equation, a required torque Te corrected in accordance with the vehicle body acceleration (a) is calculated.

Thereafter, the processing flow advances to Step 2405, in which, by the same method as in the ninth embodiment (FIG. 46), a map for calculation of a required throttle angle change quantity dTAO with both engine speed Ne and required torque Te as parameters is retrieved and a required throttle angle change quantity dTAO corresponding to the present engine speed Ne and required torque Te is calculated.

Then, the processing flow advances to Step 2406, in which the required throttle angle change quantity dTAO is subjected to a response delay compensation processing while taking into account a response delay in the period after output of the target throttle angle tangleat to the electronic throttle system until actual increase or decrease of the intake air quantity with a consequent increase or decrease of the engine output, to obtain a required throttle angle change quantity dTAO' as a response delay-compensated value. Subsequently, the processing flow advances to Step 2407, in which the required throttle angle change quantity after the response delay compensation is added to the target throttle angle tangleat of last time to determine a target throttle angle tangleat of this time. Other routines are the same as in the ninth embodiment.

According to this tenth embodiment described above, during the engine output increasing control, a road surface gradient δi is determined and the required torque is corrected so as to decrease at an up gradient and increase at a down gradient, therefore, even when the vehicle speed changes due to a road surface gradient, it is possible to correct an excess or deficiency of the output increase control quantity against a deviation of a predicted engine speed value after shift from a value calculated from a mechanical gear ratio which deviation occurs due to the aforesaid change in vehicle speed.

Eleventh Embodiment

According to an eleventh embodiment of the present invention illustrated in FIGS. 51A, 51B to 55, in the case of a down-shift ("manual down-shift" hereinafter) which occurs upon operation of the shift lever or switch by the driver, in the case of a down-shift ("auto down-shift" hereinafter) which occurs upon deceleration of the vehicle body or operation of the brakes, and also in the case of a down-shift ("coast down-shift" hereinafter) which occurs in accordance with a shift schedule preset by a shift line, there is performed an engine output increasing control and a target throttle angle in the engine output increasing control is changed among the manual down-shift, auto down-shift and coast down-shift. In this eleventh embodiment, the target throttle angle in the engine output increasing control is set so as to satisfy the relation of a target throttle angle for manual down-shift>a target throttle angle for auto down-shift>a target throttle angle for coast down-shift.

Figure 50:
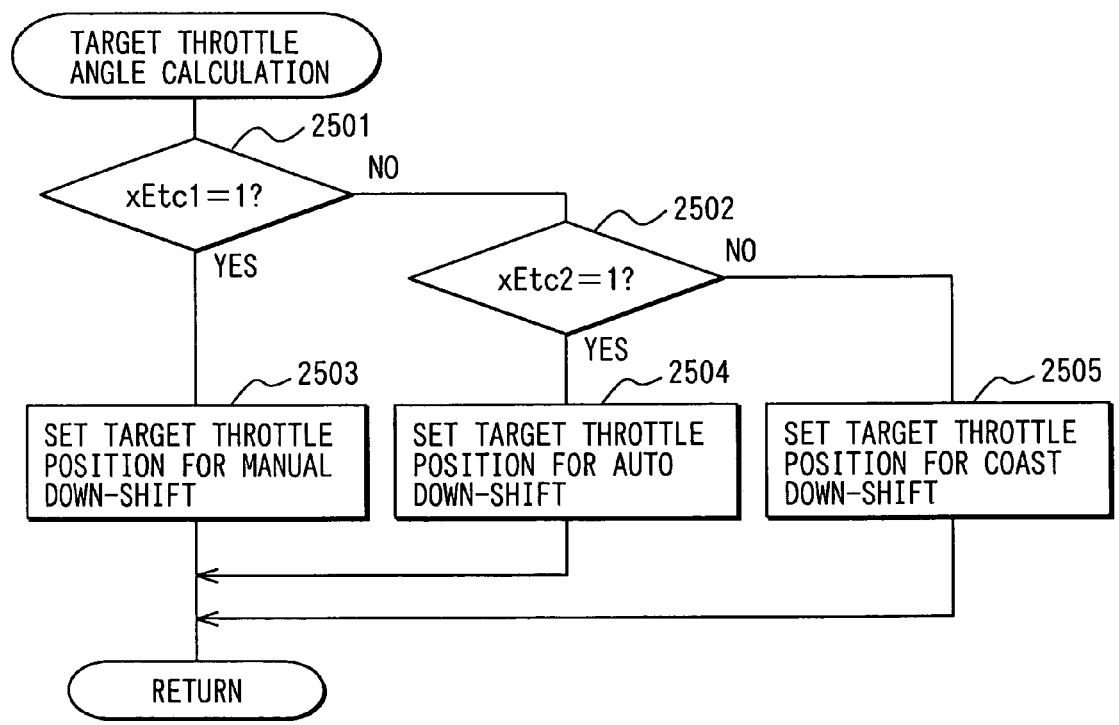
FIG. 50 is a flow chart showing a processing flow of a target throttle angle calculation routine in an eleventh embodiment of the present invention.
Figure 54:
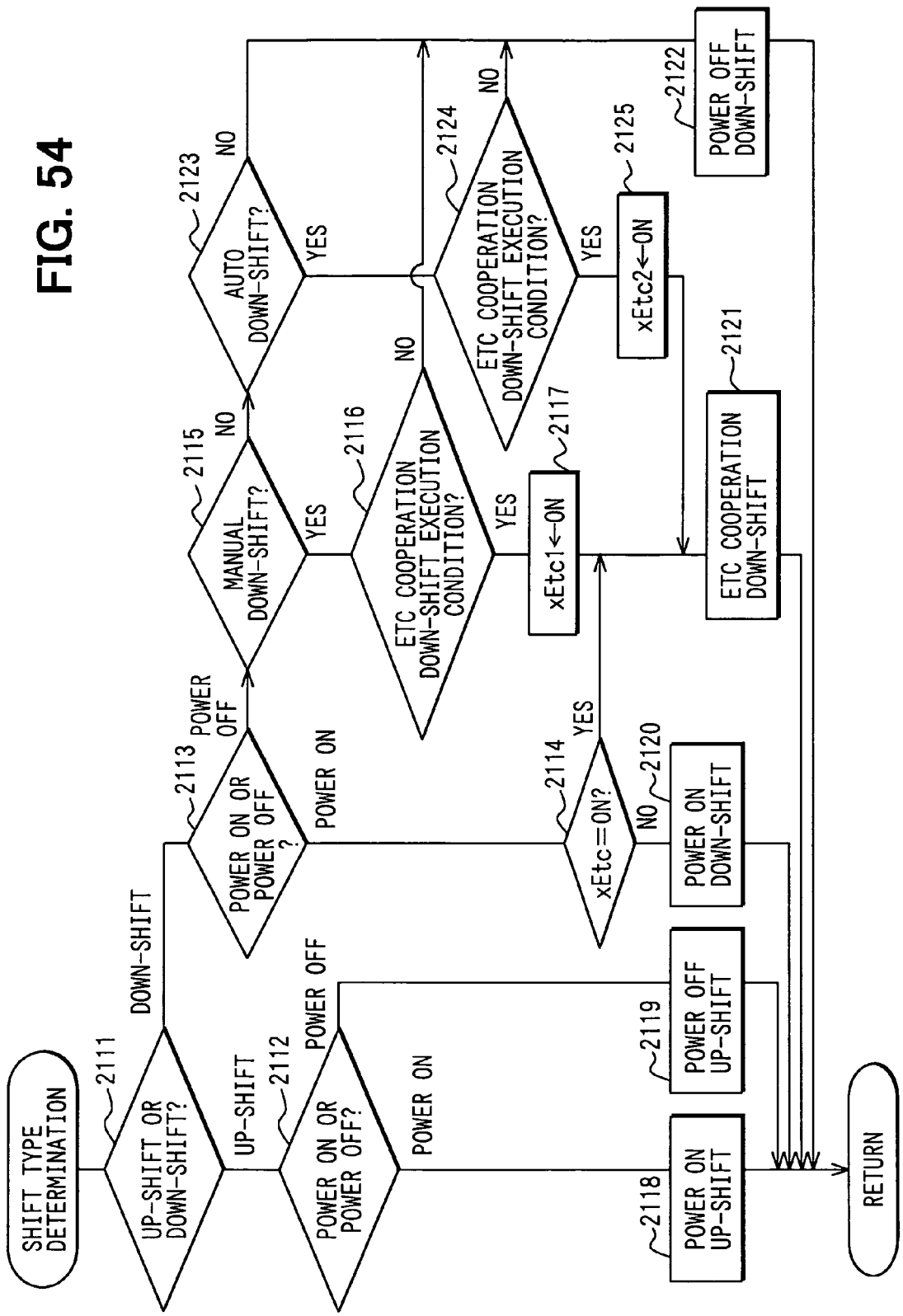
FIG. 54 is a flow chart showing a processing flow of a shift type determination routine in the eleventh embodiment.
Figure 55:
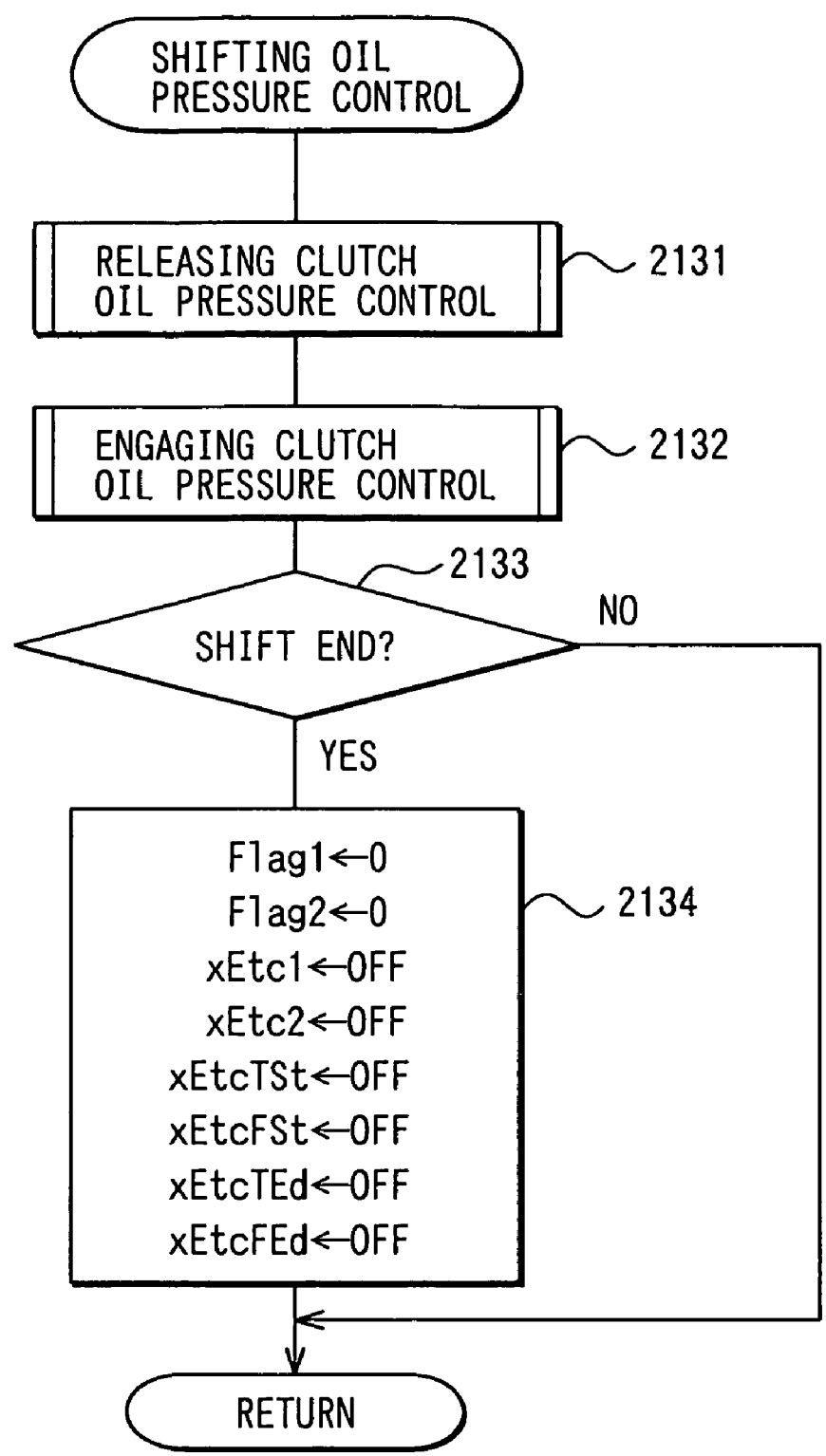
FIG. 55 is a flow chart showing a processing flow of a shifting oil pressure control routine in the eleventh embodiment.

In this eleventh embodiment, since the ETC cooperation down-shift control changes according to the type of a power OFF down-shift, not only a shift type determination routine of FIG. 54 and a shifting oil pressure control routine of FIG. 55 are executed, but also a target throttle angle calculation routine of FIG. 50 is executed. Processing contents of these routines will be described below.

[Shift Type Determination]

Once the shift type determination routine of FIG. 54 is started, first in Step 2111 it is determined whether the present shift command is an up-shift command or a down-shift command. If it is determined that the present shift command is an up-shift command, the processing flow advances to Step 2112, in which it is determined whether the state of load applied to the automatic transmission 51 is power ON (a state in which the automatic transmission 51 is driven from the engine 11 side) or power OFF (a state in which the automatic transmission 51 is driven from the driving wheels side). Then, in accordance with the result of this determination it is determined to which of power ON up-shift (Step 2118) and power OFF up-shift (Step 2119) the shift type according to the present shift command corresponds.

On the other hand, if it is determined in Step 2111 that the present shift command is a down-shift command, the processing flow advances to Step 2113, in which it is determined whether the state of load applied to the automatic transmission 51 is power ON or power OFF. If the state of the load is determined to be power OFF, it is determined whether the down-shift in question is a manual down-shift based on the driver's operation of the shift lever 16. If the down-shift in question is determined to be the manual down-shift, the processing flow advances to Step 2116, in which it is determined whether an ETC cooperation down-shift execution condition exists or not, for example, in order to ensure controllability, it is determined whether the temperature of working oil lies in a temperature region in which the reproducibility of response to an oil pressure command value is high. As a result, if it is determined the ETC cooperation down-shift execution condition exists, the processing flow advances to Step 2117, in which First ETC Cooperation Down-Shift Execution Flag xEtc1 is set ON. Thereafter, the processing flow advances to Step 2121, in which it is determined that the present shift type is ETC cooperation down-shift.

If it is determined in Step 2115 that the present shift type is not a manual down-shift, the processing flow advances to Step 2123, in which it is determined whether the present shift type is an auto down-shift or not. If the answer is affirmative, the processing flow advances to Step 2124, in which in the same manner as in Step 2116 it is determined whether the ETC cooperation down-shift execution condition exists or not. As a result, if it is determined that the ETC cooperation down-shift execution condition exists, the processing flow advances to Step 2125, in which Second ETC Cooperation Down-Shift Execution Flag xEtc2 is set ON. Then, the processing flow advances to Step 2121, in which it is determined that the present shift type is ETC cooperation down-shift.

On the other hand, if it is determined in Step 2123 that the present shift type is not an auto down-shift, or if it is determined in either Step 2116 or 2124 that the ETC cooperation down-shift execution condition does not exist, the processing flow advances to Step 2122, in which it is determined that the present shift type is a power OFF down-shift.

If power ON is determined in Step 2113, the processing flow advances to Step 2114 for distinguishing between power ON based on ETC cooperation down-shift control (engine output increasing control) and power ON based on depression of the accelerator pedal 26. In Step 2114 it is determined whether ETC Cooperation Down-Shift Execution Flag xEtc1 or xEtc2 is set ON or not. If the answer is affirmative, the processing flow advances to Step 2121, in which it is determined that the present shift type is ETC cooperation down-shift. If ETC Cooperation Down-Shift Execution Flag xEtc is set OFF, the processing flow advances to Step 2120, in which it is determined that the present shift type is power ON down-shift.

[Shifting Oil Pressure Control]

The shifting oil pressure control routine of FIG. 55 is executed when the shift type is ETC cooperation down-shift. Once this routine is started, first in Step 2131 the releasing clutch oil pressure control routine of FIG. 11 is executed to control the oil pressure of a releasing clutch, then in Step 2132 the engaging clutch oil pressure control routine of FIG. 12 is executed to control the oil pressure of an engaging clutch.

Thereafter, the processing flow advances to Step 2133, in which whether the down-shift has been completed or not is determined on the basis of whether Control Stage Flag1 and Flag2 are equal to 4 and 5, respectively. Upon completion of the down-shift, the processing flow advances to step 2134, in which both Control Stage Flag1 and Flag2 are reset to an initial value "0" and all of other Flags xEtc1, xEtc2, xEtcTSt, xEtcFSt, xEtcTEd and xEtcFEd are reset to "OFF" to terminate this routine.

[Target Throttle Angle Calculation]

Once the target throttle angle calculation routine of FIG. 50 is started, first in Step 2501, whether the present shift type is a manual down-shift or not is determined on the basis of whether First Down-Shift Determination Flag xEtc1 is 1 or not. If the answer is affirmative, the processing flow advances to Step 2503, in which target throttle angle setting maps for manual down-shift shown in FIGS. 51A and 51B are retrieved and a target throttle angle in the manual down-shift is set in accordance with the present input shaft rotational speed Nt and cooling water temperature.

On the other hand, if the answer in Step 2501 is negative, the processing flow advances to Step 2502, in which whether the present shift type is an auto down-shift or not is determined on the basis of whether Second Down-Shift Determination Flag xEtc1 is 1 or not. If the answer is affirmative, the processing flow advances to Step 2504, in which target throttle angle setting maps for auto down-shift shown in FIGS. 52A and 52B are retrieved and a target throttle angle in the auto down-shift is set in accordance with the present input shaft rotational speed Nt and cooling water temperature.

If the answers in Steps 2501 and 2502 are both negative, the processing flow advances to Step 2505, in which target throttle angle setting maps for coast-down shift shown in FIGS. 53A and 53B are retrieved and a target throttle angle in the coast down-shift is set in accordance with the present input shaft rotational speed Nt and cooling water temperature.

This eleventh embodiment described above is advantageous in that the target throttle angle can be changed according to the type of a down-shift and therefore can be set so as to afford a better feeling with respect to the shift shock and the shift time. Besides, since target throttle angles in various down-shifts are set in such a relation of magnitude as manual down-shift>auto down-shift>coast down-shift, there is obtained a shift time shortening and shift shock diminishing effect against a manual down-shift which clearly reflects the driver's intention of shift and an auto down-shift which is conducted automatically in accordance with operation performed by the driver. Moreover, in a coat down-shift which occurs in coasting deceleration or slow deceleration, the down-shift can be carried out without generation of noise caused by a sudden increase of the engine speed or without deterioration of fuel economy caused by an increase of fuel consumption in this control.

In this eleventh embodiment, since the target throttle angle setting maps for coast down-shift shown in FIGS. 53A and 53B contain all zero, the engine output increasing control is not performed in the coast down-shift, but small values may be set in the same maps, allowing the engine output increasing control to be performed to a slight extent in the coast down-shift.

Twelfth Embodiment

Figure 56:
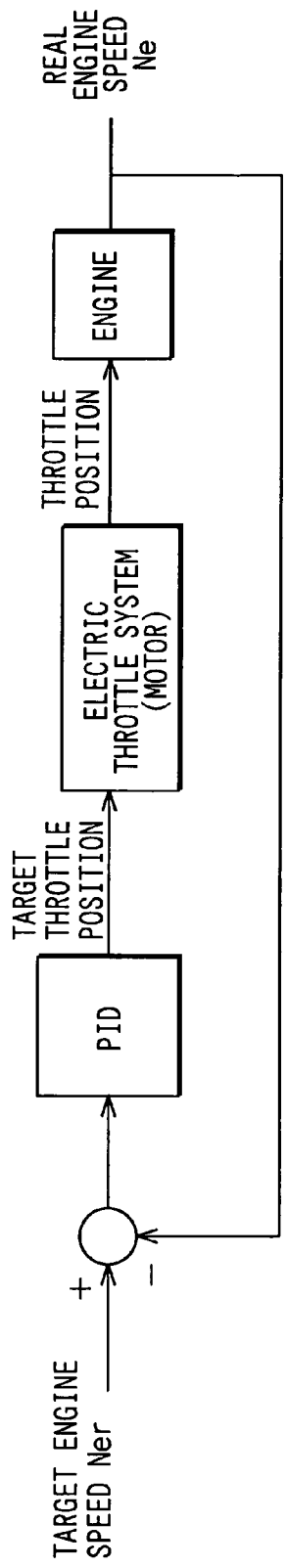
FIG. 56 is a block diagram explaining an engine output increasing control function in a twelfth embodiment of the present invention.

In a twelfth embodiment of the present invention illustrated in FIG. 56, a target engine sped Ner is set so that a desired engine speed or engine speed change rate is reached in an engine output increasing control, and the throttle angle is feedback-controlled.

More specifically, in an engine output increasing control, a target throttle angle is calculated by PID control so that a deviation $\delta Ne(=Ner-Ne)$ between a target engine speed Ner and an actual engine speed Ne becomes smaller., Target throttle angle=$kp \times \delta Ne + kd \times \{\delta Ne(n) - \delta Ne(n-1)\} + ki \times \Sigma \delta Ne(n)$ In the above equation, kp stands for a proportional gain, kd stands for a differential gain, and ki stands for an integral gain.

By outputting a signal of the target throttle angle to outputted to the motor driver in the electronic throttle system to actuate the throttle valve 15 and thereby control the intake air quantity, whereby the throttle angle is feedback-controlled so as to diminish the deviation $\delta Ne$ between the target engine speed Ner and the actual engine speed Ne.

Also in this twelfth embodiment described above, at the time of performing a down-shift on the basis of the driver's intention of deceleration, it is possible to execute an engine output increasing control in a proper amount according to vehicle operating conditions.

The present invention is not limited to the above embodiments, but may be constructed as follows for example.

(1) In a system including road shape determining means for determining a running road shape (e.g., curving of a road or a road surface gradient) for example on the basis of information provided from a navigation system and road shape down-shift execution means for performing a down-shift on the basis of the result of the determination made by the road shape determining means, the engine output increasing control according to the present invention may be performed when the down-shift is performed by the road shape down-shift execution means. By so doing, even when a down-shift is executed automatically in accordance with the shape of a road, not only the shift time can be shortened, but also the shift shock can be diminished.

(2) Even in the case of a down-shift based on the driver's intention of deceleration, the engine output increasing control according to the present invention may be performed only when the deceleration of the vehicle body is a predetermined value or more. By so doing, even in the case of a down-shift based on the driver's intention of deceleration, if the deceleration of the vehicle body is small, it may be determined that the engine output increasing control is not necessary, and the execution of the same control may be omitted.

What is claimed is:

1. A controller for an automatic transmission wherein oil pressures acting on a plurality of frictional engaging elements are individually controlled by oil pressure to selectively switch the frictional engaging elements between engagement and release to switch from one shift range to another, the controller comprising:
   engine output control means for increasing engine output without depending on a driver's accelerator operation when a shift mechanism is down-shifted for deceleration; and
   start timing control means for setting a start time of the engine output control at a time when the oil pressure of a frictional engaging element being released during down-shift decreases to a level not higher than a predetermined transfer torque capacity-equivalent oil pressure.

2. The controller for an automatic transmission according to claim 1, wherein the start timing control means includes means for setting the predetermined transfer torque capacity based on a torque inputted to the shift mechanism or an estimated value of the torque.

3. The controller for an automatic transmission according to claim 1, wherein based on an output of an oil pressure sensor or an oil pressure switch for detecting oil pressure of the frictional engaging element being released, the start timing control means predicts the time point at which the oil pressure of the frictional engaging element being released decreases to said level not higher than the predetermined transfer torque capacity-equivalent oil pressure.

4. The controller for an automatic transmission according to claim 1, wherein the engine output control means makes control in such a manner that increasing engine output changes gradually until detection of a change in gear ratio.

5. The controller for an automatic transmission according to claim 1, wherein the engine output control means increases engine output in an oil temperature region in which reproducibility of oil pressure relative to operation of oil pressure control is high.

6. The controller for an automatic transmission according to claim 1, wherein the oil pressure of each of the frictional engaging elements is directly controlled, and the start timing control means estimates the time point at which the oil pressure of the frictional engaging element being released decreases to said level not higher than the predetermined transfer torque capacity-equivalent oil pressure based on operation of an oil pressure control means controlling oil pressure to said frictional engaging elements.

7. A controller for an automatic transmission according to claim 6, wherein the start timing control means calculates oil pressure of the frictional engaging element being released by a weighted averaging calculation of a control command value provided to control oil pressure.

8. The controller for an automatic transmission according to claim 1, wherein electric current detecting means for detecting an electric current are provided for each of oil pressure control valves arranged for controlling oil pressures of the frictional engaging elements, and on the basis of a detected electric current value in an associated oil pressure control valve, the start timing control means estimates the time point at which the oil pressure of the frictional engaging element being released decreases to said level not higher than the predetermined transfer torque capacity-equivalent oil pressure.

9. The controller for an automatic transmission according to claim 8, wherein the start timing control means calculates the oil pressure of the frictional engaging element being released by a weighted averaging calculation of the detected electric current value in the associated oil pressure control valve.

10. The controller for an automatic transmission according to claim 1, wherein the start timing control means estimates the oil pressure of the frictional engaging element being released while taking a transfer characteristic of the oil pressure into account.

11. The controller for an automatic transmission according to claim 10, wherein the start timing control means estimates oil pressure of the frictional engaging element being released while taking into account a change in transfer characteristic of the oil pressure, due to an oil temperature.

12. The controller for an automatic transmission according to claim 10, wherein the start timing control means calculates oil pressure of the frictional engaging element being released with use of a transfer function.

13. A controller for an automatic transmission wherein oil pressures to act on a plurality of frictional engaging elements and are individually controlled to switch the frictional engaging elements selectively between engagement and release, thereby switching from one shift range to another in a shift mechanism, the controller comprising:
   engine output control means for increasing an engine output without depending on a driver's accelerator operation when the shift mechanism is down-shifted for deceleration; and
   end timing control means which sets an end time for the engine output control based on a change quantity per unit time of a shift progress ratio, which is determined based on an input shaft rotational speed of the shift mechanism, and a time response delay of the engine output control means so that an increase of engine output has disappeared before the down-shift is completed.

14. The controller for an automatic transmission according to claim 13, wherein, when an input shaft rotational speed of the shift mechanism has reached a predetermined rotational speed less a predetermined amount, the predetermined amount being set in consideration of a system response delay associated with the end of increasing engine output control relative to an after-shift synchronous rotational speed determined from both an output shift mechanism shaft rotational speed and the shift mechanism gear ratio after shifting, the end timing control means determines that a predetermined state corresponding to an end of down-shift has been reached.

15. The controller for an automatic transmission according to claim 13, wherein when transfer torque capacity of a frictional engaging element controlled for engagement has reached a transfer torque capacity less a predetermined amount in increasing engine output control, the predetermined amount being set in consideration of a system response delay associated with the end of increasing engine output control relative to a divided torque-equivalent value after shifting, the end timing control means determines that a predetermined state corresponding to an end of down-shift has been reached.

16. The controller for an automatic transmission according to claim 13, wherein the end timing control means includes means for predicting an end timing of down-shift during increasing engine output control, and means which, upon arrival at a timing earlier by a predetermined time, determines that a predetermined state corresponding to said end of down-shift has been reached, the predetermined time being set in consideration of a system response delay associated with the end of increasing engine output control relative to the predicted down-shift end timing.

17. The controller for an automatic transmission according to claim 13, wherein the end timing control means includes:
    means for predicting a time during increasing engine output control, when an input shaft rotational speed of the shift mechanism reaches a predicted after-shift synchronous rotational speed determined from both a shift mechanism output shaft rotational speed and a gear ratio after shifting, and
    means which, upon arrival at a time earlier by a predetermined time, determines that a predetermined state corresponding to said end of the down-shift has been reached, the predetermined time being set in consideration of a system response delay associated with the end of increasing engine output control relative to predicted synchronous timing.

18. The controller for an automatic transmission according to claim 13, wherein the end timing control means determines a predetermined state corresponding to said substantial end of down-shift in consideration of deceleration of a vehicle body.

19. The controller for an automatic transmission according to claim 13, wherein at a time point where switches in shift has progressed up to a predetermined gear ratio, the end timing control means determines that a predetermined state corresponding to a substantial end of down-shift has been reached, the predetermined gear ratio being set in consideration of a system response delay associated with an end of increasing engine output control relative to a gear ratio after the shift in the engine output control.

20. The controller for an automatic transmission according to claim 19, wherein the end timing control means includes response delay calculating means for calculating a response delay time after issuance of an increasing engine output control end command to the engine control means until actual disappearance of increase of engine output as a system response delay time associated with the end of the engine output control.

21. The controller for an automatic transmission according to claim 20, wherein:
    the engine control means includes throttle control means for opening a throttle valve to increase intake air during increasing engine output control, and
    the response delay calculating means calculates the system response delay time associated with the end of increasing engine output control in consideration of a throttle system response delay time after output of a throttle angle command to the throttle control means until actual operation of the throttle valve to the command angle.

22. The controller for an automatic transmission according to claim 20, wherein:
    the engine control means includes throttle control means for opening a throttle valve to increase intake air during increasing engine output, and
    the response delay calculating means calculates the system response delay time associated with the end of increasing engine output control in consideration of a throttle system response delay time after actual operation of the throttle valve to a command angle until actual response of the engine output.

23. The controller for an automatic transmission according to claim 13, wherein the engine control means includes fuel injection return means for resuming injection of fuel in the engine output increasing control, and the end timing control means terminates injection of fuel by the fuel injection return means when it is determined that a predetermined state corresponding to said substantial end of the down-shift has been reached.

24. The controller for an automatic transmission according to claim 23, wherein:
    the end timing control means sets the predetermined state corresponding to said substantial end of the down-shift in consideration of a response delay time after issuance of a fuel injection end command to the fuel injection return means until actual disappearance of increase the engine output, the response delay time being set to a time required for two revolutions of the engine.

25. A method for controlling an automatic transmission wherein oil pressures acting on a plurality of frictional engaging elements are individually controlled by oil pressure to selectively switch the frictional engaging elements between engagement and release to switch from one shift range to another, the method comprising:
    increasing engine output without depending on a driver's accelerator operation when a shift mechanism is down-shifted for deceleration; and
    setting a start time to increase engine output at a time when the oil pressure of a frictional engaging element being released during down-shift decreases to a level not higher than a predetermined transfer torque capacity-equivalent oil pressure.

26. The method of claim 25 wherein the oil pressure of each of the frictional engaging elements is directly controlled, and the start time is estimated based on operation of an oil pressure control means controlling oil pressure to said frictional engaging elements.

27. The method of claim 25 wherein electric current is detected at each of oil pressure control valves arranged for controlling oil pressures of the frictional engaging elements, and on the basis of a detected electric current value in an associated oil pressure control valve, the start time is estimated.

28. The method of claim 25 wherein the start time determination is based on a torque inputted to a shift mechanism or an estimated value of the torque.

29. The method of claim 25 wherein the start time is estimated based on an output of an oil pressure sensor or an oil pressure switch for detecting oil pressure of the frictional engaging element being released.

30. The method of claim 25 wherein the oil pressure of each of the frictional engaging elements is directly controlled, and the start time is estimated based on operation of an oil pressure control means controlling oil pressure to said frictional engaging elements.

31. The method of claim 30 wherein the start time is based on calculated oil pressure of the frictional engaging element being released by a weighted averaging calculation of a control command value provided to control oil pressure.

32. The method of claim 25 wherein the start time is estimated taking a transfer characteristic of the oil pressure into account.

33. The method of claim 32 wherein the start time is estimated taking into account a change in transfer characteristic of the oil pressure, due to an oil temperature.

34. The method of claim 32 wherein the start time is based on calculated oil pressure of the frictional engaging element being released with use of a transfer function.

35. A method for controlling an automatic transmission wherein oil pressures act on a plurality of frictional engaging elements and are individually controlled to switch the frictional engaging elements selectively between engagement and release, thereby switching from one shift range to another in a shift mechanism, the method comprising:

increasing an engine output without depending on a driver's accelerator operation when the shift mechanism is down-shifted for deceleration; and setting an end time for the increased engine output to a time point based on a change quantity per unit time of a shift progress ratio, which is determined based on an input shaft rotational speed of the shift mechanism, and a time response delay of an engine output controller which increases the engine output so that an increase of the engine output has disappeared before the down-shift is completed.

* * * * *